United States Patent
Lin et al.

(10) Patent No.: US 11,782,294 B2
(45) Date of Patent: Oct. 10, 2023

(54) MULTIFOCAL CONTACT LENS AND CONTACT LENS PRODUCT

(71) Applicant: LARGAN MEDICAL CO., LTD., Taichung (TW)

(72) Inventors: En-Ping Lin, Taichung (TW); Wei-Yuan Chen, Taichung (TW); Chun-Hung Teng, Taichung (TW)

(73) Assignee: LARGAN MEDICAL CO., LTD., Taichung (TW)

( * ) Notice: Subject to any disclaimer, the term of this patent is extended or adjusted under 35 U.S.C. 154(b) by 583 days.

(21) Appl. No.: 17/019,425

(22) Filed: Sep. 14, 2020

(65) Prior Publication Data
US 2020/0409175 A1    Dec. 31, 2020

Related U.S. Application Data

(63) Continuation of application No. 16/445,395, filed on Jun. 19, 2019, now Pat. No. 10,845,622, which is a continuation of application No. 15/255,319, filed on Sep. 2, 2016, now Pat. No. 10,371,964, which is a continuation-in-part of application No. 15/251,007, filed on Aug. 30, 2016, now Pat. No. 10,416,476.

(30) Foreign Application Priority Data

Sep. 15, 2015 (TW) .................. 104130460
Oct. 29, 2015 (TW) .................. 104135628

(51) Int. Cl.
G02C 7/04 (2006.01)

(52) U.S. Cl.
CPC ......... *G02C 7/041* (2013.01); *G02C 2202/24* (2013.01)

(58) Field of Classification Search
CPC ...... G02C 2202/24; G02C 7/04; G02C 7/041; G02C 7/044; G02C 7/047; G02C 7/02; G02C 7/024; G02C 7/063; G02C 7/066; G02C 7/104; A61K 31/5513; A61K 2300/00; A61K 31/46; A61K 31/155; A61K 47/10; A61K 9/0048; A61F 2/16; A61F 2009/00872; A61F 2/142; A61F 2/1451; G02B 1/043
See application file for complete search history.

(56) References Cited

U.S. PATENT DOCUMENTS

| | | | |
|---|---|---|---|
| 6,045,578 | A | 4/2000 | Collins et al. |
| 7,165,840 | B2 | 1/2007 | Yokoyama et al. |
| 7,637,612 | B2 | 12/2009 | Menezes |

(Continued)

FOREIGN PATENT DOCUMENTS

| | | |
|---|---|---|
| CA | 2922802 A1 | 3/2015 |
| CN | 1162747 A | 10/1997 |

(Continued)

*Primary Examiner* — Balram T Parbadia
(74) *Attorney, Agent, or Firm* — McClure, Qualey & Rodack, LLP

(57) ABSTRACT

A contact lens product includes a multifocal contact lens and a buffer solution. The multifocal contact lens is immersed in the buffer solution. The multifocal contact lens includes a central region and at least one annular region. The annular region concentrically surrounds the central region, and a diopter of the annular region is different from a diopter of the central region. The multifocal contact lens is made of silicone hydrogel or hydrogel. The annular region closest to a periphery of the multifocal contact lens is a first annular region.

11 Claims, 35 Drawing Sheets

(56) References Cited

U.S. PATENT DOCUMENTS

| | | |
|---|---|---|
| 7,819,523 B2 | 10/2010 | Shimojo |
| 7,828,435 B1 | 11/2010 | Rehse |
| 8,038,294 B2 | 10/2011 | Hibino |
| 8,998,408 B2 | 4/2015 | Wei et al. |
| 9,987,808 B2 | 6/2018 | Archer et al. |
| 10,416,476 B2 | 9/2019 | Lin et al. |
| 2002/0176048 A1 | 11/2002 | Ahsbahs |
| 2005/0074497 A1 | 4/2005 | Schultz |
| 2005/0105047 A1 | 5/2005 | Smith et al. |
| 2007/0115431 A1 | 5/2007 | Smith et al. |
| 2007/0159593 A1 | 7/2007 | Hibino |
| 2007/0196329 A1 | 8/2007 | Xia |
| 2007/0222942 A1 | 9/2007 | Wooley et al. |
| 2007/0296916 A1 | 12/2007 | Holden et al. |
| 2008/0062380 A1 | 3/2008 | Phillips |
| 2008/0218687 A1 | 9/2008 | Phillips |
| 2008/0291393 A1 | 11/2008 | Menezes |
| 2008/0304010 A1 | 12/2008 | Keane |
| 2009/0141235 A1 | 6/2009 | Colllins et al. |
| 2009/0161065 A1 | 6/2009 | Smith et al. |
| 2009/0225273 A1 | 9/2009 | Clutterbuck |
| 2009/0303434 A1 | 12/2009 | Tung |
| 2009/0303442 A1 | 12/2009 | Choo et al. |
| 2010/0036489 A1 | 2/2010 | Lindacher et al. |
| 2010/0073629 A1 | 3/2010 | Menezes |
| 2010/0100177 A1 | 4/2010 | Zhao |
| 2010/0195044 A1 | 8/2010 | Collins et al. |
| 2010/0296058 A1 | 11/2010 | Ho et al. |
| 2010/0328604 A1 | 12/2010 | Collins et al. |
| 2011/0001923 A1 | 1/2011 | Phillips |
| 2011/0051079 A1 | 3/2011 | Martinez et al. |
| 2011/0153012 A1 | 6/2011 | Legerton et al. |
| 2012/0113386 A1 | 5/2012 | Back |
| 2012/0176582 A1 | 7/2012 | Back et al. |
| 2012/0194780 A1 | 8/2012 | Back |
| 2012/0320333 A1 | 12/2012 | Holden et al. |
| 2013/0010255 A1 | 1/2013 | Holden et al. |
| 2013/0182215 A1 | 7/2013 | Tung |
| 2013/0182216 A1 | 7/2013 | Ho et al. |
| 2013/0314665 A1 | 11/2013 | Tung |
| 2014/0036225 A1 | 2/2014 | Chehab et al. |
| 2014/0132914 A1 | 5/2014 | Holden et al. |
| 2014/0132933 A1 | 5/2014 | Martinez et al. |
| 2014/0211147 A1 | 7/2014 | Wei et al. |
| 2014/0320800 A1 | 10/2014 | Collins et al. |
| 2014/0347622 A1 | 11/2014 | Wu |
| 2015/0085247 A1 | 3/2015 | Holden et al. |
| 2015/0124212 A1 | 5/2015 | Loertscher et al. |
| 2015/0124213 A1 | 5/2015 | Collins et al. |
| 2015/0290126 A1 | 10/2015 | Horn et al. |
| 2016/0000314 A1 | 1/2016 | Drobe |
| 2016/0054588 A1 | 2/2016 | Brennan et al. |
| 2016/0062144 A1 | 3/2016 | Brennan et al. |
| 2016/0320634 A1 | 11/2016 | Ho et al. |
| 2017/0010478 A1 | 1/2017 | Holden et al. |
| 2017/0038603 A1 | 2/2017 | Holden et al. |
| 2017/0052390 A1 | 2/2017 | Tung |
| 2017/0146821 A9 | 5/2017 | Collins et al. |
| 2017/0146824 A1 | 5/2017 | Martinez et al. |
| 2017/0168320 A1 | 6/2017 | Tsubota et al. |
| 2017/0184875 A1 | 6/2017 | Newman |
| 2017/0192252 A1 | 7/2017 | Brennan et al. |

FOREIGN PATENT DOCUMENTS

| | | |
|---|---|---|
| CN | 2430714 Y | 5/2001 |
| CN | 1510457 A | 7/2004 |
| CN | 1909860 A | 2/2007 |
| CN | 1959469 A | 5/2007 |
| CN | 101467092 A | 6/2009 |
| CN | 102238927 A | 11/2011 |
| CN | 102382237 A | 3/2012 |
| CN | 102757527 A | 10/2012 |
| CN | 102834769 A | 12/2012 |
| CN | 102906631 A | 1/2013 |
| CN | 102382237 B | 7/2013 |
| CN | 103210044 A | 7/2013 |
| CN | 103389586 A | 11/2013 |
| CN | 103576337 A | 2/2014 |
| CN | 103969848 A | 8/2014 |
| CN | 104136964 A | 11/2014 |
| CN | 106932920 A | 7/2017 |
| CN | 107037605 A | 8/2017 |
| EP | 2693259 A1 | 2/2014 |
| EP | 3144720 A2 | 3/2017 |
| JP | S57120416 A | 7/1982 |
| JP | H01299560 A | 12/1989 |
| JP | H06206820 A | 7/1994 |
| JP | H0926559 A | 1/1997 |
| JP | 2009540373 A | 11/2009 |
| JP | 2012526302 A | 10/2012 |
| JP | 2014032404 A | 2/2014 |
| JP | 2014153710 A | 8/2014 |
| JP | 2014238606 A | 12/2014 |
| JP | 2015102870 A | 6/2015 |
| JP | 2017058668 A | 3/2017 |
| TW | 201237502 A | 9/2012 |
| TW | 201242942 A | 11/2012 |
| TW | 201243427 A | 11/2012 |
| TW | 201307942 A | 2/2013 |
| TW | 201410265 A | 3/2014 |
| TW | 201445213 A | 12/2014 |
| TW | 201447419 A | 12/2014 |
| WO | 2004063795 A1 | 7/2004 |
| WO | 2005016617 A1 | 2/2005 |
| WO | 2007/146673 A2 | 12/2007 |
| WO | 2008078804 A1 | 7/2008 |
| WO | 2010019397 A2 | 2/2010 |
| WO | 2011045376 A1 | 4/2011 |
| WO | 2013101793 A1 | 7/2013 |
| WO | 2014089612 A1 | 6/2014 |
| WO | 2014177871 A1 | 11/2014 |
| WO | 2014198972 A1 | 12/2014 |

MULTIFOCAL CONTACT LENS AND CONTACT LENS PRODUCT

RELATED APPLICATIONS

This application is Continuation of application Ser. No. 16/445,395, filed Jun. 19, 2019, which is a Continuation of application Ser. No. 15/255,319, filed on Sep. 2, 2016, now U.S. Pat. No. 10,371,964 issued on Aug. 6, 2019, which claims priority to a Continuation-in-part of application Ser. No. 15/251,007, filed on Aug. 30, 2016, now U.S. Pat. No. 10,416,476 issued on Sep. 17, 2019, which claims priority to Taiwan Application Serial Number 104130460, filed Sep. 15, 2015, and Taiwan Application Serial Number 104135628, filed Oct. 29, 2015, which are incorporated by reference herein in its entirety.

BACKGROUND

Technical Field

The present disclosure relates to a contact lens product. More particularly, the present disclosure relates to a contact lens product which can prevent myopia or control a progression of myopia.

Description of Related Art

According to the data of World Health Organization (WHO), the prevalence of myopia in all world countries is between 8% and 62%. However, surveys show that the prevalence of myopia in teenagers and children under 18 years old in Taiwan is up to 85%, which is significantly beyond other countries. One reason is probably due to the highly developed 3C electronic devices in recent years, which results in improper stimuluses and overuse of eyes of young children prematurely. Current researches show that once young children suffer early-onset myopia, the degree of myopia will increase with a certain speed. Current researches further show that the lower the age at which the myopia occurs is, the higher probability of becoming high myopia (greater than or equal to 6.0 D) will be. A person suffering high myopia is more likely to further suffer serious complications, such as retinal detachment and glaucoma. Therefore, if a controlling or moderating method can be conducted when the pseudomyopia is observed in the young children, the pseudomyopia can be effectively prevented from becoming myopia, and the high myopia can be further prevented.

The main cause of myopia is a variation of the optical structure of eyeballs. The optical image is mainly affected by the factors, such as cornea, lens and the length of the eyeballs. As for a normal person, lights can be precisely focused on the retina thereof so as to obtain a clearly image. However, as for a person suffering myopia, lights are focused in front of the retina thereof due to an excessive diopter (refractive myopia) or an excessive axial length of the eyeball (axial myopia), so that a blurred image is obtained. Symptoms of myopia of young children can be divided into myopia and pseudomyopia, wherein the myopia occurs due to an excessive axial length of the eyeball and cannot be corrected. However, the pseudomyopia is a temporary symptom caused by excessive tension of ciliary muscle and can be corrected. Clinically, there are many methods for correcting children pseudomyopia. The main methods include wearing orthokeratology and applying long-acting mydriatics. However, the orthokeratology may result in a highly external pressure which makes the wearer uncomfortable. When applying the long-acting mydriatics alone, a higher concentration dose is usually required. Accordingly, the probability of drug side effects is enhanced, too.

SUMMARY

According to one aspect of the present disclosure, a contact lens product includes a multifocal contact lens and a buffer solution. The multifocal contact lens is immersed in the buffer solution. The multifocal contact lens includes a central region and at least one annular region. The annular region concentrically surrounds the central region, wherein a diopter of the annular region is different from a diopter of the central region. The multifocal contact lens is made of silicone hydrogel or hydrogel. The annular region closest to a periphery of the multifocal contact lens is a first annular region. When the diopter of the central region of the multifocal contact lens is PowC, a maximal diopter of the first annular region of the multifocal contact lens is PowP1, and the following condition is satisfied:

$$|PowC - PowP1| \leq 20 \text{ D}.$$

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
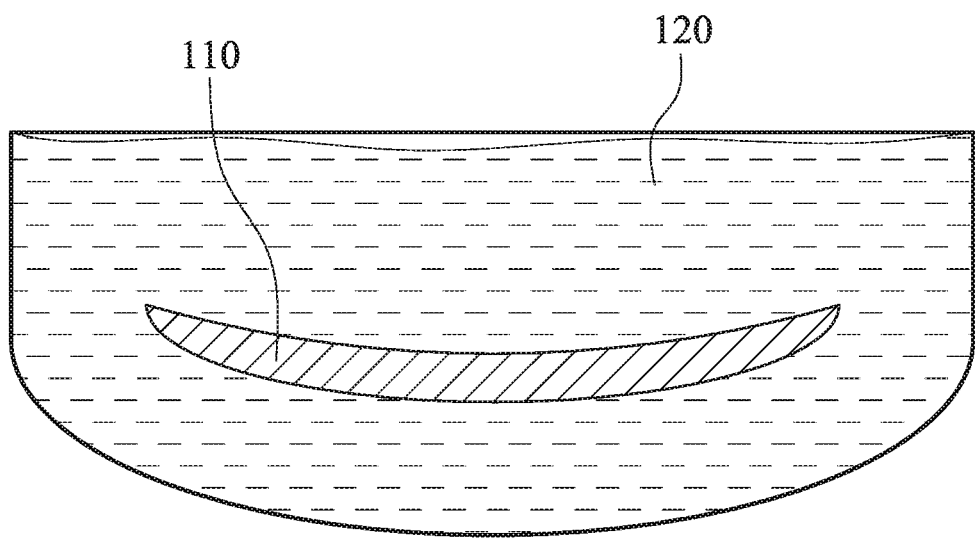
FIG. 1 is a schematic view of a contact lens product according to one embodiment of the present disclosure.

FIG. 1 is a schematic view of a contact lens product 100 according to one embodiment of the present disclosure. The contact lens product 100 includes a multifocal contact lens 110 and a buffer solution 120. The multifocal contact lens 110 is immersed in the buffer solution 120.

Figure 2:
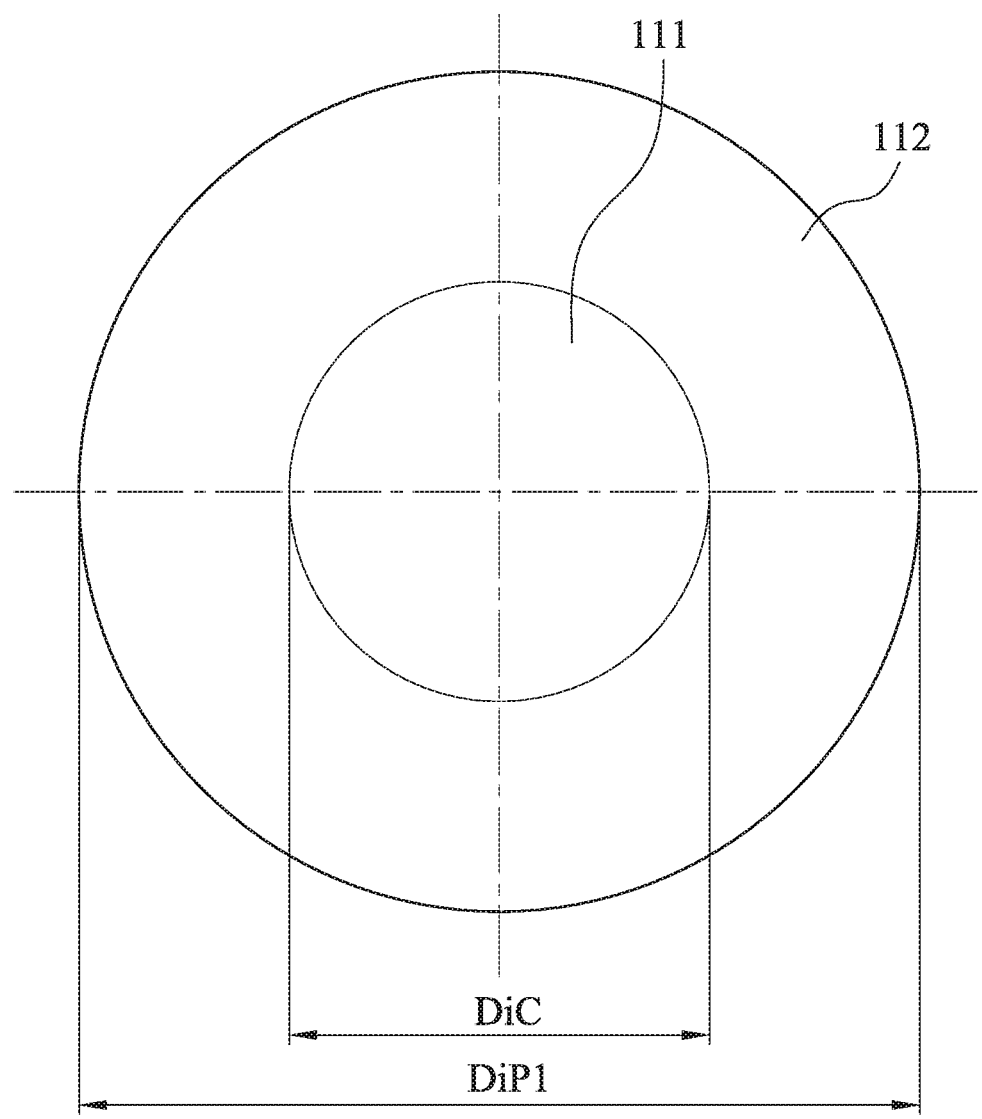
FIG. 2 is a schematic plan view of a multifocal contact lens in FIG. 1.

FIG. 2 is a schematic plan view of the multifocal contact lens 110 in FIG. 1. The multifocal contact lens 110 includes a central region 111 and a first annular region 112. The first annular region 112 concentrically surrounds the central region 111. A diopter of the first annular region 112 is different from a diopter of the central region 111. Therefore, the multifocal contact lens 110 is featured with multi-focus function, the peripheral image can be formed in front of the retina, which can moderate the increase of the axial length of the eyeball, and the exacerbation of myopia can be prevented. According to one example of the present disclosure, the diopter of the central region 111 is fixed.

At least one of the central region 111 and the first annular region 112 of the multifocal contact lens 110 is aspheric. Therefore, it is favorable to design the first annular region 112 with a gradient diopter.

Referring back to FIG. 1, the buffer solution 120 includes a cycloplegic agent. When a weight percentage concentration of the cycloplegic agent in the buffer solution 120 is ConA, the following condition is satisfied: $0 < \text{ConA} \le 1\%$. Therefore, the concentration of the cycloplegic agent is proper, which is favorable to relax the ciliary muscle and reduce the probability of drug side effects. Alternatively, the following condition can be satisfied: $0 < \text{ConA} \le 0.5\%$. Alternatively, the following condition can be satisfied: $0 < \text{ConA} \le 0.25\%$. Alternatively, the following condition can be satisfied: $0 < \text{ConA} \le 0.1\%$. Alternatively, the following condition can be satisfied: $0 < \text{ConA} \le 0.05\%$. Alternatively, the following condition can be satisfied: $0 < \text{ConA} \le 0.01\%$. The buffer solution 120 can be prepared by providing a basic solution, wherein the basic solution can be a commercially available solution for immersing and preserving contact lenses. Then the cycloplegic agent is added into the basic solution to a required concentration, wherein chemical reactions do not occur between the basic solution and the cycloplegic agent.

According to the aforementioned contact lens product 100, a composition for manufacturing the multifocal contact lens 110 can include a blue-light blocking agent. Therefore, the multifocal contact lens 110 can block high-energy blue lights, and the probability that the retina hurt by the blue lights can be reduced. According to one example of the present disclosure, the blue-light blocking agent can be 4-(phenyldiazenyl) phenyl methacrylate.

According to the aforementioned contact lens product 100, the composition for manufacturing the multifocal contact lens 110 can include a UV (Ultraviolet) blocking agent. The UV blocking agent can be but is limited to 2-[3-(2H-benzotriazol-2-yl)-4-hydroxyphenyl]ethyl methacrylate, 4-methacryloxy-2-hydroxybenzophenone, 2-phenylethyl acrylate, 2-phenylethyl methacrylate, 2-(2'-hydroxy-5'-methacryloxyethylphenyl)-2H-benzotriazole or 2-(4-benzoyl-3-hydroxyphenoxy)ethyl acrylate. Therefore, the multifocal contact lens 110 can block high-energy UV lights, and the probability that the retina hurt by the UV lights can be reduced. According to one example of the present disclosure, the UV blocking agent can be 2-(2'-hydroxy-5'-methacryloxyethylphenyl)-2H-benzotriazole. According to another example of the present disclosure, the UV blocking agent can be 2-(4-benzoyl-3-hydroxyphenoxy)ethyl acrylate. The aforementioned UV blocking agents can be used simultaneously or separately.

According to the aforementioned contact lens product 100, the multifocal contact lens 110 can be made of silicone hydrogel. Therefore, the oxygen permeability of the multifocal contact lens 110 can be enhanced, and the phenomena, such as red eyes, bloodshot eyes and swell, caused by the hypoxia of cornea can be prevented. Accordingly, the long wear comfort can be provided. The silicone hydrogel can be but is not limited to the contact lens material classified as Group V by U.S. FDA (U.S. Food and Drug Administration), such as Balafilcon A, Comfilcon A, Efrofilcon A, Enfilcon A, Galyfilcon A, Lotrafilcon A, Lotrafilcon B, Narafilcon A, Narafilcon B, Senofilcon A, Delefilcon A and Somofilcon A.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, ethylene glycol dimethacrylate, 3-(3-methacryloxy-2-hydroxypropoxy)propylbis(trimethylsiloxy)methylsilane, isopropyl alcohol and methacrylic acid.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the ethylene glycol dimethacrylate is 0.01% to 5%, the weight percentage concentration of the 3-(3-methacryloxy-2-hydroxypropoxy)propylbis(trimethylsiloxy)methylsilane is 0.1% to 30%, the weight percentage concentration of the isopropyl alcohol is 0.1% to 30%, and the weight percentage concentration of the methacrylic acid is 0.01% to 5%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy-2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the ethylene glycol dimethacrylate is 0.1% to 2%, the weight percentage concentration of the 3-(3-methacryloxy-2-hydroxypropoxy)propylbis(trimethylsiloxy)methylsilane is 1% to 30%, the weight percentage concentration of the isopropyl alcohol is 1% to 20%, and the weight percentage concentration of the methacrylic acid is 0.1% to 2%.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, ethylene glycol dimethacrylate, (3-acryloxy-2-hydroxypropoxypropyl)terminated polydimethylsiloxane and 1-hexanol.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the ethylene glycol dimethacrylate is 0.01% to 5%, the weight percentage concentration of the (3-acryloxy-2-hydroxypropoxypropyl)terminated polydimethylsiloxane is 0.1% to 40%, and the weight percentage concentration of the 1-hexanol is 0.1% to 30%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy-2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the ethylene glycol dimethacrylate is 0.1% to 2%, the weight percentage concentration of the (3-acryloxy-2-hydroxypropoxypropyl)terminated polydimethylsiloxane is 1% to 40%, and the weight percentage concentration of the 1-hexanol is 1% to 30%.

The composition for manufacturing the silicone hydrogel can include 2-hydroxyethyl methacrylate, 3-methacryloyloxypropyltris(trimethylsilyloxy)silane, 2-hydroxy-2-methyl-propiophenone, N-vinyl-2-pyrrolidinone, N,N-dimethyl acrylamide, polysiloxane macromer, methyl methacrylate and ethanol.

Preferably, a weight percentage concentration of the ingredients of the composition for manufacturing the silicone hydrogel can be as follows. The weight percentage concentration of the 2-hydroxyethyl methacrylate is 0.05% to 25%, the weight percentage concentration of the 3-methacryloyloxypropyltris(trimethylsilyloxy)silane is 0.1% to 40%, the weight percentage concentration of the 2-hydroxy-2-methyl-propiophenone is 0.01% to 5%, the weight percentage concentration of the N-vinyl-2-pyrrolidinone is 0.1% to 35%, the weight percentage concentration of the N,N-dimethyl acrylamide is 0.1% to 40%, the weight percentage concentration of the polysiloxane macromer is 0.1% to 40%, the weight percentage concentration of the methyl methacrylate is 0.1% to 20%, and the weight percentage concentration of the ethanol is 0.1% to 30%.

More preferably, the weight percentage concentration of the ingredients of the composition for manufacturing the silicone hydrogel can be as follows. The weight percentage concentration of the 2-hydroxyethyl methacrylate is 0.1% to 10%, the weight percentage concentration of the 3-methacryloyloxypropyltris(trimethylsilyloxy)silane is 1% to 40%, the weight percentage concentration of the 2-hydroxy-2-methyl-propiophenone is 0.1% to 2%, the weight percentage concentration of the N-vinyl-2-pyrrolidinone is 1% to 35%, the weight percentage concentration of the N,N-dimethyl acrylamide is 1% to 20%, the weight percentage concentration of the polysiloxane macromer is 1% to 40%, the weight percentage concentration of the methyl methacrylate is 1% to 10%, and the weight percentage concentration of the ethanol is 1% to 20%.

According to one example of the present disclosure, the composition for manufacturing the silicone hydrogel can further include a blue-light blocking agent or a UV blocking agent. Preferably, the weight percentage concentration of the blue-light blocking agent or the UV blocking agent of the composition for manufacturing the silicone hydrogel is 0.01% to 10%. More preferably, the weight percentage concentration of the blue-light blocking agent or the UV blocking agent for manufacturing the composition of the silicone hydrogel is 0.1% to 5%.

By adjusting the ratio of the ingredients of the composition for manufacturing the silicone hydrogel, an oxygen permeability and a hardness of the multifocal contact lens 110 can be effectively enhanced. Furthermore, the composition for manufacturing the silicone hydrogel can selectively include other ingredients according to practical needs.

According to the aforementioned contact lens product 100, the multifocal contact lens 110 can be made of hydrogel. Therefore, the moisture, smoothness and softness of the multifocal contact lens 110 can be maintained, and is capable of long wear. Furthermore, the foreign body sensation can be avoided when wearing the multifocal contact lens 110. The hydrogel can be but is not limited to the contact lens material classified as Group I by U.S. FDA, i.e., nonionic polymers having a low moisture content (less than 50 wt %), such as Helfilcon A&B, Hioxifilcon B, Mafilcon, Polymacon, Tefilcon and Tetrafilcon A. Alternatively, the hydrogel can be but is not limited to the contact lens material classified as Group I by U.S. FDA, i.e., nonionic polymers having a high moisture content (greater than 50 wt %), such as Acofilcon A, Alfafilcon A, Hilafilcon B, Hioxifilcon A, Hioxifilcon B, Hioxifilcon D, Nelfilcon A, Nesofilcon A, Omafilcon A and Samfilcon A. Alternatively, the hydrogel can be but is not limited to the contact lens material classified as Group III by U.S. FDA, i.e., ionic polymers having a low moisture content (less than 50 wt %), such as Deltafilcon A. Alternatively, the hydrogel can be but is not limited to the contact lens material classified as Group IV by U.S. FDA, i.e., ionic polymers having a high moisture content (greater than 50 wt %), such as Etafilcon A, Focofilcon A, Methafilcon A, Methafilcon B, Ocufilcon A, Ocufilcon B, Ocufilcon C, Ocufilcon D, Ocufilcon E, Phemfilcon A and Vifilcon A.

The composition for manufacturing the hydrogel can include 2-hydroxyethyl methacrylate, ethylene glycol dimethacrylate, 2-hydroxy-2-methyl-propiophenone, glycerol, 1,1,1-trimethylol propane trimethacrylate and methacrylic acid.

Preferably, a weight percentage concentration of the ingredients of the composition for manufacturing the hydrogel can be as follows. The weight percentage concentration of the 2-hydroxyethyl methacrylate is 10% to 96%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, the weight percentage concentration of the 1,1,1-trimethylol propane trimethacrylate is 0.01% to 5%, and the weight percentage concentration of the methacrylic acid is 0.01% to 5%.

More preferably, the weight percentage concentration of the ingredients of the composition for manufacturing the hydrogel can be as follows. The weight percentage concentration of the 2-hydroxyethyl methacrylate is 40% to 96%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 0.1% to 20%, the weight percentage concentration of the 1,1,1-trimethylol propane trimethacrylate is 0.1% to 2%, and the weight percentage concentration of the methacrylic acid is 0.1% to 2%.

The composition for manufacturing the hydrogel can include 2-hydroxyethyl methacrylate, ethylene glycol dimethacrylate, 2-hydroxy-2-methyl-propiophenone, glycerol, 1,1,1-trimethylol propane trimethacrylate and glycerol monomethacrylate.

Preferably, a weight percentage concentration of the ingredients of the composition for manufacturing the hydrogel can be as follows. The weight percentage concentration of the 2-hydroxyethyl methacrylate is 10% to 94.87%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, the weight percentage concentration of the 1,1,1-trimethylol propane trimethacrylate is 0.01% to 5%, and the weight percentage concentration of the glycerol monomethacrylate is 5% to 60%.

More preferably, the weight percentage concentration of the ingredients of the composition for manufacturing the hydrogel can be as follows. The weight percentage concentration of the 2-hydroxyethyl methacrylate is 40% to 79.6%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 0.1% to 20%, the weight percentage concentration of the 1,1,1-trimethylol propane trimethacrylate is 0.1% to 2%, and the weight percentage concentration of the glycerol monomethacrylate is 20% to 50%.

The composition for manufacturing the hydrogel can include 2-hydroxyethyl methacrylate, ethylene glycol dimethacrylate, 2-hydroxy-2-methyl-propiophenone, glycerol and N-vinyl-2-pyrrolidinone.

Preferably, a weight percentage concentration of the ingredients of the composition for manufacturing the hydrogel can be as follows. The weight percentage concentration of the 2-hydroxyethyl methacrylate is 10% to 96%, the weight percentage concentration of the ethylene glycol dimethacrylate is 0.01% to 5%, the weight percentage concentration of the 2-hydroxy-2-methyl-propiophenone is 0.01% to 5%, the weight percentage concentration of the glycerol is 0.1% to 30%, and the weight percentage concentration of the N-vinyl-2-pyrrolidinone is 0.1% to 25%.

More preferably, the weight percentage concentration of the ingredients of the composition for manufacturing the hydrogel can be as follows. The weight percentage concentration of the 2-hydroxyethyl methacrylate is 40% to 96%, the weight percentage concentration of the ethylene glycol dimethacrylate is 0.1% to 2%, the weight percentage concentration of the 2-hydroxy-2-methyl-propiophenone is 0.1% to 2%, the weight percentage concentration of the glycerol is 1% to 20%, and the weight percentage concentration of the N-vinyl-2-pyrrolidinone is 0.1% to 10%.

According to one example of the present disclosure, the composition for manufacturing the hydrogel can further include a blue-light blocking agent or a UV blocking agent. Preferably, a weight percentage concentration of the blue-light blocking agent or the UV blocking agent of the composition for manufacturing the hydrogel is 0.01% to 10%. More preferably, the weight percentage concentration of the blue-light blocking agent or the UV blocking agent for manufacturing the composition of the hydrogel is 0.1% to 5%.

By adjusting the ratio of the ingredients of the composition for manufacturing the hydrogel, a moisture content and a softness of the multifocal contact lens 110 can be effectively enhanced. Furthermore, the composition for manufacturing the hydrogel can selectively include other ingredients according to practical needs. The monomers used in the composition for manufacturing the hydrogel and the monomers used in the composition for silicone hydrogel, such as 2-hydroxyethyl methacrylate, methacrylic acid, glycerol monomethacrylate, N-vinyl-2-pyrrolidinone, 3-methacryloyloxypropyltris(trimethylsilyloxy)silane, N,N-dimethyl acrylamide, 3-(3-methacryloxy-2-hydroxypropoxy)propylbis(trimethylsiloxy)methylsilane, (3-acryloxy-2-hydroxypropoxypropyl)terminated polydimethylsiloxane and methyl methacrylate can be interchanged according to practical needs.

Referring back to FIG. 2, when a diameter of the central region 111 of the multifocal contact lens 110 is DiC, the following condition can be satisfied: 4 mm≤DiC≤10 mm. Therefore, the diameter can be flexibly adjusted according to the pupil size of different physiological states, so that the accuracy for correcting myopia provided by the central region 111 can be enhanced, and the sight can be completely and clearly focused on retina. Preferably, the following condition can be satisfied: 5 mm≤DiC≤9 mm.

When an outer diameter of the first annular region 112 of the multifocal contact lens 110 is DiP1, the following condition can be satisfied: 6 mm≤DiP1≤17 mm. Therefore, the outer diameter can be flexibly adjusted according to the size of palpebral fissure, so that a proper comfort and fitness of the multifocal contact lens 110 can be provided, and the wearing stability of the multifocal contact lens 110 can be enhanced. Preferably, the following condition can be satisfied: 7 mm≤DiP1≤15 mm.

When the diameter of the central region 111 of the multifocal contact lens 110 is DiC, and the outer diameter of the first annular region 112 of the multifocal contact lens 110 is DiP1, the following condition can be satisfied: 0.15≤DiC/DiP1<1. Therefore, the value of DiC/DiP1 is proper, which is favorable to design the multifocal contact lens 110 according to the physiological state of individual eyeball. Accordingly, it is favorable to correct myopia.

When a diopter of the central region 111 of the multifocal contact lens 110 is PowC, the following condition can be satisfied: −6.00 D≤PowC≤−0.25 D. Therefore, a proper correction for myopia can be provided according to the need of users. Accordingly, a clear image can be provided.

When a maximal diopter of the first annular region 112 of the multifocal contact lens 110 is PowP1, the following condition can be satisfied: −5.50 D≤PowP1≤−0.50 D. Therefore, the maximal diopter of the first annular region 112 can be properly designed, which is favorable to correct myopia.

When the diopter of the central region 111 of the multifocal contact lens 110 is PowC, and the maximal diopter of the first annular region 112 of the multifocal contact lens 110 is PowP1, the following condition is satisfied: |PowC−PowP1|≤20 D. Therefore, it is favorable to correct myopia. Furthermore, the increase degree of the diopter of the first annular region 112 can be moderated, so that the discomfort resulted from the excessive increase degree of the diopter can be avoided. Alternatively, the following condition can be satisfied: |PowC−PowP1|≤12 D. Alternatively, the following condition can be satisfied: |PowC−PowP1|≤10 D. Alternatively, the following condition can be satisfied: |PowC−PowP1|≤5 D. Alternatively, the following condition can be satisfied: |PowC−PowP1|≤3 D. Alternatively, the following condition can be satisfied: |PowC−PowP1|≤2 D. Alternatively, the following condition can be satisfied: |PowC−PowP1|≤1.5 D. Alternatively, the following condition can be satisfied: |PowC−PowP1|≤1 D. Alternatively, the following condition can be satisfied: |PowC−PowP1|≤0.5 D. Alternatively, the following condition can be satisfied: |PowC−PowP1|≤0.25 D.

Each of the annular regions (112) includes a maximal diopter, when a maximum of all the maximal diopters is PowPMax, the following condition can be satisfied: 0 D≤PowPMax≤20 D. Therefore, the diopter distribution of the annular region (112) can be designed according to the state of the user for controlling the myopia. When the diopter is stronger, the correction effect of vision control can be enhanced. Furthermore, the diopter can be adjusted at different treatment periods and according to different states. Alternatively, the following condition can be satisfied: 0 D≤PowPMax≤18 D. Alternatively, the following condition can be satisfied: 0.5 D≤PowPMax≤16 D. Alternatively, the following condition can be satisfied: 1.0 D≤PowPMax≤15 D. Alternatively, the following condition can be satisfied: 2.0 D≤PowPMax≤10 D.

Each of the annular regions (112) includes a maximal diopter, when a minimum of all the maximal diopters is PowPMin, the following condition can be satisfied: −8 D≤PowPMin≤15 D. Therefore, the diopter distribution of the annular region (112) can be designed according to the state of the user for controlling the myopia. When the diopter is more moderate, a buffer effect can be provided, so that a visual comfort can be enhanced and the correction effect of the vision control can be maintained. Alternatively, the following condition can be satisfied: −6 D≤PowPMin≤15 D. Alternatively, the following condition can be satisfied: −4 D≤PowPMin≤13 D. Alternatively, the following condition can be satisfied: −2 D≤PowPMin≤12 D. Alternatively, the following condition can be satisfied: 0 D≤PowPMin≤11 D. Alternatively, the following condition can be satisfied: 0 D≤PowPMin≤10 D.

Specifically, in the embodiment, the multifocal contact lens 110 only includes an annular region, i.e. the first annular region 112, the maximum of all the maximal diopter equals to the maximal diopter of the first annular region 112 of the multifocal contact lens 110 (i.e., PowPMax=PowP1), and the minimum of all the maximal diopter also equals to the maximal diopter of the first annular region 112 of the multifocal contact lens 110 (i.e., PowPMin=PowP1). In other embodiments, the multifocal contact lens can include a plurality of annular regions. For example, the multifocal contact lens can include two annular regions, from a center to a periphery, a second annular region and a first annular region, wherein a maximal diopter of the first annular region of the multifocal contact lens is PowP1 and a maximal diopter of the second annular region of the multifocal contact lens is PowP2. When PowP2 is greater than PowP1, a maximum of all the maximal diopters equals to the maximal diopter of the second annular region of the multifocal contact lens (i.e., PowPMax=PowP2), and a minimum of all the maximal diopters equals to the maximal diopter of the first annular region of the multifocal contact lens (i.e., PowPMin=PowP1). Alternatively, when PowP1 is greater than PowP2, the maximum of all the maximal diopters equals to the maximal diopter of the first annular region of the multifocal contact lens (i.e., PowPMax=PowP1), and the minimum of all the maximal diopters equals to the maximal diopter of the second annular region of the multifocal contact lens (i.e., PowPMin=PowP2). For further example, the multifocal contact lens can include three annular regions, from a center to a periphery, a third annular region, a second annular region and a first annular region, wherein a maximal diopter of the first annular region of the multifocal contact lens is PowP1, a maximal diopter of the second annular region of the multifocal contact lens is PowP2, and a maximal diopter of the third annular region of the multifocal contact lens is PowP3. When PowP3 is greater than PowP1, and PowP1 is greater than PowP2, the maximum of all the maximal diopters equals to the maximal diopter of the third annular region of the multifocal contact lens (i.e., PowPMax=PowP3), and the minimum of all the maximal diopters equals to the maximal diopter of the second annular region of the multifocal contact lens (i.e., PowPMin=PowP2). When the multifocal contact lens includes more annular regions, PowPMax and PowPMin can be decided in the same manner. Moreover, the naming rule for the maximal diopter of the annular region of the multifocal contact lens can be as follows: the maximal diopter of the first annular region of the multifocal contact lens is PowP1, the maximal diopter of the second annular region of the multifocal contact lens is PowP2, the maximal diopter of the third annular region of the multifocal contact lens is PowP3, the maximal diopter of the four annular region of the multifocal contact lens is PowP4, the maximal diopter of the fifth annular region of the multifocal contact lens is PowP5, and so on.

Each of the annular regions (112) includes the maximal diopter, when the maximum of all the maximal diopters is PowPMax, and the minimum of all the maximal diopters is PowPMin, the following condition can be satisfied: $-8.0 \leq \text{PowPMin/PowPMax} \leq 1.0$. Therefore, it is favorable to balance the correction effect of vision control and the visual comfort. Alternatively, the following condition can be satisfied: $-6.0 \leq \text{PowPMin/PowPMax} \leq 1.0$. Alternatively, the following condition can be satisfied: $-5.0 \leq \text{PowPMin/PowPMax} \leq 0.9$. Alternatively, the following condition can be satisfied: $-4.0 \leq \text{PowPMin/PowPMax} \leq 0.8$. Alternatively, the following condition can be satisfied: $-3.0 \leq \text{PowPMin/PowPMax} \leq 0.7$. Alternatively, the following condition can be satisfied: $-2.5 \leq \text{PowPMin/PowPMax} \leq 0.6$.

Each of the annular regions (112) includes the maximal diopter, when the maximum of all the maximal diopters is PowPMax, and the diopter of the central region 111 of the multifocal contact lens 110 is PowC, the following condition can be satisfied: $0.10 \leq |\text{PowPMax}-\text{PowC}|/\text{PowPMax} \leq 10$. Therefore, it is favorable to properly design the diopter according to the myopia degree and the treatment period of the user. Alternatively, the following condition can be satisfied: $0.25 \leq |\text{PowPMax}-\text{PowC}|/\text{PowPMax} \leq 9$. Alternatively, the following condition can be satisfied: $0.25 \leq |\text{PowPMax}-\text{PowC}|/\text{PowPMax} \leq 8$. Alternatively, the following condition can be satisfied: $0.50 \leq |\text{PowPMax}-\text{PowC}|/\text{PowPMax} \leq 7$. Alternatively, the following condition can be satisfied: $0.50 \leq |\text{PowPMax}-\text{PowC}|/\text{PowPMax} \leq 6$. Alternatively, the following condition can be satisfied: $1.00 \leq |\text{PowPMax}-\text{PowC}|/\text{PowPMax} \leq 5$.

Each of the annular regions (112) includes an absolute value of a slope, when a maximum of all the absolute values of the slopes is SloPMax, the following condition can be satisfied: $0.5 \leq \text{SloPMax} \leq 20$. Therefore, the change of the diopter of the annular region (112) is more significant, which can enhance the correction effect of vision control. Alternatively, the following condition can be satisfied: $0.5 \leq \text{SloPMax} \leq 15$. Alternatively, the following condition can be satisfied: $0.8 \leq \text{SloPMax} \leq 13$. Alternatively, the following condition can be satisfied: $0.8 \leq \text{SloPMax} \leq 10$. Alternatively, the following condition can be satisfied: $1.0 \leq \text{SloPMax} \leq 8$. Alternatively, the following condition can be satisfied: $1.0 \leq \text{SloPMax} \leq 6$.

Each of the annular regions (112) includes the absolute value of the slope, when a minimum of all the absolute values of the slopes is SloPMin, the following condition can be satisfied: $0 \leq \text{SloPMin} \leq 10$. Therefore, the change of the diopter of the annular region (112) is more moderate, which can maintain the stability and the durability of the molding of the multifocal contact lens 110, and can provide the visual comfort at the same time. Alternatively, the following condition can be satisfied: $0 \leq \text{SloPMin} \leq 8$. Alternatively, the following condition can be satisfied: $0 \leq \text{SloPMin} \leq 6$. Alternatively, the following condition can be satisfied: $0.1 \leq \text{SloPMin} \leq 5$. Alternatively, the following condition can be satisfied: $0.1 \leq \text{SloPMin} \leq 4$. Alternatively, the following condition can be satisfied: $0.1 \leq \text{SloPMin} \leq 3$.

Specifically, in the embodiment, the multifocal contact lens 110 only includes an annular region, i.e. the first annular region 112. A slope of the first annular region 112 is SloP1. That is, the first annular region 112 includes an absolute value of the slope represented as |SloP1|. Therefore, a maximum of all the absolute value of the slope equals to the absolute value of the slope of the first annular region 112 (i.e., SloPMax=|SloP1|), and a minimum of all the absolute value of the slope also equals to the absolute value of the slope of the first annular region 112 (i.e., SloPMin=|SloP1|). In other embodiments, the multifocal contact lens can include a plurality of annular regions. For example, the multifocal contact lens can include two annular regions, from a center to a periphery, a second annular region and a first annular region, wherein a slope of the second annular region is SloP2, and an absolute value thereof is |SloP2|. The definitions of SloP1 and |SloP1| are previously described and will not be repeated herein. When SloP2 is greater than |SloP1|, a maximum of all the absolute values of the slopes equals to the absolute value of the slope of the second annular region (i.e., SloPMax=|SloP2|), and a minimum of all the absolute values of the slopes equals to the absolute value of the slope of the first annular region (i.e., SloPMin=|SloP1|). Alternatively, when |SloP1| is greater than |SloP2|, the maximum of all the absolute values of the slopes equals to the absolute value of the slope of the first annular region (i.e., SloPMax=|SloP1|), and a minimum of all the absolute values of the slopes equals to the absolute value of the slope of the second annular region (i.e., SloPMin=|SloP2|). For further example, the multifocal contact lens can include three annular regions, from a center to a periphery, a third annular region, a second annular region and a first annular region, wherein a slope of the third annular region is SloP3, and an absolute value thereof is |SloP3|. The definitions of SloP2, |SloP2|, SloP1 and |SloP1| are previously described and will not be repeated herein. When |SloP3| is greater than |SloP1|, and |SloP1| is greater than |SloP2|, the maximum of all the absolute values of the slopes equals to the absolute value of the slope of the third annular region (i.e., SloPMax=|SloP3|), and the minimum of all the absolute values of the slopes equals to the absolute value of the slope of the second annular region (i.e., SloPMin=|SloP2|). When the multifocal contact lens includes more annular regions, SloPMax and SloPMin can be decided in the same manner. Moreover, the naming rule for the slope of the annular region of the multifocal contact lens can be as follows: the slope of the first annular region is SloP1, the slope of the second annular region is SloP2, the slope of the third annular region is SloP3, a slope of the fourth annular region is SloP4, the slope of the fifth annular region is SloP5, and so on.

Each of the annular regions (112) includes the absolute value of the slope, when the maximum of all the absolute values of the slopes is SloPMax, and the minimum of all the absolute values of the slopes is SloPMin, the following condition is satisfied: $0 \leq \text{SloPMin/SloPMax} \leq 1.0$. Therefore, it is favorable to properly evaluate and design the change degree of the diopter and the number of the annular region (112), which can maintain the stability and the durability of the molding of the multifocal contact lens 110 at the same time. Accordingly, a thickness of the multifocal contact lens 110 is neither too thin to break, nor too thick to cause foreign body sensation. Alternatively, the following condition can be satisfied: $0.01 \leq \text{SloPMin/SloPMax} \leq 1.0$. Alternatively, the following condition can be satisfied: $0.01 \leq \text{SloPMin/SloP-}$ Max≤0.9. Alternatively, the following condition can be satisfied: 0.02≤SloPMin/SloPMax≤0.8. Alternatively, the following condition can be satisfied: 0.02≤SloPMin/SloPMax≤0.7.

When a slope of the annular region (112) of the multifocal contact lens 110 is SloP, the following condition is satisfied: 0≤|SloP|≤20. Therefore, it is favorable to properly design the number of the annular region (112) and the change degree of the diopter, which can balance the correction effect of vision control and visual comfort. Alternatively, the following condition can be satisfied: 0≤|SloP|≤15. Alternatively, the following condition can be satisfied: 0.1≤|SloP|≤13. Alternatively, the following condition can be satisfied: 0.1≤|SloP|≤10. Alternatively, the following condition can be satisfied: 0≤|SloP|≤8. Alternatively, the following condition can be satisfied: 1<|SloP|≤7. Alternatively, the following condition can be satisfied: 3≤|SloP|≤6. Alternatively, the following condition can be satisfied: 6≤|SloP|≤14. Alternatively, the following condition can be satisfied: 6≤|SloP|≤12.

As mentioned above, the naming rule for the slope of the annular region of the multifocal contact lens can be as follows: the slope of the first annular region is SloP1, the slope of the second annular region is SloP2, the slope of the third annular region is SloP3, a slope of the fourth annular region is SloP4, the slope of the fifth annular region is SloP5, and so on. That is, SloP is the general expression of SloP1, SloP2, SloP3, SloP4, SloP5, etc. In other words, the aforementioned conditions of SloP can be applied to SloP1, SloP2, SloP3, SloP4, SloP5, etc.

When a slope of the central region 111 of the multifocal contact lens 110 is SloC, the following condition can be satisfied: 0≤|SloC|≤0.10. Therefore, the slope of the central region 111 is close to zero or is zero, which shows that the central region 111 can correct myopia with a constant diopter. In theory, a design value of the slope of the central region 111 is zero. However, an error may exist between the design value and the actual measured value, so that the actual value of the slope of the central region 111 may be a value which is close to zero. Alternatively, the following condition can be satisfied: 0≤|SloC|≤0.08. Alternatively, the following condition can be satisfied: 0.0001≤|SloC|≤0.06. Alternatively, the following condition can be satisfied: 0.0005≤|SloC|≤0.04.

Figure 3:
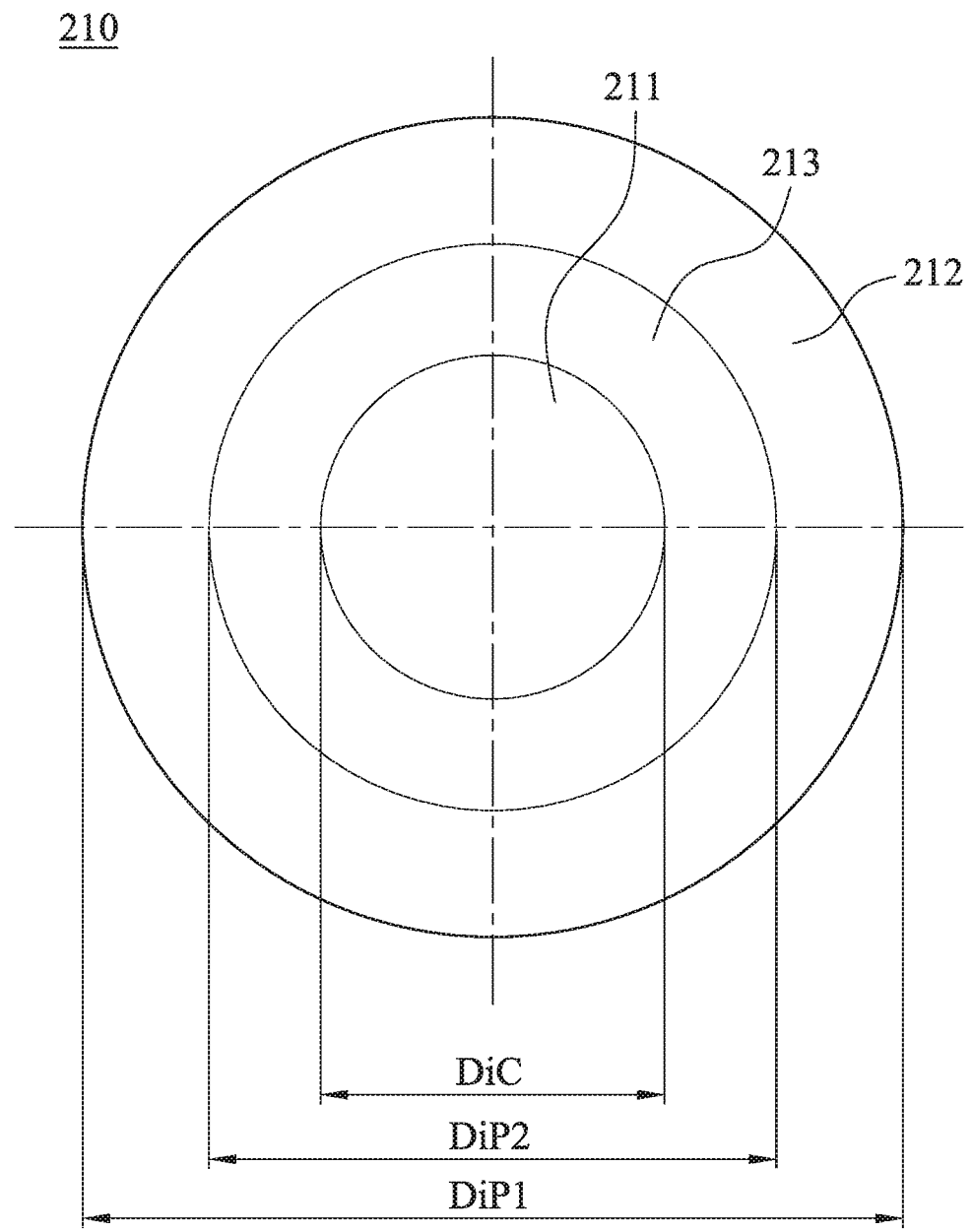
FIG. 3 is a schematic plan view of a multifocal contact lens according to another embodiment of the present disclosure.

FIG. 3 is a schematic plan view of a multifocal contact lens 210 according to another embodiment of the present disclosure. The multifocal contact lens 210 includes a central region 211, a first annular region 212 and a second annular region 213. The central region 211, the second annular region 213 and the first annular region 212 are sequentially connected from a center of the multifocal contact lens 210 to a periphery of the multifocal contact lens 210 and are concentric. A diameter of the central region 211 of the multifocal contact lens 210 is DiC, an outer diameter of the first annular region 212 of the multifocal contact lens 210 is DiP1, and an outer diameter of the second annular region 213 of the multifocal contact lens 210 is DiP2. A diopter of the second annular region 213 is different from a diopter of the central region 211, and a diopter of the first annular region 212 is different from a diopter of the central region 211. Therefore, the multifocal contact lens 210 is featured with multi-focus function, the peripheral sight can be focused in front of the retina, which can moderate the increase of the axial length of the eyeball, and the exacerbation of myopia can be prevented. According to one example of the present disclosure, the diopter of the central region 211 is fixed.

At least one of the central region 211, the first annular region 212 and the second annular region 213 of the multifocal contact lens 210 is aspheric. Therefore, it is favorable to design the first annular region 212 and/or the second annular region 213 with a gradient diopter.

When the outer diameter of the second annular region 213 of the multifocal contact lens 210 is DiP2, the following condition can be satisfied: 5 mm≤DiP2≤13 mm. Therefore, the increase degree of the diopter can be moderated. Preferably, the following condition can be satisfied: 6 mm≤DiP2≤12 mm.

When the diameter of the central region 211 of the multifocal contact lens 210 is DiC, and the outer diameter of the second annular region 213 of the multifocal contact lens 210 is DiP2, the following condition can be satisfied: 0.2≤DiC/DiP2<1. Therefore, the increase degree of the diopter of the second annular region 213 can be moderated, so that the discomfort resulted from the excessive increase degree of the diopter can be avoided.

The other properties of the multifocal contact lens 210 can be the same as that of the multifocal contact lens 110, and will not be repeated herein.

Figure 4:
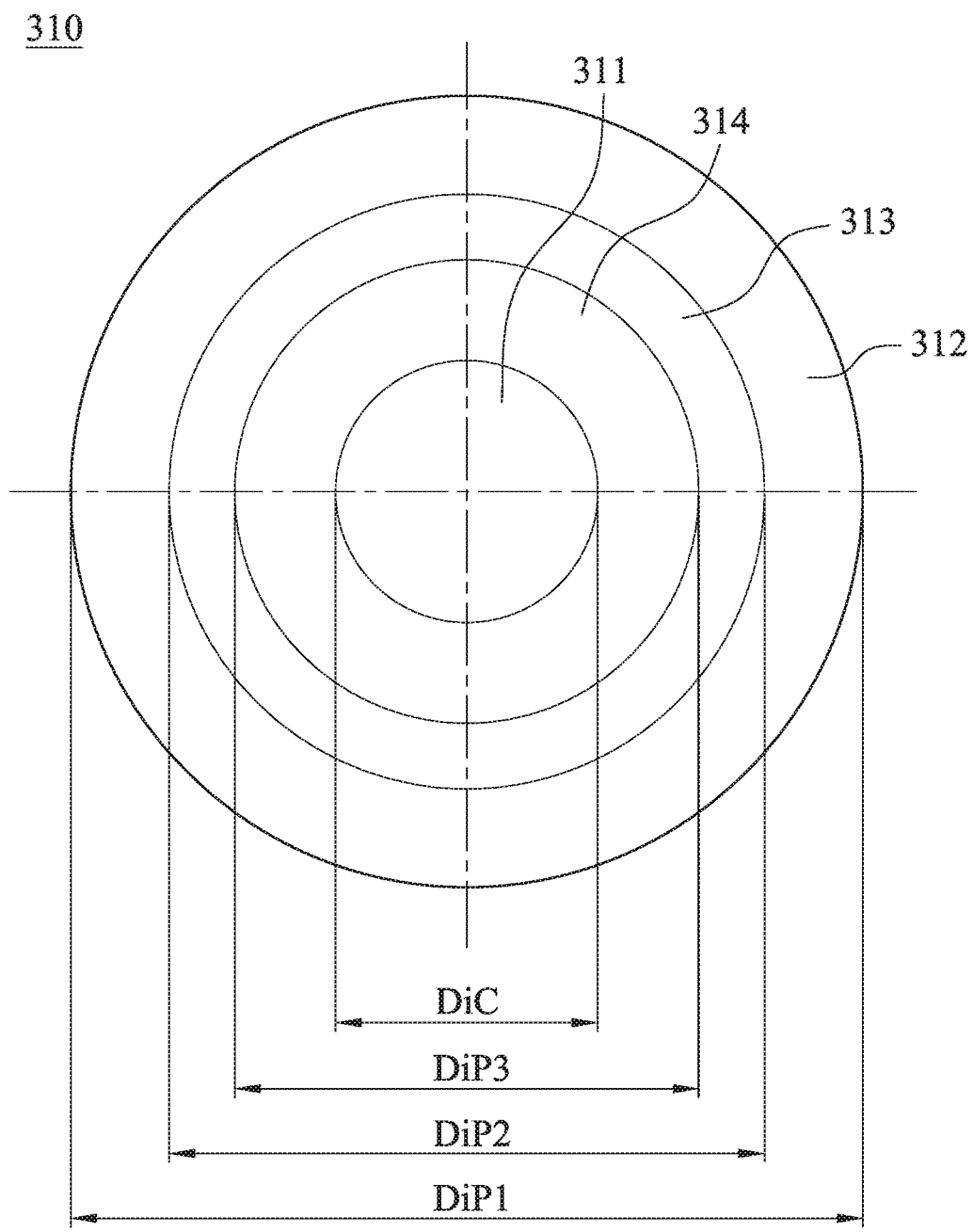
FIG. 4 is a schematic plan view of a multifocal contact lens according to yet another embodiment of the present disclosure.

FIG. 4 is a schematic plan view of a multifocal contact lens 310 according to yet another embodiment of the present disclosure. The multifocal contact lens 310 includes a central region 311, a first annular region 312, a second annular region 313 and a third annular region 314. The central region 311, the third annular region 314, the second annular region 313 and the first annular region 312 are sequentially connected from a center of the multifocal contact lens 310 to a periphery of the multifocal contact lens 310 and are concentric. A diameter of the central region 311 of the multifocal contact lens 310 is DiC, an outer diameter of the first annular region 312 of the multifocal contact lens 310 is DiP1, an outer diameter of the second annular region 313 of the multifocal contact lens 310 is DiP2, and an outer diameter of the third annular region 314 of the multifocal contact lens 310 is DiP3. A diopter of the third annular region 314 is different from a diopter of the central region 311, a diopter of the second annular region 313 is different from a diopter of the central region 311, and a diopter of the first annular region 312 is different from a diopter of the central region 311. Therefore, the multifocal contact lens 310 is featured with multi-focus function, the peripheral sight can be focused in front of the retina, which can moderate the increase of the axial length of the eyeball, and the exacerbation of myopia can be prevented. According to one example of the present disclosure, the diopter of the central region 311 is fixed.

As shown in FIGS. 2-4, the multifocal contact lens (110, 210, 310) according to the present disclosure can have at least one annular region (the first annular region (112, 212, 312), the second annular region (213, 313), the third annular region (314) concentrically surrounding the central region (111, 211, 311). The number and the diopter of the annular region can be flexibly adjusted according to the physiological state of individual eyeball, so that the effect of correcting myopia can be enhanced. Accordingly, the myopia can be effectively prevented or controlled.

Figure 22:
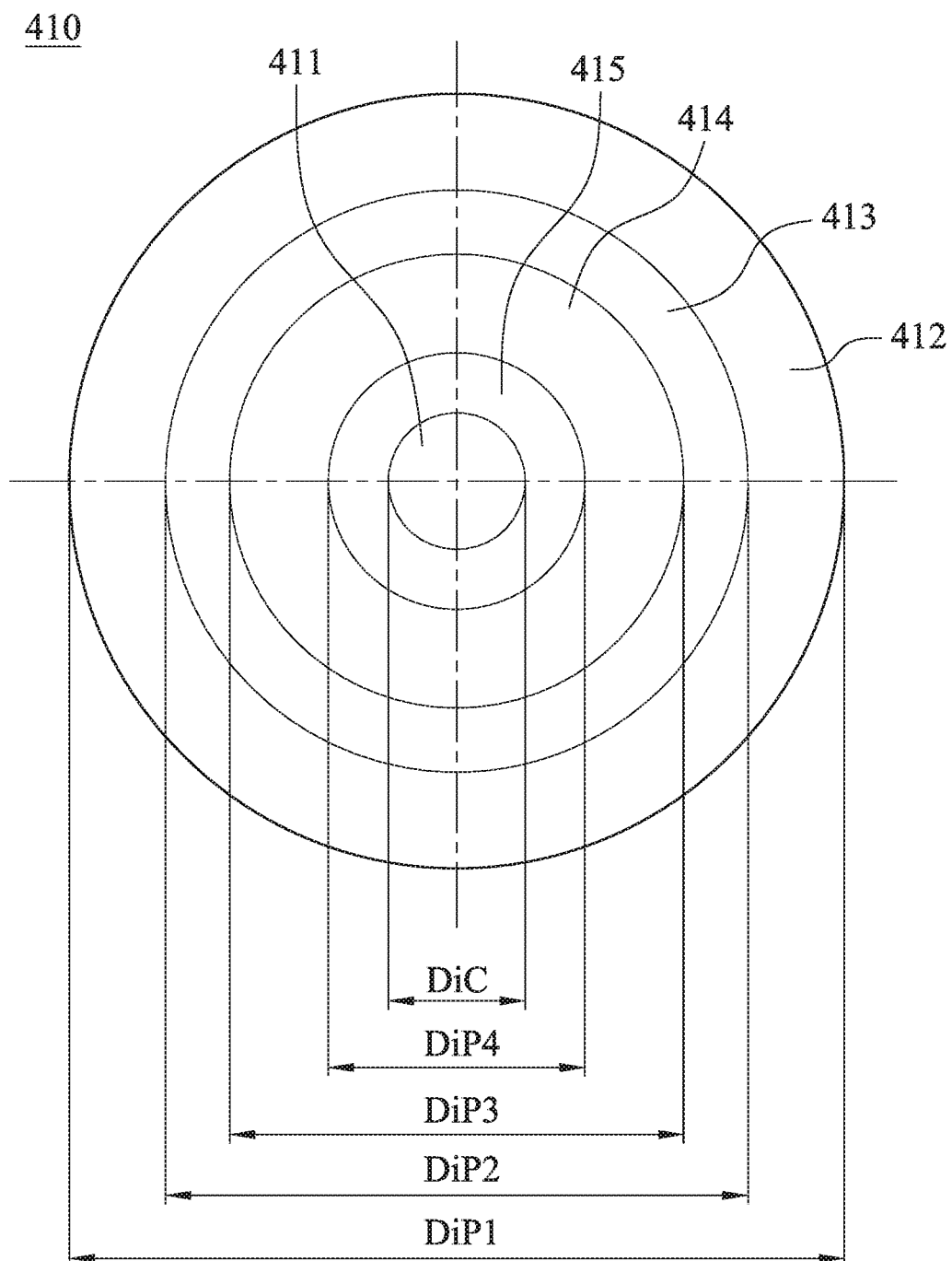
FIG. 22 is a schematic plan view of a multifocal contact lens according to further another embodiment of the present disclosure.

FIG. 22 is a schematic plan view of a multifocal contact lens 410 according to further another embodiment of the present disclosure. The multifocal contact lens 410 includes a central region 411, a first annular region 412, a second annular region 413, a third annular region 414, and a fourth annular region 415. The central region 411, the fourth annular region 415, the third annular region 414, the second annular region 413 and the first annular region 412 are sequentially connected from a center of the multifocal contact lens 410 to a periphery of the multifocal contact lens 410 and are concentric. A diameter of the central region 411 of the multifocal contact lens 410 is DiC, an outer diameter of the first annular region 412 of the multifocal contact lens 410 is DiP1, an outer diameter of the second annular region 413 of the multifocal contact lens 410 is DiP2, an outer diameter of the third annular region 414 of the multifocal contact lens 410 is DiP3, and an outer diameter of the fourth annular region 415 of the multifocal contact lens 410 is DiP4. A diopter of the fourth annular region 415 is different from a diopter of the central region 411, a diopter of the third annular region 414 is different from the diopter of the central region 411, a diopter of the second annular region 413 is different from the diopter of the central region 411, and a diopter of the first annular region 412 is different from the diopter of the central region 411. Therefore, the multifocal contact lens 410 is featured with multi-focus function.

Figure 23:
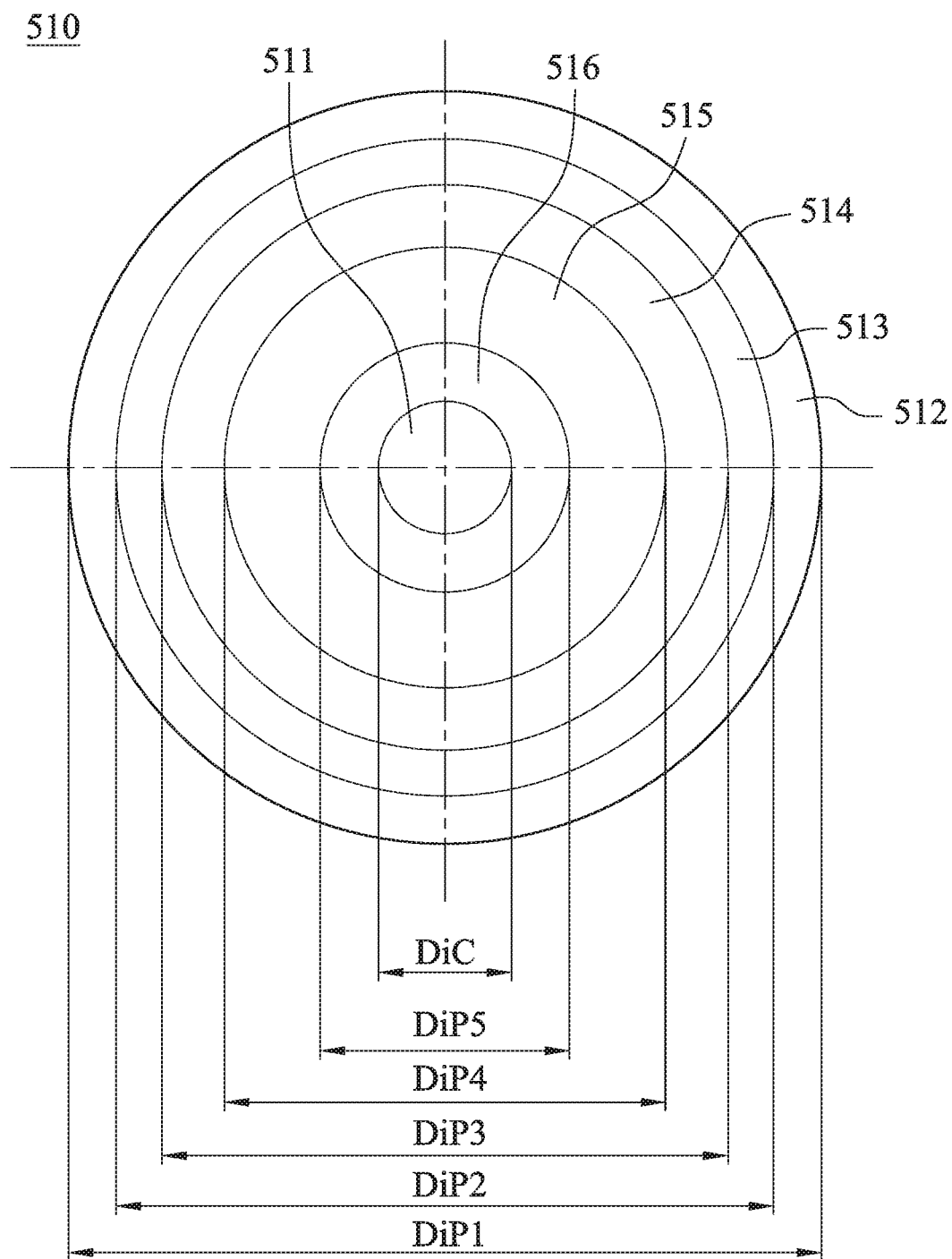
FIG. 23 is a schematic plan view of a multifocal contact lens according to further another embodiment of the present disclosure.

FIG. 23 is a schematic plan view of a multifocal contact lens 510 according to further another embodiment of the present disclosure. The multifocal contact lens 510 includes a central region 511, a first annular region 512, a second annular region 513, a third annular region 514, a fourth annular region 515, and a fifth annular region 516. The central region 511, the fifth annular region 516, the fourth annular region 515, the third annular region 514, the second annular region 513 and the first annular region 512 are sequentially connected from a center of the multifocal contact lens 510 to a periphery of the multifocal contact lens 510 and are concentric. A diameter of the central region 511 of the multifocal contact lens 510 is DiC, an outer diameter of the first annular region 512 of the multifocal contact lens 510 is DiP1, an outer diameter of the second annular region 513 of the multifocal contact lens 510 is DiP2, an outer diameter of the third annular region 514 of the multifocal contact lens 510 is DiP3, an outer diameter of the fourth annular region 515 of the multifocal contact lens 510 is DiP4, and an outer diameter of the fifth annular region 516 of the multifocal contact lens 510 is DiP5. A diopter of the fifth annular region 516 is different from a diopter of the central region 511, a diopter of the fourth annular region 515 is different from the diopter of the central region 511, a diopter of the third annular region 514 is different from the diopter of the central region 511, a diopter of the second annular region 513 is different from the diopter of the central region 511, and a diopter of the first annular region 512 is different from the diopter of the central region 511. Therefore, the multifocal contact lens 510 is featured with multi-focus function.

According to the present disclosure, another contact lens product is provided. The contact lens product includes a multifocal contact lens. A composition for manufacturing the multifocal contact lens includes a blue-light blocking agent. Therefore, the multifocal contact lens can block high-energy blue lights, and the probability that the retina hurt by the blue lights can be reduced. The details of the blue-light blocking agent, the material and other properties of the multifocal contact lens can refer to the content of FIGS. 1-4, and will not be repeated herein.

1st Example

In the 1st example, a multifocal contact lens includes a central region and a first annular region. The first annular region concentrically surrounds the central region. At least one of the central region and the first annular region is aspheric. The structure of the multifocal contact lens of the 1st example can refer to FIG. 2.

In the multifocal contact lens of the 1st example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 1st example are listed in Table 1.

TABLE 1

| 1st example | | | |
|---|---|---|---|
| DiC (mm) | 5.00 | PowC (D) | −0.25 |
| DiP1 (mm) | 13.00 | PowP1 (D) | 0.25 |
| DiC/DiP1 | 0.38 | |PowC−PowP1| (D) | 0.50 |

Figure 5:
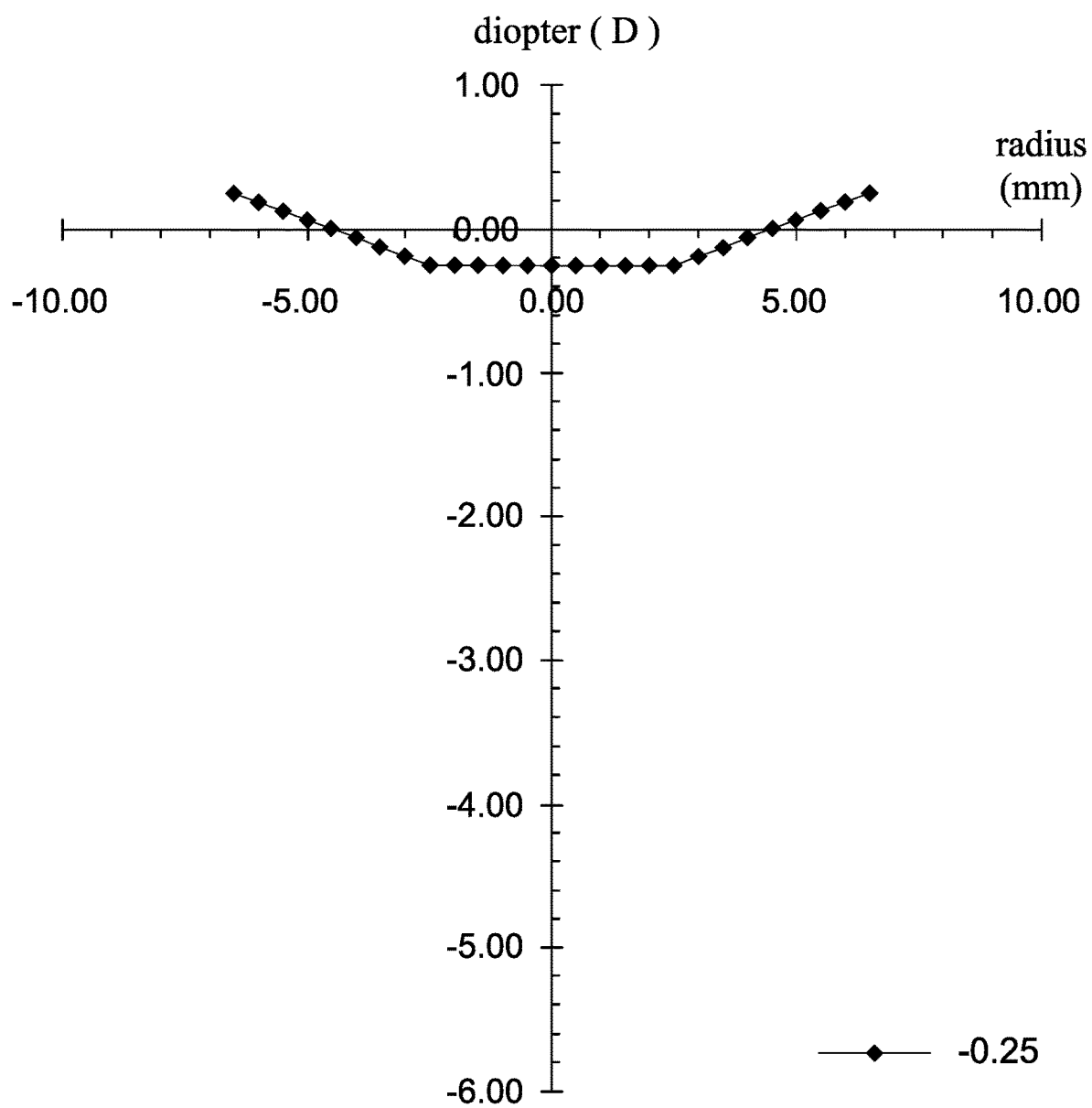
FIG. 5 shows a relationship between a radius and a diopter of a multifocal contact lens of the 1st example.

Please refer to Table 2 and FIG. 5 simultaneously, radiuses and the correspondent diopters of the multifocal contact lens of the 1st example are listed in Table 2. FIG. 5 shows a relationship between the radius and the diopter of the multifocal contact lens of the 1st example (the negative radius having an opposite direction with the positive radius). As shown in Table 2 and FIG. 5, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 2

| 1st example | |
|---|---|
| radius (mm) | diopter (D) |
| −6.50 | 0.25 |
| −6.00 | 0.19 |
| −5.50 | 0.13 |
| −5.00 | 0.06 |
| −4.50 | 0.00 |
| −4.00 | −0.06 |
| −3.50 | −0.13 |
| −3.00 | −0.19 |
| −2.50 | −0.25 |
| −2.00 | −0.25 |
| −1.50 | −0.25 |
| −1.00 | −0.25 |
| −0.50 | −0.25 |
| 0.00 | −0.25 |
| 0.50 | −0.25 |
| 1.00 | −0.25 |
| 1.50 | −0.25 |
| 2.00 | −0.25 |
| 2.50 | −0.25 |
| 3.00 | −0.19 |
| 3.50 | −0.13 |
| 4.00 | −0.06 |
| 4.50 | 0.00 |
| 5.00 | 0.06 |
| 5.50 | 0.13 |
| 6.00 | 0.19 |
| 6.50 | 0.25 |

In the 1st example, the multifocal contact lens is made of hydrogel. A composition for manufacturing the hydrogel of the 1st example is listed in Table 3.

TABLE 3

| Ingredient | Content (wt %) |
| --- | --- |
| 2-hydroxyethyl methacrylate | 82 |
| 2-(2'-hydroxy-5'-methacryloxyethylphenyl)-2H-benzotriazole | 1.2 |
| ethylene glycol dimethacrylate | 0.4 |
| 2-hydroxy-2-methyl-propiophenone | 0.5 |
| glycerol | 13.5 |
| 1,1,1-trimethylol propane trimethacrylate | 0.2 |
| methacrylic acid | 2.2 |

As shown in Table 3, the multifocal contact lens of the 1st example can block UV lights by adding 2-(2'-hydroxy-5'-methacryloxyethylphenyl)-2H-benzotriazole.

2nd Example

In the 2nd example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 2nd example can refer to FIG. 3.

In the multifocal contact lens of the 2nd example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 2nd example are listed in Table 4.

TABLE 4

2nd example

| | | | |
| --- | --- | --- | --- |
| DiC (mm) | 5.00 | PowC (D) | −0.50 |
| DiP1 (mm) | 16.00 | PowP1 (D) | 0.50 |
| DiP2 (mm) | 13.00 | PowP2 (D) | 0.50 |
| DiC/DiP1 | 0.31 | |PowC−PowP1| (D) | 1.00 |
| DiC/DiP2 | 0.38 | | |

Figure 6:
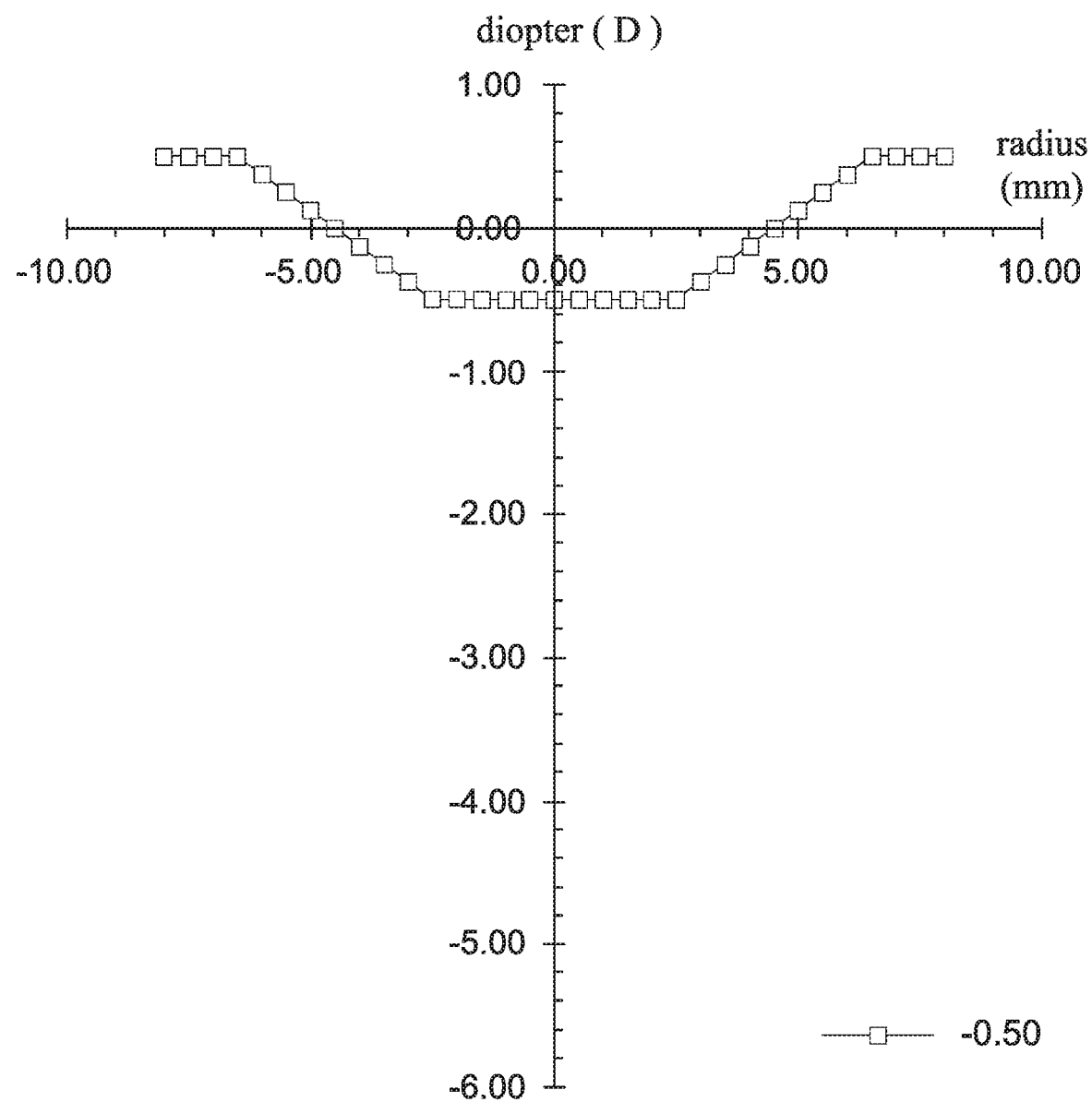
FIG. 6 shows a relationship between a radius and a diopter of a multifocal contact lens of the 2nd example.

Please refer to Table 5 and FIG. 6 simultaneously, radiuses and the correspondent diopters of the multifocal contact lens of the 2nd example are listed in Table 5. FIG. 6 shows a relationship between the radius and the diopter of the multifocal contact lens of the 2nd example (the negative radius having an opposite direction with the positive radius). As shown in Table 5 and FIG. 6, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region is fixed.

TABLE 5

2nd example

| radius (mm) | diopter (D) |
| --- | --- |
| −8.00 | 0.50 |
| −7.50 | 0.50 |
| −7.00 | 0.50 |
| −6.50 | 0.50 |
| −6.00 | 0.38 |
| −5.50 | 0.25 |
| −5.00 | 0.13 |
| −4.50 | 0.00 |
| −4.00 | −0.13 |
| −3.50 | −0.25 |
| −3.00 | −0.38 |
| −2.50 | −0.50 |
| −2.00 | −0.50 |
| −1.50 | −0.50 |
| −1.00 | −0.50 |
| −0.50 | −0.50 |
| 0.00 | −0.50 |
| 0.50 | −0.50 |
| 1.00 | −0.50 |
| 1.50 | −0.50 |
| 2.00 | −0.50 |
| 2.50 | −0.50 |
| 3.00 | −0.38 |
| 3.50 | −0.25 |
| 4.00 | −0.13 |
| 4.50 | 0.00 |
| 5.00 | 0.13 |
| 5.50 | 0.25 |
| 6.00 | 0.38 |
| 6.50 | 0.50 |
| 7.00 | 0.50 |
| 7.50 | 0.50 |
| 8.00 | 0.50 |

In the 2nd example, the multifocal contact lens is made of hydrogel. A composition for manufacturing the hydrogel of the 2nd example is listed in Table 6A.

TABLE 6A

| Ingredient | Content (wt %) |
| --- | --- |
| 2-hydroxyethyl methacrylate | 44.8 |
| 2-(2'-hydroxy-5'-methacryloxyethylphenyl)-2H-benzotriazole | 1.2 |
| ethylene glycol dimethacrylate | 0.6 |
| 2-hydroxy-2-methyl-propiophenone | 0.6 |
| glycerol | 10.5 |
| 1,1,1-trimethylol propane trimethacrylate | 0.3 |
| glycerol monomethacrylate | 42 |

As shown in Table 6A, the multifocal contact lens of the 2nd example can block UV lights by adding 2-(2'-hydroxy-5'-methacryloxyethylphenyl)-2H-benzotriazole.

Figure 7:
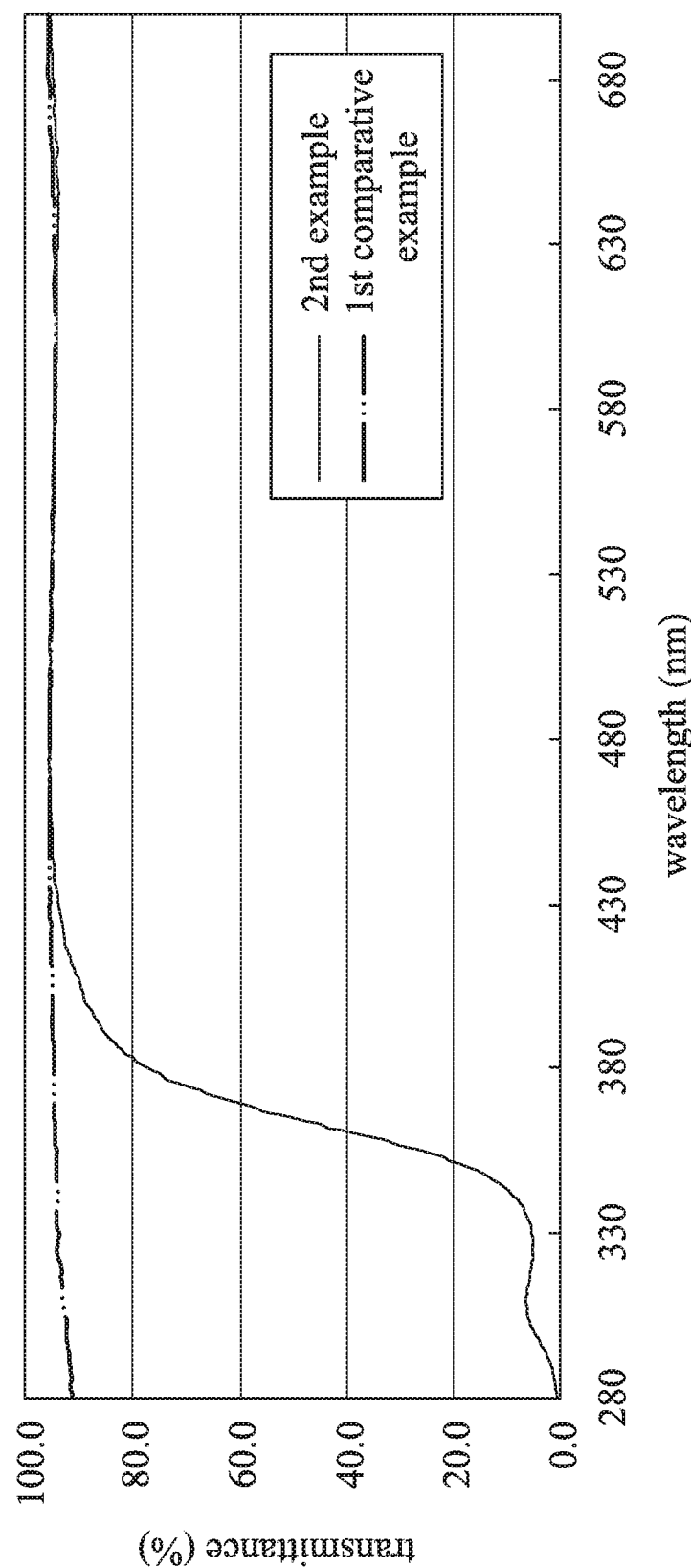
FIG. 7 shows a relationship between a wavelength and a transmittance of the multifocal contact lens of the 2nd example and a multifocal contact lens of the 1st comparative example.

FIG. 7 shows a relationship between a wavelength and a transmittance of the multifocal contact lens of the 2nd example and a multifocal contact lens of the 1st comparative example. The difference between the 1st comparative example and the 2nd example is the 1st comparative example in lack of UV blocking agent. Specifically, a composition of the 1st comparative example is formulated by replacing the 2-(2'-hydroxy-5'-methacryloxyethylphenyl)-2H-benzotriazole in the 2nd example with the 2-hydroxyethyl methacrylate. In FIG. 7, a blocking rate for UV-A (the UV lights with a wavelength ranging from 316 nm to 380 nm) of the 1st comparative example and the 2nd example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 1st comparative example and the 2nd example can be calculated by the following formula: (1−an average transmittance of the wavelength ranging from 280 nm to 315 nm)×100%. The calculated results are listed in Table 6B.

TABLE 6B

|  | 1st comparative example | 2nd example |
|---|---|---|
| blocking rate for UV-A (%) (316 nm-380 nm) | 5.92 | 73.19 |
| blocking rate for UV-B (%) (280 nm-315 nm) | 7.91 | 96.36 |

As shown in Table 6B, comparing to the 1st comparative example, the blocking rate for UV-A and the blocking rate for UV-B of the 2nd example is much greater than that of the 1st comparative example. In other words, the multifocal contact lens of the 2nd example can effectively block the UV lights, so that the probability that the retina hurt by the UV lights can be reduced.

3rd Example

In the 3rd example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 3rd example can refer to FIG. 3.

In the multifocal contact lens of the 3rd example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 3rd example are listed in Table 7.

TABLE 7

| 3rd example | | | |
|---|---|---|---|
| DiC (mm) | 4.00 | PowC (D) | −1.00 |
| DiP1 (mm) | 15.00 | PowP1 (D) | 0.25 |
| DiP2 (mm) | 6.00 | PowP2 (D) | −0.50 |
| DiC/DiP1 | 0.27 | |PowC-PowP1| (D) | 1.25 |
| DiC/DiP2 | 0.67 | | |

Figure 8:
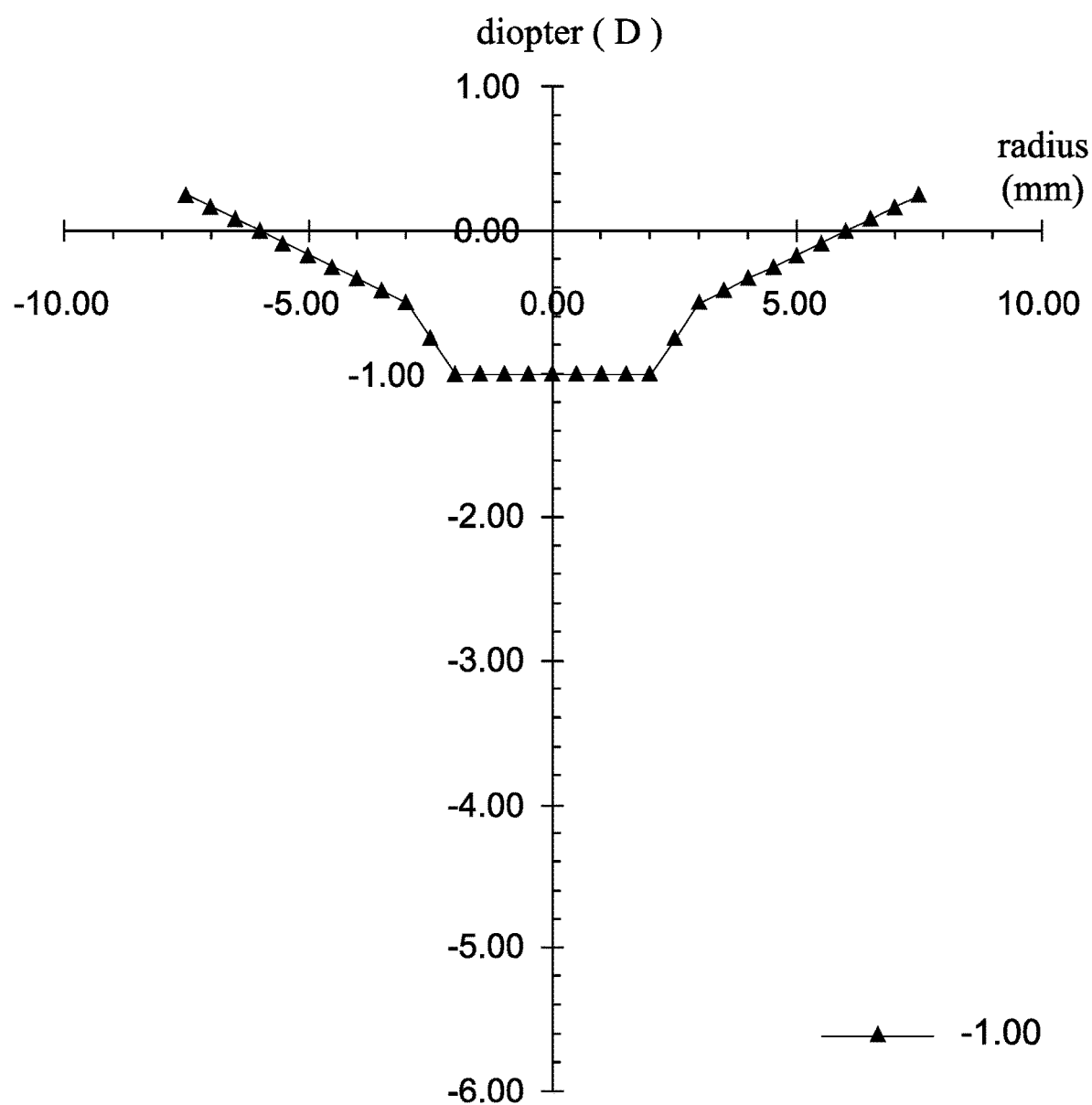
FIG. 8 shows a relationship between a radius and a diopter of a multifocal contact lens of the 3rd example.

Please refer to Table 8 and FIG. 8 simultaneously, radiuses and the correspondent diopters of the multifocal contact lens of the 3rd example are listed in Table 8. FIG. 8 shows a relationship between the radius and the diopter of the multifocal contact lens of the 3rd example (the negative radius having an opposite direction with the positive radius). As shown in Table 8 and FIG. 8, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 8

| 3rd example | |
|---|---|
| radius (mm) | diopter (D) |
| −7.50 | 0.25 |
| −7.00 | 0.17 |
| −6.50 | 0.08 |
| −6.00 | 0.00 |
| −5.50 | −0.08 |
| −5.00 | −0.17 |
| −4.50 | −0.25 |
| −4.00 | −0.33 |
| −3.50 | −0.42 |
| −3.00 | −0.50 |
| −2.50 | −0.75 |
| −2.00 | −1.00 |
| −1.50 | −1.00 |
| −1.00 | −1.00 |
| −0.50 | −1.00 |
| 0.00 | −1.00 |
| 0.50 | −1.00 |
| 1.00 | −1.00 |
| 1.50 | −1.00 |
| 2.00 | −1.00 |
| 2.50 | −0.75 |
| 3.00 | −0.50 |
| 3.50 | −0.42 |
| 4.00 | −0.33 |
| 4.50 | −0.25 |
| 5.00 | −0.17 |
| 5.50 | −0.08 |
| 6.00 | 0.00 |
| 6.50 | 0.08 |
| 7.00 | 0.17 |
| 7.50 | 0.25 |

In the 3rd example, the multifocal contact lens is made of hydrogel. A composition for manufacturing the hydrogel of the 3rd example is listed in Table 9.

TABLE 9

| Ingredient | Content (wt %) |
|---|---|
| 2-hydroxyethyl methacrylate | 91 |
| 2-(2'-hydroxy-5'-methacryloxyethylphenyl)-2H-benzotriazole | 1 |
| ethylene glycol dimethacrylate | 0.6 |
| 2-hydroxy-2-methyl-propiophenone | 0.6 |
| glycerol | 6.3 |
| N-vinyl-2-pyrrolidinone | 0.5 |

As shown in Table 9, the multifocal contact lens of the 3rd example can block UV lights by adding 2-(2'-hydroxy-5'-methacryloxyethylphenyl)-2H-benzotriazole.

4th Example

In the 4th example, a multifocal contact lens includes a central region and a first annular region. The first annular region concentrically surrounds the central region. At least one of the central region and the first annular region is aspheric. The structure of the multifocal contact lens of the 4th example can refer to FIG. 2.

In the multifocal contact lens of the 4th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 4th example are listed in Table 10.

TABLE 10

| 4th example | | | |
|---|---|---|---|
| DiC (mm) | 7.00 | PowC (D) | −1.50 |
| DiP1 (mm) | 14.00 | PowP1 (D) | −1.00 |
| DiC/DiP1 | 0.50 | |PowC−PowP1| (D) | 0.50 |

Figure 9:
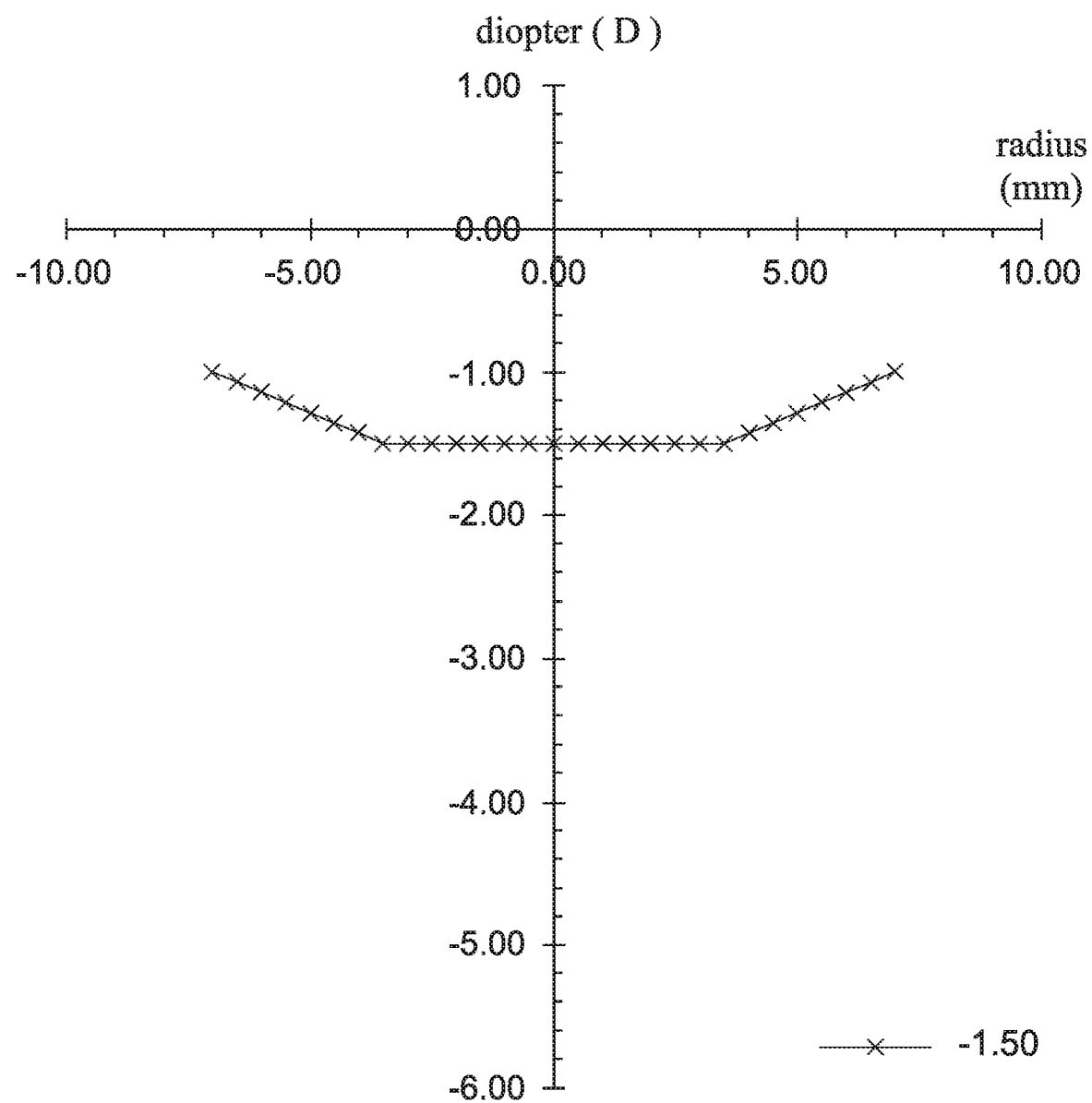
FIG. 9 shows a relationship between a radius and a diopter of a multifocal contact lens of the 4th example.

Please refer to Table 11 and FIG. 9 simultaneously, radiuses and the correspondent diopters of the multifocal contact lens of the 4th example are listed in Table 11. FIG. 9 shows a relationship between the radius and the diopter of the multifocal contact lens of the 4th example (the negative radius having an opposite direction with the positive radius). As shown in Table 11 and FIG. 9, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 11

| 4th example | |
|---|---|
| radius (mm) | diopter (D) |
| −7.00 | −1.00 |
| −6.50 | −1.07 |
| −6.00 | −1.14 |
| −5.50 | −1.21 |
| −5.00 | −1.29 |
| −4.50 | −1.36 |
| −4.00 | −1.43 |
| −3.50 | −1.50 |
| −3.00 | −1.50 |
| −2.50 | −1.50 |
| −2.00 | −1.50 |
| −1.50 | −1.50 |
| −1.00 | −1.50 |
| −0.50 | −1.50 |
| 0.00 | −1.50 |
| 0.50 | −1.50 |
| 1.00 | −1.50 |
| 1.50 | −1.50 |
| 2.00 | −1.50 |
| 2.50 | −1.50 |
| 3.00 | −1.50 |
| 3.50 | −1.50 |
| 4.00 | −1.43 |
| 4.50 | −1.36 |
| 5.00 | −1.29 |
| 5.50 | −1.21 |
| 6.00 | −1.14 |
| 6.50 | −1.07 |
| 7.00 | −1.00 |

In the 4th example, the multifocal contact lens is made of hydrogel. A composition for manufacturing the hydrogel of the 4th example is listed in Table 12A.

TABLE 12A

| Ingredient | Content (wt %) |
|---|---|
| 2-hydroxyethyl methacrylate | 82 |
| 2-(4-benzoyl-3-hydroxyphenoxy) ethyl acrylate | 1 |
| ethylene glycol dimethacrylate | 0.4 |
| 2-hydroxy-2-methyl-propiophenone | 0.6 |
| glycerol | 13.6 |
| 1,1,1-trimethylol propane trimethacrylate | 0.2 |
| methacrylic acid | 2.2 |

As shown in Table 12A, the multifocal contact lens of the 4th example can block UV lights by adding 2-(4-benzoyl-3-hydroxyphenoxy)ethyl acrylate.

Figure 10:
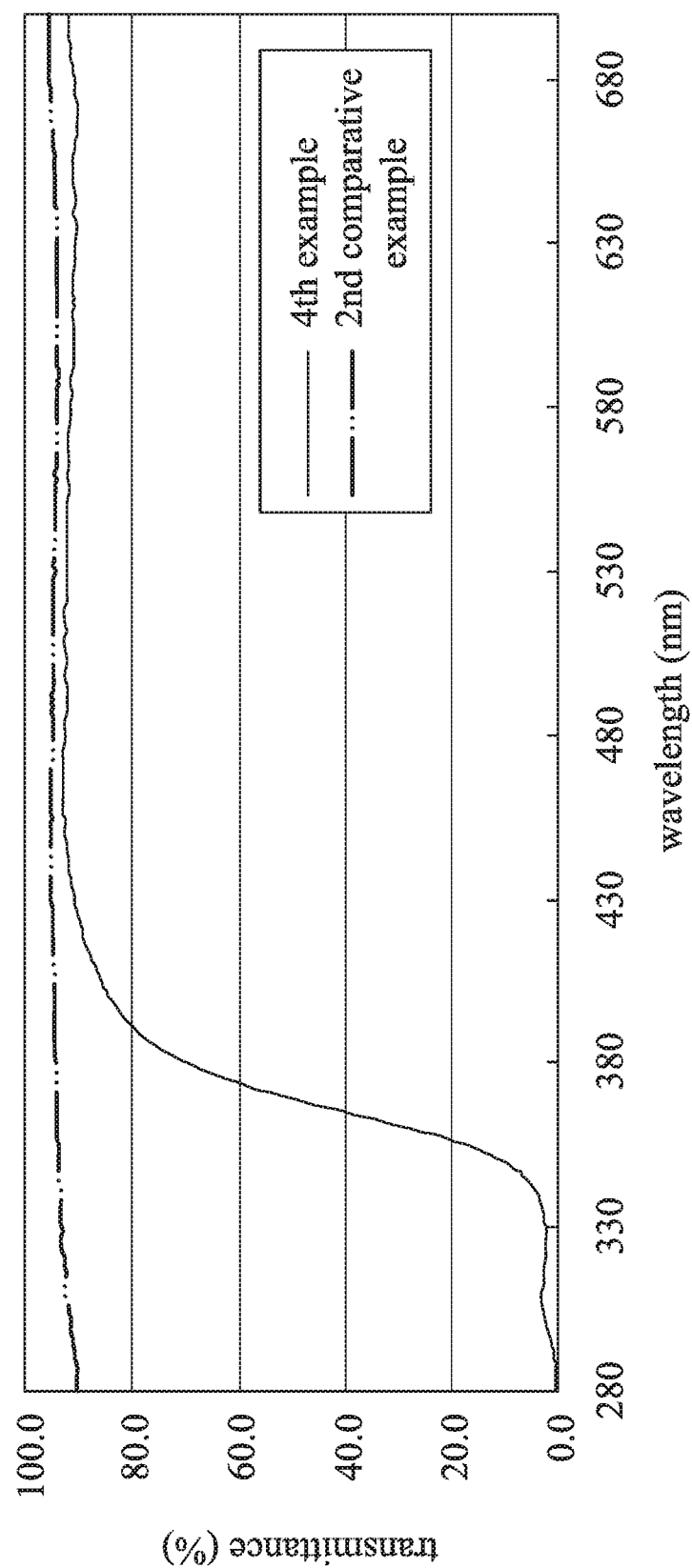
FIG. 10 shows a relationship between a wavelength and a transmittance of the multifocal contact lens of the 4th example and a multifocal contact lens of the 2nd comparative example.

FIG. 10 shows a relationship between a wavelength and a transmittance of the multifocal contact lens of the 4th example and a multifocal contact lens of the 2nd comparative example. The difference between the 2nd comparative example and the 4th example is the 2nd comparative example in lack of UV blocking agent. Specifically, a composition of the 2nd comparative example is formulated by replacing the 2-(4-benzoyl-3-hydroxyphenoxy)ethyl acrylate in the 4th example with the 2-hydroxyethyl methacrylate. In FIG. 10, a blocking rate for UV-A (the UV lights with a wavelength ranging from 316 nm to 380 nm) of the 2nd comparative example and the 4th example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 2nd comparative example and the 4th example can be calculated by the following formula: (1−an average transmittance of the wavelength ranging from 280 nm to 315 nm)×100%. The calculated results are listed in Table 12B.

TABLE 12B

| | 2nd comparative example | 4th example |
|---|---|---|
| blocking rate for UV-A (%) (316 nm-380 nm) | 6.44 | 79.32 |
| blocking rate for UV-B (%) (280 nm-315 nm) | 8.76 | 98.39 |

As shown in Table 12B, comparing to the 2nd comparative example, the blocking rate for UV-A and the blocking rate for UV-B of the 4th example is much greater than that of the 2nd comparative example. In other words, the multifocal contact lens of the 4th example can effectively block the UV lights, so that the probability that the retina hurt by the UV lights can be reduced.

5th Example

In the 5th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 5th example can refer to FIG. 3.

In the multifocal contact lens of the 5th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 5th example are listed in Table 13.

TABLE 13

5th example

| | | | |
|---|---|---|---|
| DiC (mm) | 8.00 | PowC (D) | −2.00 |
| DiP1 (mm) | 15.00 | PowP1 (D) | 0 |
| DiP2 (mm) | 11.00 | PowP2 (D) | 0 |
| DiC/DiP1 | 0.53 | |PowC−PowP1| (D) | 2.00 |
| DiC/DiP2 | 0.73 | | |

Figure 11:
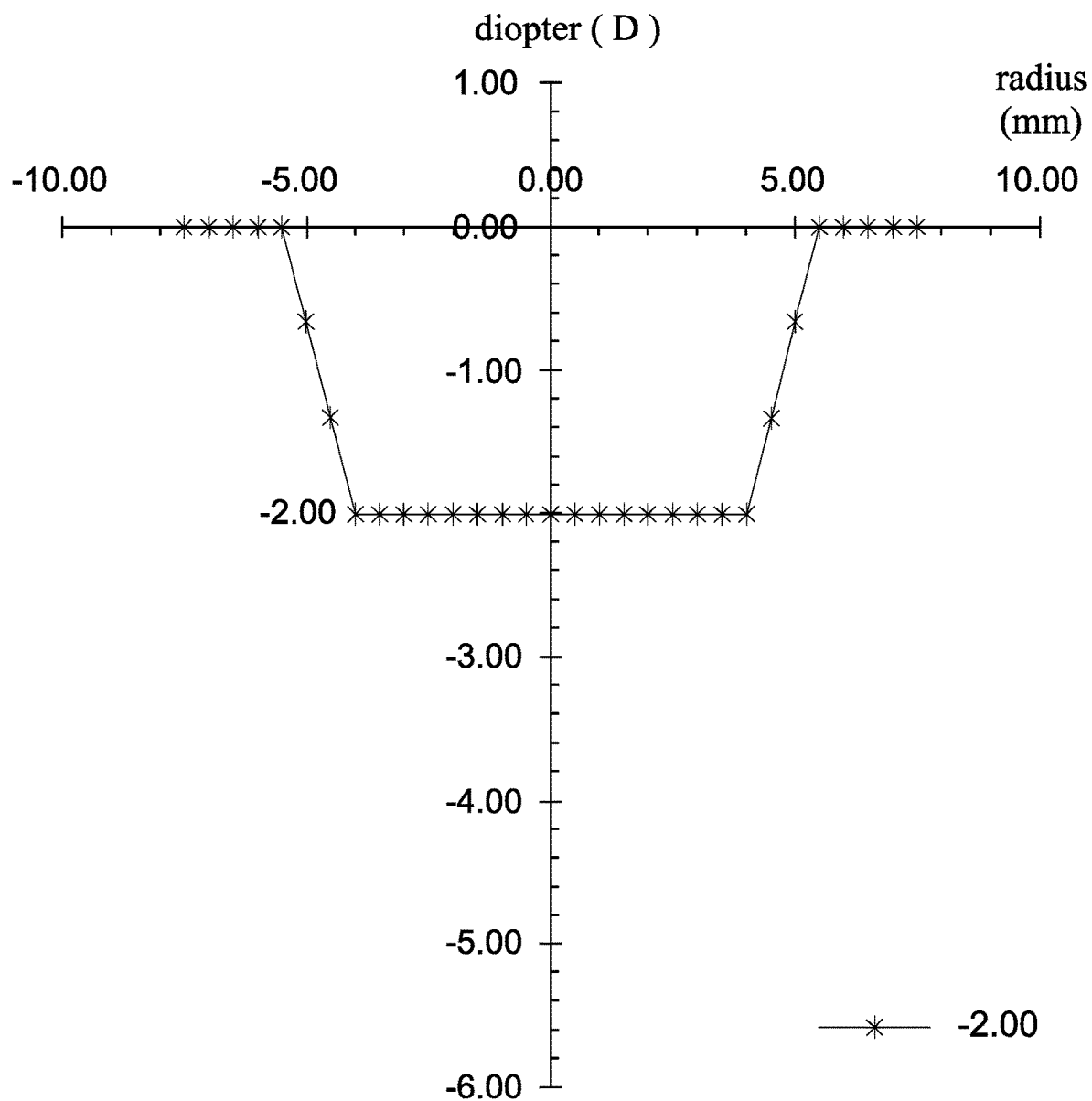
FIG. 11 shows a relationship between a radius and a diopter of a multifocal contact lens of the 5th example.

Please refer to Table 14 and FIG. 11 simultaneously, radiuses and the correspondent diopters of the multifocal contact lens of the 5th example are listed in Table 14. FIG. 11 shows a relationship between the radius and the diopter of the multifocal contact lens of the 5th example (the negative radius having an opposite direction with the positive radius). As shown in Table 14 and FIG. 11, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region is fixed.

TABLE 14

5th example

| radius (mm) | diopter (D) |
|---|---|
| −7.50 | 0.00 |
| −7.00 | 0.00 |
| −6.50 | 0.00 |
| −6.00 | 0.00 |
| −5.50 | 0.00 |
| −5.00 | −0.67 |
| −4.50 | −1.33 |
| −4.00 | −2.00 |
| −3.50 | −2.00 |
| −3.00 | −2.00 |
| −2.50 | −2.00 |
| −2.00 | −2.00 |
| −1.50 | −2.00 |
| −1.00 | −2.00 |
| −0.50 | −2.00 |
| 0.00 | −2.00 |
| 0.50 | −2.00 |
| 1.00 | −2.00 |
| 1.50 | −2.00 |
| 2.00 | −2.00 |
| 2.50 | −2.00 |
| 3.00 | −2.00 |
| 3.50 | −2.00 |
| 4.00 | −2.00 |
| 4.50 | −1.33 |
| 5.00 | −0.67 |

TABLE 14-continued

5th example

| radius (mm) | diopter (D) |
|---|---|
| 5.50 | 0.00 |
| 6.00 | 0.00 |
| 6.50 | 0.00 |
| 7.00 | 0.00 |
| 7.50 | 0.00 |

In the 5th example, the multifocal contact lens is made of hydrogel. A composition for manufacturing the hydrogel of the 5th example is listed in Table 15.

TABLE 15

| Ingredient | Content (wt %) |
|---|---|
| 2-hydroxyethyl methacrylate | 45 |
| 2-(4-benzoyl-3-hydroxyphenoxy)ethyl acrylate | 0.9 |
| ethylene glycol dimethacrylate | 0.6 |
| 2-hydroxy-2-methyl-propiophenone | 0.6 |
| glycerol | 10.6 |
| 1,1,1-trimethylol propane trimethacrylate | 0.3 |
| glycerol monomethacrylate | 42 |

As shown in Table 15, the multifocal contact lens of the 5th example can effectively block the UV lights by adding 2-(4-benzoyl-3-hydroxyphenoxy)ethyl acrylate.

6th Example

In the 6th example, a multifocal contact lens includes a central region and a first annular region. The first annular region concentrically surrounds the central region. At least one of the central region and the first annular region is aspheric. The structure of the multifocal contact lens of the 6th example can refer to FIG. 2.

In the multifocal contact lens of the 6th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 6th example are listed in Table 16.

TABLE 16

6th example

| | | | |
|---|---|---|---|
| DiC (mm) | 9.00 | PowC (D) | −2.50 |
| DiP1 (mm) | 14.00 | PowP1 (D) | −2.25 |
| DiC/DiP1 | 0.64 | |PowC−PowP1| (D) | 0.25 |

Figure 12:
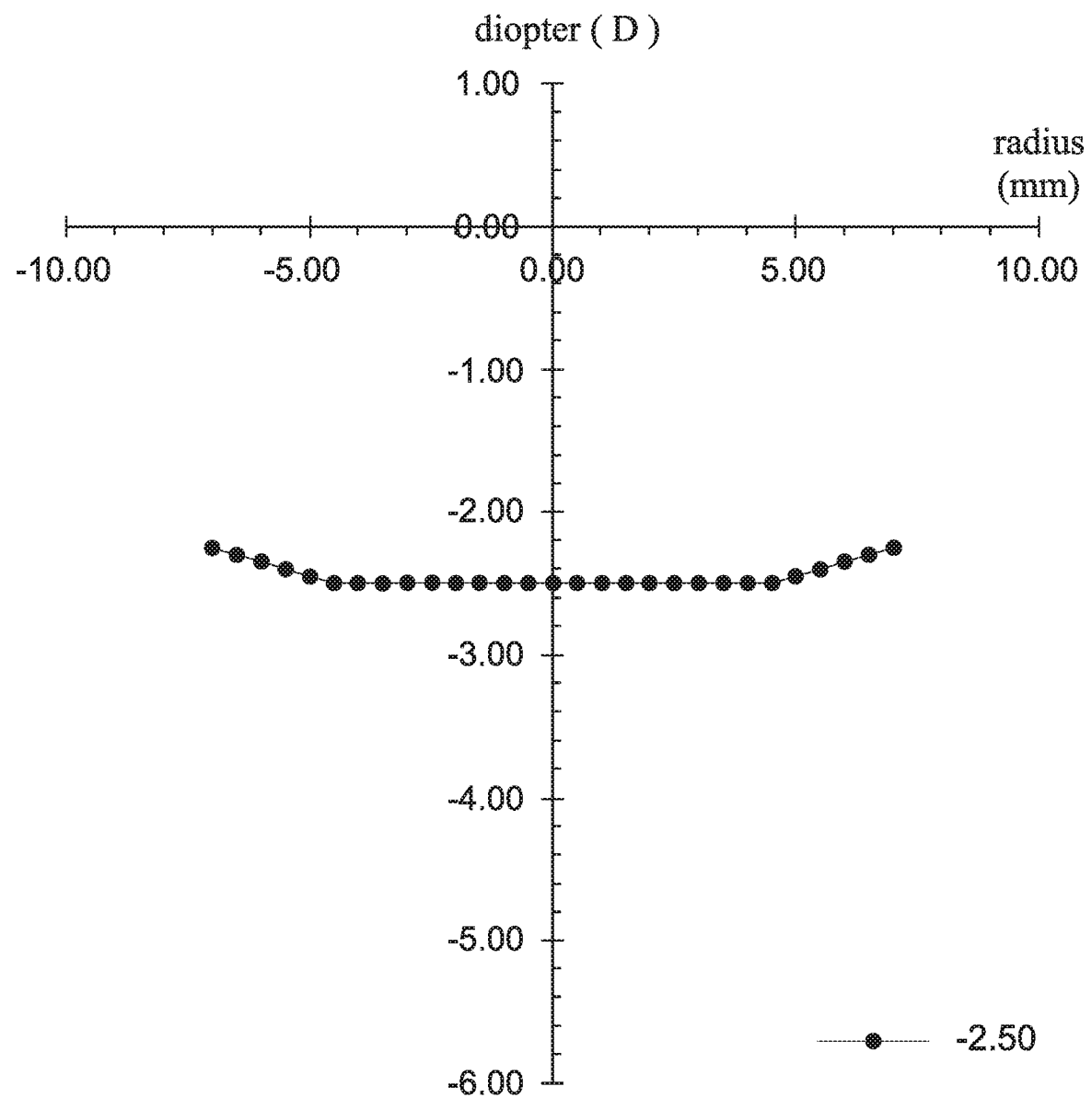
FIG. 12 shows a relationship between a radius and a diopter of a multifocal contact lens of the 6th example.

Please refer to Table 17 and FIG. 12 simultaneously, radiuses and the correspondent diopters of the multifocal contact lens of the 6th example are listed in Table 17. FIG. 12 shows a relationship between the radius and the diopter of the multifocal contact lens of the 6th example (the negative radius having an opposite direction with the positive radius). As shown in Table 17 and FIG. 12, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 17

6th example

| radius (mm) | diopter (D) |
| --- | --- |
| −7.00 | −2.25 |
| −6.50 | −2.30 |
| −6.00 | −2.35 |
| −5.50 | −2.40 |
| −5.00 | −2.45 |
| −4.50 | −2.50 |
| −4.00 | −2.50 |
| −3.50 | −2.50 |
| −3.00 | −2.50 |
| −2.50 | −2.50 |
| −2.00 | −2.50 |
| −1.50 | −2.50 |
| −1.00 | −2.50 |
| −0.50 | −2.50 |
| 0.00 | −2.50 |
| 0.50 | −2.50 |
| 1.00 | −2.50 |
| 1.50 | −2.50 |
| 2.00 | −2.50 |
| 2.50 | −2.50 |
| 3.00 | −2.50 |
| 3.50 | −2.50 |
| 4.00 | −2.50 |
| 4.50 | −2.50 |
| 5.00 | −2.45 |
| 5.50 | −2.40 |
| 6.00 | −2.35 |
| 6.50 | −2.30 |
| 7.00 | −2.25 |

In the 6th example, the multifocal contact lens is made of hydrogel. A composition for manufacturing the hydrogel of the 6th example is listed in Table 18.

TABLE 18

| Ingredient | Content (wt %) |
| --- | --- |
| 2-hydroxyethyl methacrylate | 90.4 |
| 2-(4-benzoyl-3-hydroxyphenoxy)ethyl acrylate | 1.2 |
| ethylene glycol dimethacrylate | 0.6 |
| 2-hydroxy-2-methyl-propiophenone | 0.7 |
| glycerol | 6.3 |
| N-vinyl-2-pyrrolidinone | 0.8 |

As shown in Table 18, the multifocal contact lens of the 6th example can effectively block the UV lights by adding 2-(4-benzoyl-3-hydroxyphenoxy)ethyl acrylate.

7th Example

In the 7th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 7th example can refer to FIG. 3.

In the multifocal contact lens of the 7th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 7th example are listed in Table 19.

TABLE 19

7th example

| | | | |
| --- | --- | --- | --- |
| DiC (mm) | 4.00 | PowC (D) | −3.00 |
| DiP1 (mm) | 15.00 | PowP1 (D) | −1.00 |
| DiP2 (mm) | 8.00 | PowP2 (D) | −2.00 |
| DiC/DiP1 | 0.27 | |PowC − PowP1| (D) | 2.00 |
| DiC/DiP2 | 0.50 | | |

Figure 13:
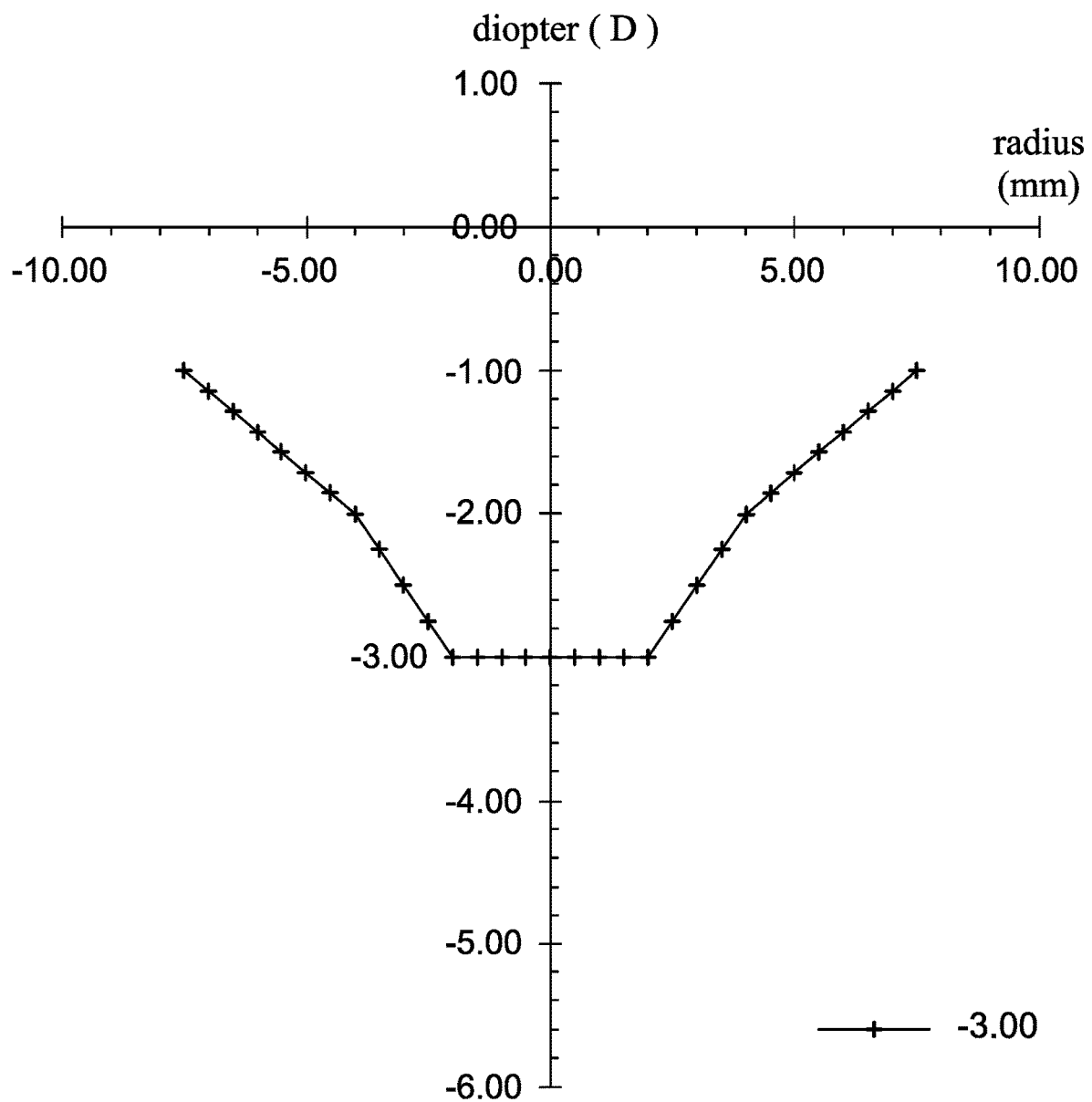
FIG. 13 shows a relationship between a radius and a diopter of a multifocal contact lens of the 7th example.

Please refer to Table 20 and FIG. 13 simultaneously, radiuses and the correspondent diopters of the multifocal contact lens of the 7th example are listed in Table 20. FIG. 13 shows a relationship between the radius and the diopter of the multifocal contact lens of the 7th example (the negative radius having an opposite direction with the positive radius). As shown in Table 20 and FIG. 13, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 20

7th example

| radius (mm) | diopter (D) |
| --- | --- |
| −7.50 | −1.00 |
| −7.00 | −1.14 |
| −6.50 | −1.29 |
| −6.00 | −1.43 |
| −5.50 | −1.57 |
| −5.00 | −1.71 |
| −4.50 | −1.86 |
| −4.00 | −2.00 |
| −3.50 | −2.25 |
| −3.00 | −2.50 |
| −2.50 | −2.75 |
| −2.00 | −3.00 |
| −1.50 | −3.00 |
| −1.00 | −3.00 |
| −0.50 | −3.00 |
| 0.00 | −3.00 |
| 0.50 | −3.00 |
| 1.00 | −3.00 |
| 1.50 | −3.00 |
| 2.00 | −3.00 |
| 2.50 | −2.75 |
| 3.00 | −2.50 |
| 3.50 | −2.25 |
| 4.00 | −2.00 |
| 4.50 | −1.86 |
| 5.00 | −1.71 |
| 5.50 | −1.57 |
| 6.00 | −1.43 |
| 6.50 | −1.29 |
| 7.00 | −1.14 |
| 7.50 | −1.00 |

In the 7th example, the multifocal contact lens is made of hydrogel. A composition for manufacturing the hydrogel of the 7th example is listed in Table 21A.

TABLE 21A

| Ingredient | Content (wt %) |
|---|---|
| 2-hydroxyethyl methacrylate | 82 |
| 4-(phenyldiazenyl) phenyl methacrylate | 1 |
| ethylene glycol dimethacrylate | 0.4 |
| 2-hydroxy-2-methyl-propiophenone | 0.6 |
| glycerol | 13.5 |
| 1,1,1-trimethylol propane trimethacrylate | 0.2 |
| methacrylic acid | 2.3 |

As shown in Table 21A, the multifocal contact lens of the 7th example can effectively block the blue lights by adding 4-(phenyldiazenyl) phenyl methacrylate.

Figure 14:
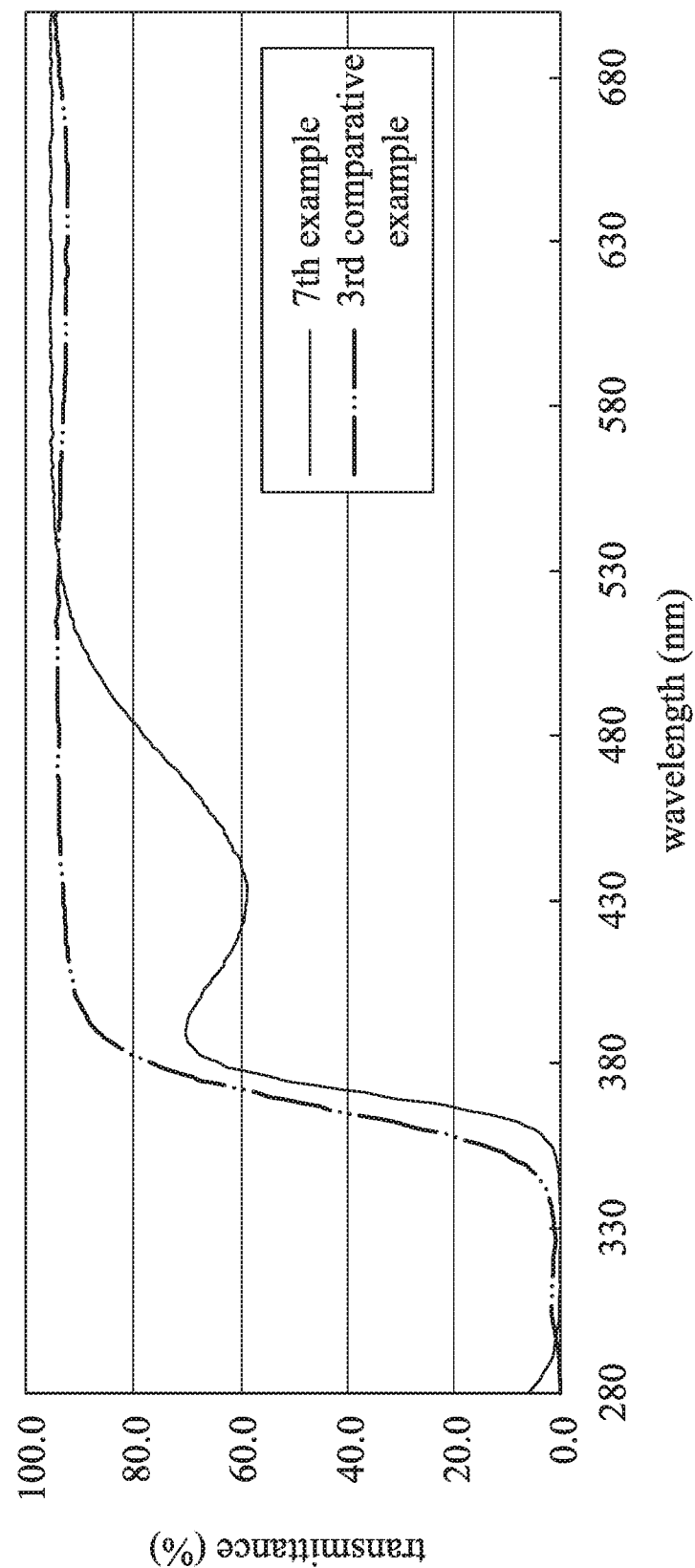
FIG. 14 shows a relationship between a wavelength and a transmittance of the multifocal contact lens of the 7th example and a multifocal contact lens of the 3rd comparative example.

FIG. 14 shows a relationship between a wavelength and a transmittance of the multifocal contact lens of the 7th example and a multifocal contact lens the 3rd comparative example. The difference between the 3rd comparative example and the 7th example is the 3rd comparative example in lack of blue-light blocking agent. Specifically, a composition of the 3rd comparative example is formulated by replacing the 4-(phenyldiazenyl) phenyl methacrylate in the 7th example with the 2-hydroxyethyl methacrylate. In FIG. 14, a blocking rate for blue lights (with a wavelength ranging from 380 nm to 495 nm) of the 3rd comparative example and the 7th example can be calculated by the following formula: (1−an average transmittance of the wavelength ranging from 380 nm to 495 nm)×100%. The calculated results are listed in Table 21B.

TABLE 21B

| | 3rd comparative example | 7th example |
|---|---|---|
| blocking rate for blue lights (%) (380 nm-495 nm) | 8.21 | 35.53 |

As shown in Table 21B, comparing to the 3rd comparative example, the blocking rate for blue lights of the 7th example is much greater than that of the 3rd comparative example. In other words, the multifocal contact lens of the 7th example can effectively block the blue lights, so that the probability that the retina hurt by the blue lights can be reduced.

8th Example

In the 8th example, a multifocal contact lens includes a central region and a first annular region. The first annular region concentrically surrounds the central region. At least one of the central region and the first annular region is aspheric. The structure of the multifocal contact lens of the 8th example can refer to FIG. 2.

In the multifocal contact lens of the 8th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 8th example are listed in Table 22.

TABLE 22

| 8th example | | | |
|---|---|---|---|
| DiC (mm) | 5.00 | PowC (D) | −3.50 |
| DiP1 (mm) | 10.00 | PowP1 (D) | −1.75 |
| DiC/DiP1 | 0.50 | \|PowC − PowP1\| (D) | 1.75 |

Figure 15:
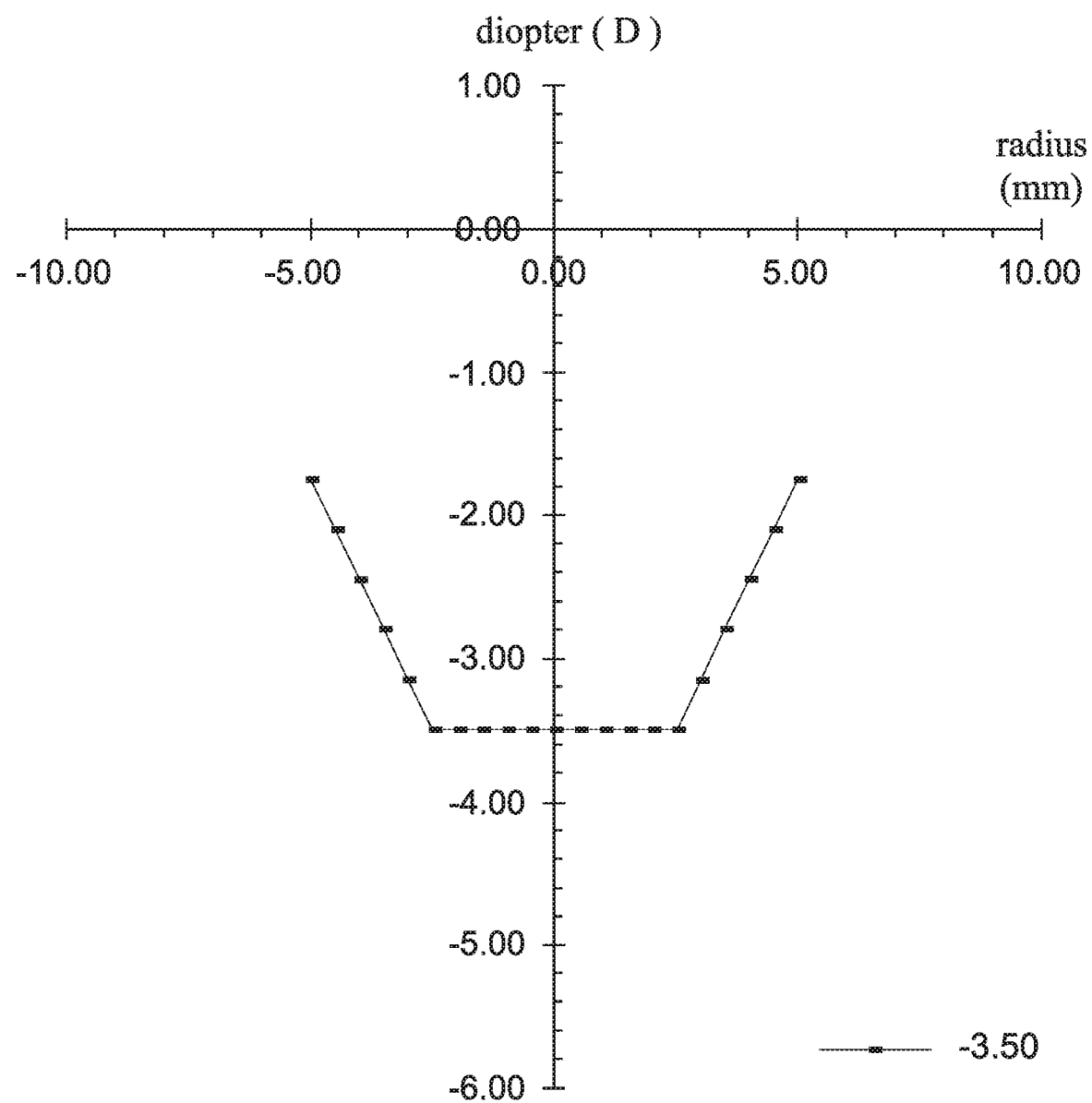
FIG. 15 shows a relationship between a radius and a diopter of a multifocal contact lens of the 8th example.

Please refer to Table 23 and FIG. 15 simultaneously, radiuses and the correspondent diopters of the multifocal contact lens of the 8th example are listed in Table 23. FIG. 15 shows a relationship between the radius and the diopter of the multifocal contact lens of the 8th example (the negative radius having an opposite direction with the positive radius). As shown in Table 23 and FIG. 15, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 23

| 8th example | |
|---|---|
| radius (mm) | diopter (D) |
| −5.00 | −1.75 |
| −4.50 | −2.10 |
| −4.00 | −2.45 |
| −3.50 | −2.80 |
| −3.00 | −3.15 |
| −2.50 | −3.50 |
| −2.00 | −3.50 |
| −1.50 | −3.50 |
| −1.00 | −3.50 |
| −0.50 | −3.50 |
| 0.00 | −3.50 |
| 0.50 | −3.50 |
| 1.00 | −3.50 |
| 1.50 | −3.50 |
| 2.00 | −3.50 |
| 2.50 | −3.50 |
| 3.00 | −3.15 |
| 3.50 | −2.80 |
| 4.00 | −2.45 |
| 4.50 | −2.10 |
| 5.00 | −1.75 |

In the 8th example, the multifocal contact lens is made of hydrogel. A composition for manufacturing the hydrogel of the 8th example is listed in Table 24.

TABLE 24

| Ingredient | Content (wt %) |
|---|---|
| 2-hydroxyethyl methacrylate | 45 |
| 4-(phenyldiazenyl) phenyl methacrylate | 1 |
| ethylene glycol dimethacrylate | 0.5 |
| 2-hydroxy-2-methyl-propiophenone | 0.6 |
| glycerol | 10.6 |
| 1,1,1-trimethylol propane trimethacrylate | 0.3 |
| glycerol monomethacrylate | 42 |

As shown in Table 24, the multifocal contact lens of the 8th example can effectively block the blue lights by adding 4-(phenyldiazenyl) phenyl methacrylate.

9th Example

In the 9th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 9th example can refer to FIG. 3.

In the multifocal contact lens of the 9th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 9th example are listed in Table 25.

TABLE 25

9th example

| | | | |
|---|---|---|---|
| DiC (mm) | 6.00 | PowC (D) | −4.00 |
| DiP1 (mm) | 14.00 | PowP1 (D) | −3.25 |
| DiP2 (mm) | 10.00 | PowP2 (D) | −3.75 |
| DiC/DiP1 | 0.43 | |PowC − PowP1| (D) | 0.75 |
| DiC/DiP2 | 0.60 | | |

Figure 16:
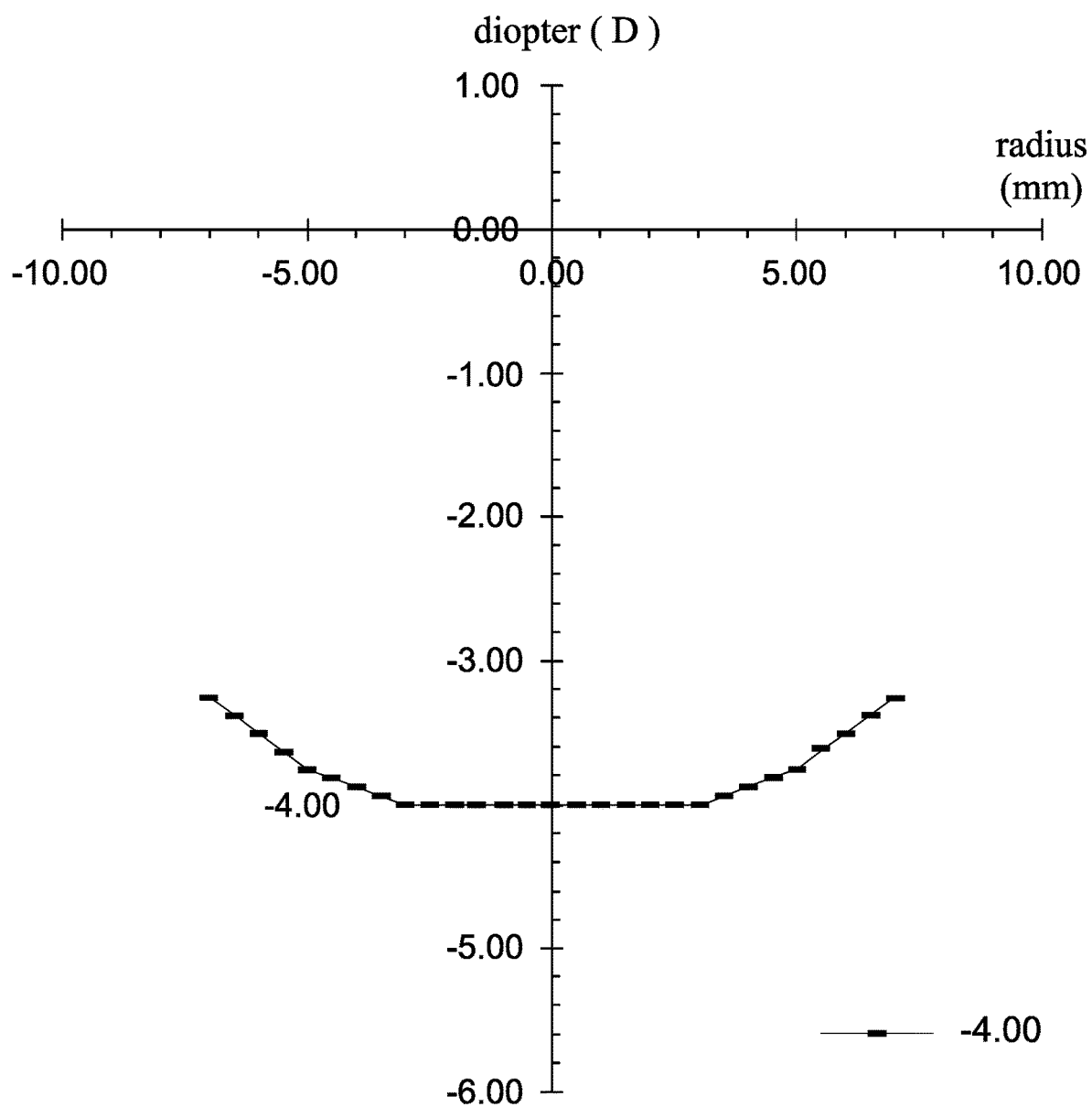
FIG. 16 shows a relationship between a radius and a diopter of a multifocal contact lens of the 9th example.

Please refer to Table 26 and FIG. 16 simultaneously, radiuses and the correspondent diopters of the multifocal contact lens of the 9th example are listed in Table 26. FIG. 16 shows a relationship between the radius and the diopter of the multifocal contact lens of the 9th example (the negative radius having an opposite direction with the positive radius). As shown in Table 26 and FIG. 16, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 26

9th example

| radius (mm) | diopter (D) |
|---|---|
| −7.00 | −3.25 |
| −6.50 | −3.38 |
| −6.00 | −3.50 |
| −5.50 | −3.63 |
| −5.00 | −3.75 |
| −4.50 | −3.81 |
| −4.00 | −3.88 |
| −3.50 | −3.94 |
| −3.00 | −4.00 |
| −2.50 | −4.00 |
| −2.00 | −4.00 |
| −1.50 | −4.00 |
| −1.00 | −4.00 |
| −0.50 | −4.00 |
| 0.00 | −4.00 |
| 0.50 | −4.00 |
| 1.00 | −4.00 |
| 1.50 | −4.00 |
| 2.00 | −4.00 |

TABLE 26-continued

9th example

| radius (mm) | diopter (D) |
|---|---|
| 2.50 | −4.00 |
| 3.00 | −4.00 |
| 3.50 | −3.94 |
| 4.00 | −3.88 |
| 4.50 | −3.81 |
| 5.00 | −3.75 |
| 5.50 | −3.63 |
| 6.00 | −3.50 |
| 6.50 | −3.38 |
| 7.00 | −3.25 |

In the 9th example, the multifocal contact lens is made of hydrogel. A composition for manufacturing the hydrogel of the 9th example is listed in Table 27.

TABLE 27

| Ingredient | Content (wt %) |
|---|---|
| 2-hydroxyethyl methacrylate | 90.3 |
| 4-(phenyldiazenyl) phenyl methacrylate | 1.2 |
| ethylene glycol dimethacrylate | 0.6 |
| 2-hydroxy-2-methyl-propiophenone | 0.6 |
| glycerol | 6.5 |
| N-vinyl-2-pyrrolidinone | 0.8 |

As shown in Table 27, the multifocal contact lens of the 9th example can effectively block the blue lights by adding 4-(phenyldiazenyl) phenyl methacrylate.

10th Example

In the 10th example, a multifocal contact lens includes a central region and a first annular region. The first annular region concentrically surrounds the central region. At least one of the central region and the first annular region is aspheric. The structure of the multifocal contact lens of the 10th example can refer to FIG. 2.

In the multifocal contact lens of the 10th example, a diameter of the central region of the multifocal contact lens is DiC, an outer diameter of the first annular region of the multifocal contact lens is DiP1, a diopter of the central region of the multifocal contact lens is PowC, a maximal diopter of the first annular region of the multifocal contact lens is PowP1, the value of DiC, DiP1, DiC/DiP1, PowC, PowP1, |PowC−PowP1| of the 10th example are listed in Table 28.

TABLE 28

10th example

| | | | |
|---|---|---|---|
| DiC (mm) | 7.00 | PowC (D) | −4.50 |
| DiP1 (mm) | 12.00 | PowP1 (D) | −3.00 |
| DiC/DiP1 | 0.58 | |PowC − PowP1| (D) | 1.50 |

Figure 17:
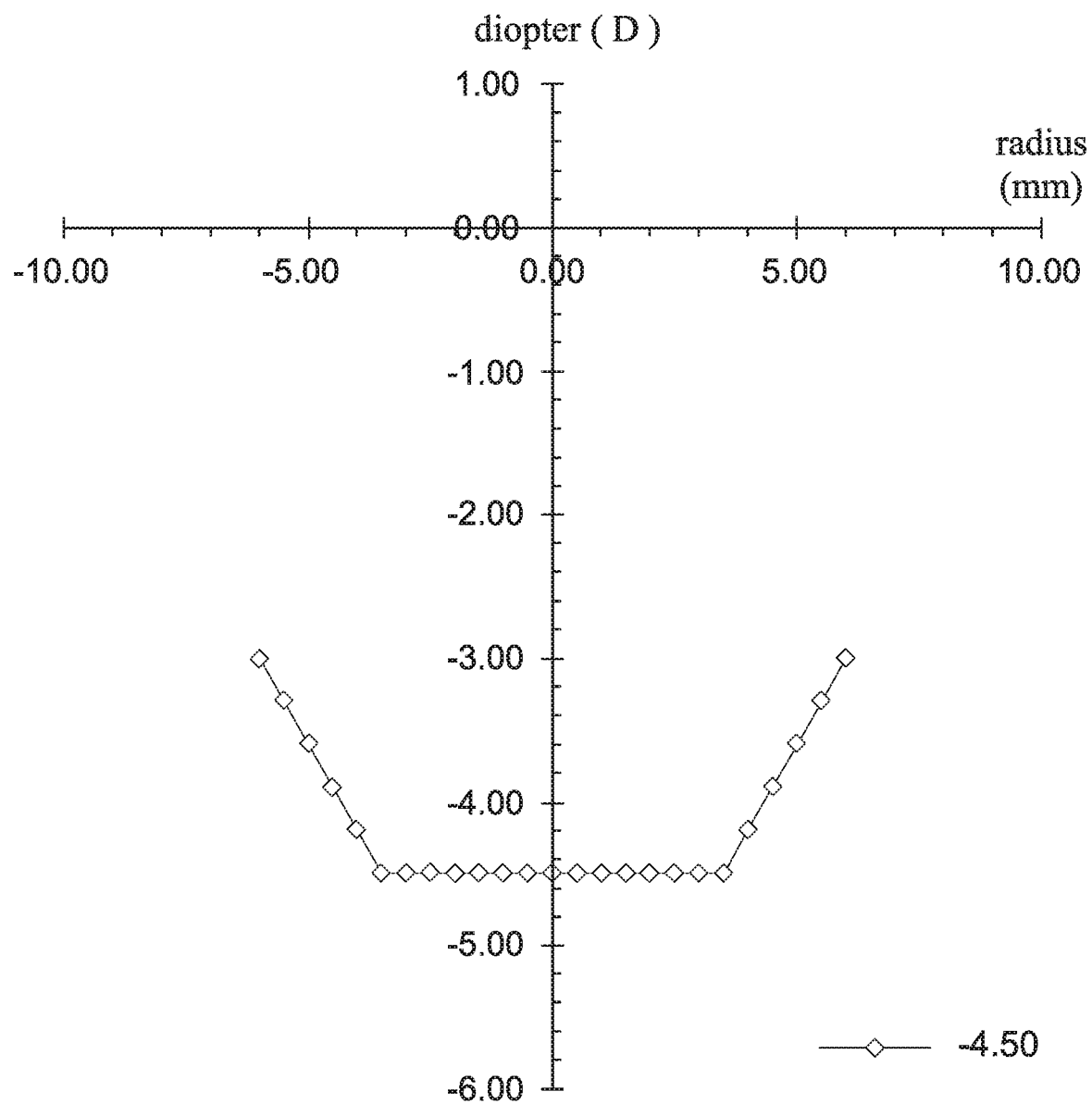
FIG. 17 shows a relationship between a radius and a diopter of a multifocal contact lens of the 10th example.

Please refer to Table 29 and FIG. 17 simultaneously, radiuses and the correspondent diopters of the multifocal contact lens of the 10th example are listed in Table 29. FIG. 17 shows a relationship between the radius and the diopter of the multifocal contact lens of the 10th example (the negative radius having an opposite direction with the positive radius). As shown in Table 29 and FIG. 17, the diopter of the central region is fixed, and the diopter of the first annular region is different from the diopter of the central region. Specifically, the diopter of the first annular region is greater than the diopter of the central region, and the diopter of the first annular region increases when away from the central region.

TABLE 29

10th example

| radius (mm) | diopter (D) |
|---|---|
| −6.00 | −3.00 |
| −5.50 | −3.30 |
| −5.00 | −3.60 |
| −4.50 | −3.90 |
| −4.00 | −4.20 |
| −3.50 | −4.50 |
| −3.00 | −4.50 |
| −2.50 | −4.50 |
| −2.00 | −4.50 |
| −1.50 | −4.50 |
| −1.00 | −4.50 |
| −0.50 | −4.50 |
| 0.00 | −4.50 |
| 0.50 | −4.50 |
| 1.00 | −4.50 |
| 1.50 | −4.50 |
| 2.00 | −4.50 |
| 2.50 | −4.50 |
| 3.00 | −4.50 |
| 3.50 | −4.50 |
| 4.00 | −4.20 |
| 4.50 | −3.90 |
| 5.00 | −3.60 |
| 5.50 | −3.30 |
| 6.00 | −3.00 |

In the 10th example, the multifocal contact lens is made of silicone hydrogel. A composition for manufacturing the silicone hydrogel of the 10th example is listed in Table 30.

TABLE 30

| Ingredient | Content (wt %) |
|---|---|
| 2-hydroxyethyl methacrylate | 4.3 |
| 3-methacryloyloxypropyltris(trimethylsilyloxy)silane | 28 |
| 2-hydroxy-2-methyl-propiophenone | 0.6 |
| N-vinyl-2-pyrrolidinone | 20.2 |
| N,N-dimethyl acrylamide | 12.3 |
| ethylene glycol dimethacrylate | 0.6 |
| 2-(4-benzoyl-3-hydroxyphenoxy)ethyl acrylate | 1 |
| 3-(3-methacryloxy-2-hydroxypropoxy)propylbis(trimethyl-siloxy)methylsilane | 21.5 |
| isopropyl alcohol | 10 |
| methacrylic acid | 1.5 |

As shown in Table 30, the multifocal contact lens of the 10th example can effectively block the UV lights by adding 2-(4-benzoyl-3-hydroxyphenoxy)ethyl acrylate.

11th Example

In the 11th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 11th example can refer to FIG. 3.

In the multifocal contact lens of the 11th example, a diameter of the central region of the multifocal contact lens is DiC, an outer diameter of the first annular region of the multifocal contact lens is DiP1, an outer diameter of the second annular region of the multifocal contact lens is DiP2, a diopter of the central region of the multifocal contact lens is PowC, a maximal diopter of the first annular region of the multifocal contact lens is PowP1, a maximal diopter of the second annular region of the multifocal contact lens is PowP2, the value of DiC, DiP1, DiP2, DiC/DiP1, DiC/DiP2, PowC, PowP1, PowP2, |PowC−PowP1| of the 11th example are listed in Table 31.

TABLE 31

11th example

| DiC (mm) | 8.00 | PowC (D) | −5.00 |
|---|---|---|---|
| DiP1 (mm) | 13.00 | PowP1 (D) | −2.75 |
| DiP2 (mm) | 10.00 | PowP2 (D) | −4.00 |
| DiC/DiP1 | 0.62 | |PowC − PowP1| (D) | 2.25 |
| DiC/DiP2 | 0.80 | | |

Figure 18:
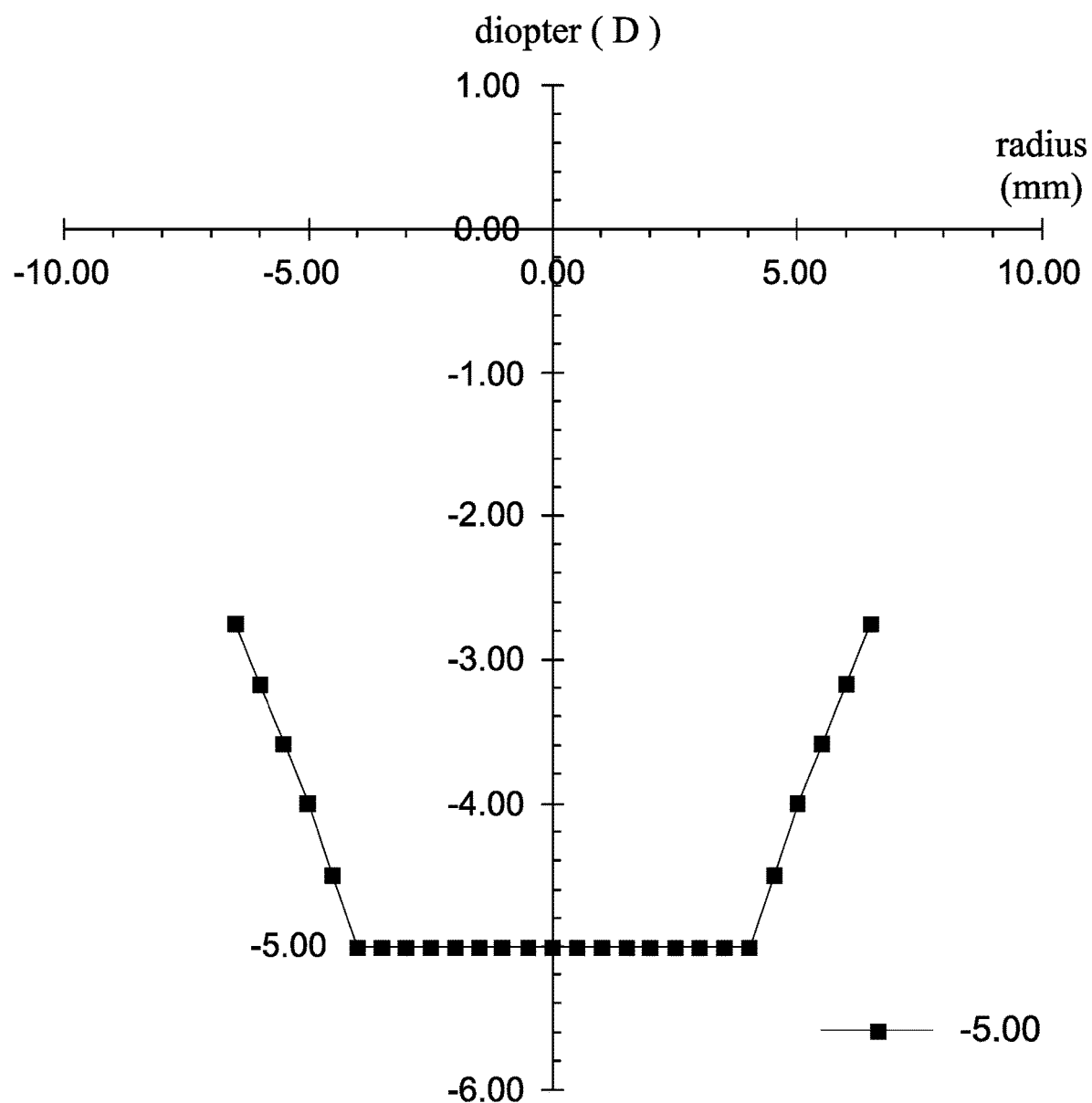
FIG. 18 shows a relationship between a radius and a diopter of a multifocal contact lens of the 11th example.

Please refer to Table 32 and FIG. 18 simultaneously, radiuses and the correspondent diopters of the multifocal contact lens of the 11th example are listed in Table 32. FIG. 18 shows a relationship between the radius and the diopter of the multifocal contact lens of the 11th example (the negative radius having an opposite direction with the positive radius). As shown in Table 32 and FIG. 18, the diopter of the central region is fixed, the diopter of the second annular region is different from the diopter of the central region, and the diopter of the first annular region is different from the diopter of the central region. Specifically, the diopter of the second annular region is greater than the diopter of the central region, the diopter of the second annular region increases when away from the central region, the diopter of the first annular region is greater than the diopter of the central region, and the diopter of the first annular region increases when away from the central region.

TABLE 32

11th example

| radius (mm) | diopter (D) |
|---|---|
| −6.50 | −2.75 |
| −6.00 | −3.17 |
| −5.50 | −3.58 |
| −5.00 | −4.00 |
| −4.50 | −4.50 |
| −4.00 | −5.00 |
| −3.50 | −5.00 |
| −3.00 | −5.00 |
| −2.50 | −5.00 |
| −2.00 | −5.00 |
| −1.50 | −5.00 |
| −1.00 | −5.00 |
| −0.50 | −5.00 |
| 0.00 | −5.00 |
| 0.50 | −5.00 |
| 1.00 | −5.00 |
| 1.50 | −5.00 |
| 2.00 | −5.00 |
| 2.50 | −5.00 |
| 3.00 | −5.00 |
| 3.50 | −5.00 |
| 4.00 | −5.00 |
| 4.50 | −4.50 |
| 5.00 | −4.00 |
| 5.50 | −3.58 |
| 6.00 | −3.17 |
| 6.50 | −2.75 |

In the 11th example, the multifocal contact lens is made of silicone hydrogel. A composition for manufacturing the silicone hydrogel of the 11th example is listed in Table 33A.

TABLE 33A

| Ingredient | Content (wt %) |
|---|---|
| 2-hydroxyethyl methacrylate | 4 |
| 3-methacryloyloxypropyltris(trimethylsifyloxy)silane | 28 |
| 2-hydroxy-2-methyl-propiophenone | 0.6 |
| N-vinyl-2-pyrrolidinone | 20.5 |
| N,N-dimethyl acrylamide | 12.3 |
| ethylene glycol dimethacrylate | 0.5 |
| 2-(4-benzoyl-3-hydroxyphenoxy)ethyl acrylate | 1.1 |
| (3-acryloxy-2-hydroxypropoxypropyl)terminated polydimethylsiloxane | 22 |
| 1-hexanol | 11 |

As shown in Table 33A, the multifocal contact lens of the 11th example can effectively block the UV lights by adding 2-(4-benzoyl-3-hydroxyphenoxy)ethyl acrylate.

Figure 19:
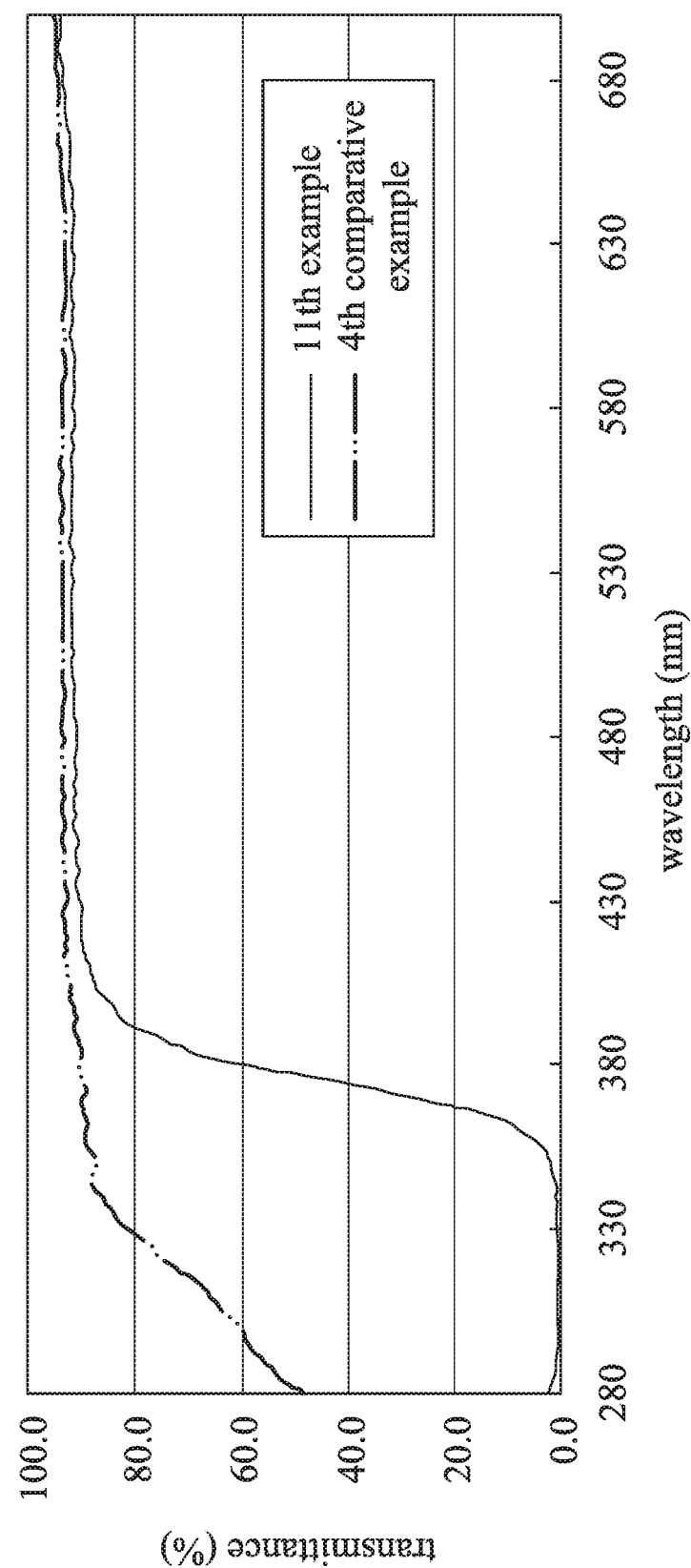
FIG. 19 shows a relationship between a wavelength and a transmittance of the multifocal contact lens of the 11th example and a multifocal contact lens of the 4th comparative example.

FIG. 19 shows a relationship between a wavelength and a transmittance of the multifocal contact lens of the 11th example and a multifocal contact lens the 4th comparative example. The difference between the 4th comparative example and the 11th example is the 4th comparative example in lack of UV blocking agent. Specifically, a composition of the 4th comparative example is formulated by replacing the 2-(4-benzoyl-3-hydroxyphenoxy)ethyl acrylate in the 11th example with the 2-hydroxyethyl methacrylate. In FIG. 19, a blocking rate for UV-A (the UV lights with a wavelength ranging from 316 nm to 380 nm) of the 4th comparative example and the 11th example can be calculated by the following formula: (1−an average transmittance of the wavelength ranging from 316 nm to 380 nm)×100%. Furthermore, a blocking rate for UV-B (the UV lights with a wavelength ranging from 280 nm to 315 nm) of the 4th comparative example and the 11th example can be calculated by the following formula: (1−an average transmittance of the wavelength ranging from 280 nm to 315 nm)×100%. The calculated results are listed in Table 33B.

TABLE 33B

| | 4th comparative example | 11th example |
|---|---|---|
| blocking rate for UV-A (%) (316 nm-380 nm) | 15.02 | 90.01 |
| blocking rate for UV-B (%) (280 nm-315 nm) | 40.91 | 99.24 |

As shown in Table 33B, comparing to the 4th comparative example, the blocking rate for UV-A and the blocking rate for UV-B of the 11th example is much greater than that of the 4th comparative example. In other words, the multifocal contact lens of the 11th example can effectively block the UV lights, so that the probability that the retina hurt by the UV lights can be reduced.

12th Example

In the 12th example, a multifocal contact lens includes a central region, a first annular region, a second annular region and a third annular region. The central region, the third annular region, the second annular region and the first annular region are sequentially connected from a center of the multifocal contact lens to a periphery of the multifocal contact lens and are concentric. At least one of the central region, the third annular region, the second annular region and the first annular region is aspheric. The structure of the multifocal contact lens of the 12th example can refer to FIG. 4.

In the multifocal contact lens of the 12th example, a diameter of the central region of the multifocal contact lens is DiC, an outer diameter of the first annular region of the multifocal contact lens is DiP1, an outer diameter of the second annular region of the multifocal contact lens is DiP2, an outer diameter of the third annular region of the multifocal contact lens is DiP3, a diopter of the central region of the multifocal contact lens is PowC, a maximal diopter of the first annular region of the multifocal contact lens is PowP1, a maximal diopter of the second annular region of the multifocal contact lens is PowP2, a maximal diopter of the third annular region of the multifocal contact lens is PowP3, the value of DiC, DiP1, DiP2, DiP3, DiC/DiP1, DiC/DiP2, PowC, PowP1, PowP2, PowP3, |PowC−PowP1| of the 12th example are listed in Table 34.

TABLE 34

| 12th example | | | |
|---|---|---|---|
| DiC (mm) | 4.00 | PowC (D) | −5.50 |
| DiP1 (mm) | 16.00 | PowP1 (D) | −3.00 |
| DiP2 (mm) | 12.00 | PowP2 (D) | −3.00 |
| DiP3 (mm) | 8.00 | PowP3 (D) | −3.75 |
| DiC/DiP1 | 0.25 | |PowC − PowP1| (D) | 2.50 |
| DiC/DiP2 | 0.33 | | |

Figure 20:
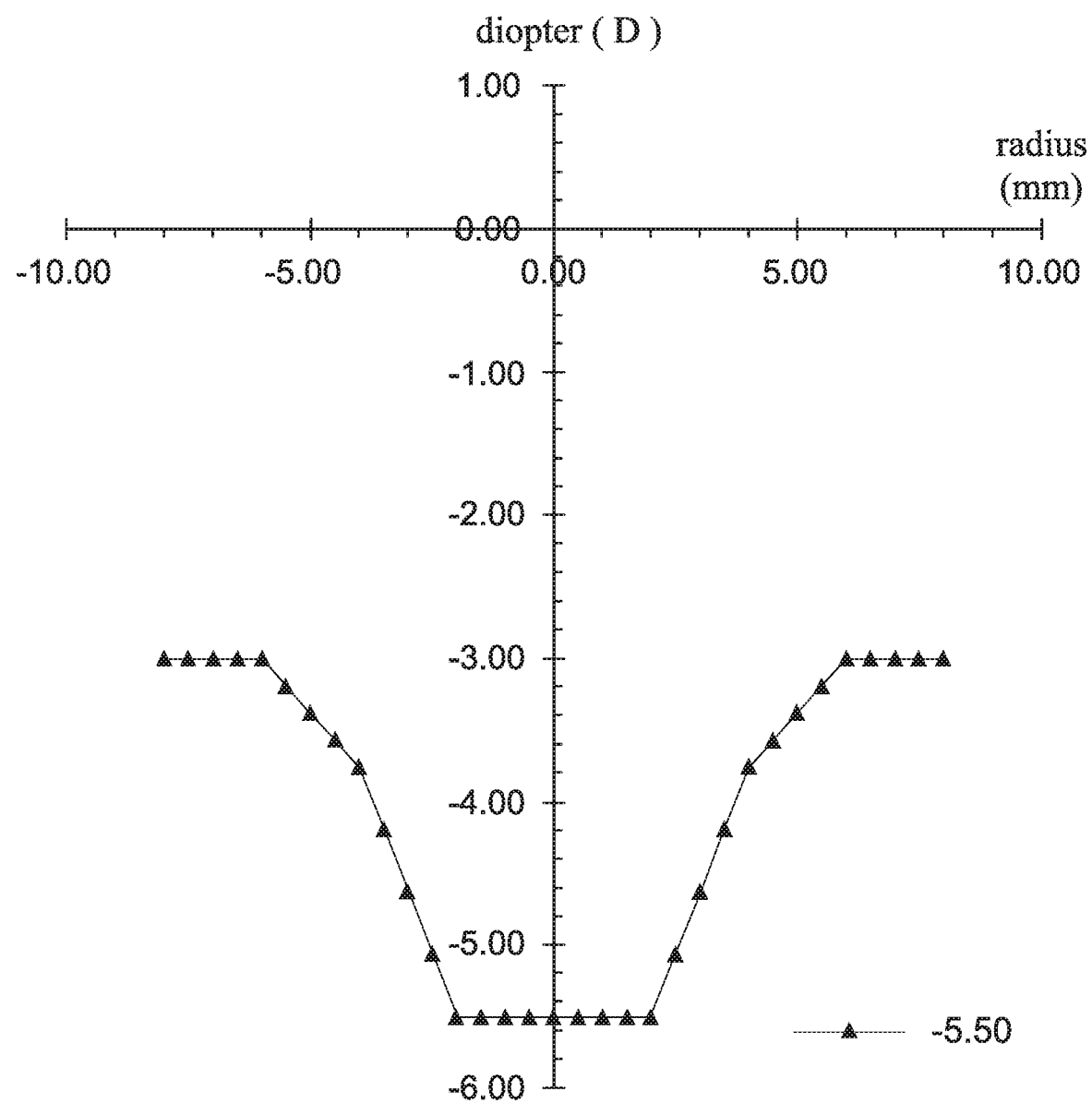
FIG. 20 shows a relationship between a radius and a diopter of a multifocal contact lens of the 12th example.

Please refer to Table 35 and FIG. 20 simultaneously, radiuses and the correspondent diopters of the multifocal contact lens of the 12th example are listed in Table 35. FIG. 20 shows a relationship between the radius and the diopter of the multifocal contact lens of the 12th example (the negative radius having an opposite direction with the positive radius). As shown in Table 35 and FIG. 20, the diopter of the central region is fixed, the diopter of the third annular region is different from the diopter of the central region, the diopter of the second annular region is different from the diopter of the central region, and the diopter of the first annular region is different from the diopter of the central region. Specifically, the diopter of the third annular region is greater than the diopter of the central region, the diopter of the third annular region increases when away from the central region, the diopter of the second annular region is greater than the diopter of the central region, the diopter of the second annular region increases when away from the central region, the diopter of the first annular region is greater than the diopter of the central region, and the diopter of the first annular region is fixed.

TABLE 35

| 12th example | | | |
|---|---|---|---|
| radius (mm) | diopter (D) | radius (mm) | diopter (D) |
| −8.00 | −3.00 | 0.50 | −5.50 |
| −7.50 | −3.00 | 1.00 | −5.50 |
| −7.00 | −3.00 | 1.50 | −5.50 |
| −6.50 | −3.00 | 2.00 | −5.50 |
| −6.00 | −3.00 | 2.50 | −5.06 |
| −5.50 | −3.19 | 3.00 | −4.63 |
| −5.00 | −3.38 | 3.50 | −4.19 |
| −4.50 | −3.56 | 4.00 | −3.75 |
| −4.00 | −3.75 | 4.50 | −3.56 |

TABLE 35-continued

| 12th example | | | |
|---|---|---|---|
| radius (mm) | diopter (D) | radius (mm) | diopter (D) |
| −3.50 | −4.19 | 5.00 | −3.38 |
| −3.00 | −4.63 | 5.50 | −3.19 |
| −2.50 | −5.06 | 6.00 | −3.00 |
| −2.00 | −5.50 | 6.50 | −3.00 |
| −1.50 | −5.50 | 7.00 | −3.00 |
| −1.00 | −5.50 | 7.50 | −3.00 |
| −0.50 | −5.50 | 8.00 | −3.00 |
| 0.00 | −5.50 | | |

In the 12th example, the multifocal contact lens is made of silicone hydrogel. A composition for manufacturing the silicone hydrogel of the 12th example is listed in Table 36A.

TABLE 36A

| Ingredient | Content (wt %) |
|---|---|
| 2-hydroxyethyl methacrylate | 4.2 |
| 3-methacryloyloxypropyltris(trimethylsilyloxy)silane | 26 |
| 2-hydroxy-2-methyl-propiophenone | 0.6 |
| N-vinyl-2-pyrrolidinone | 20 |
| N,N-dimethyl acrylamide | 11 |
| polysiloxane macromer | 24 |
| 4-(phenyldiazenyl) phenyl methacrylate | 1 |
| methyl methacrylate | 4.2 |
| ethanol | 9 |

As shown in Table 36A, the multifocal contact lens of the 12th example can effectively block the blue lights by adding 4-(phenyldiazenyl) phenyl methacrylate.

Figure 21:
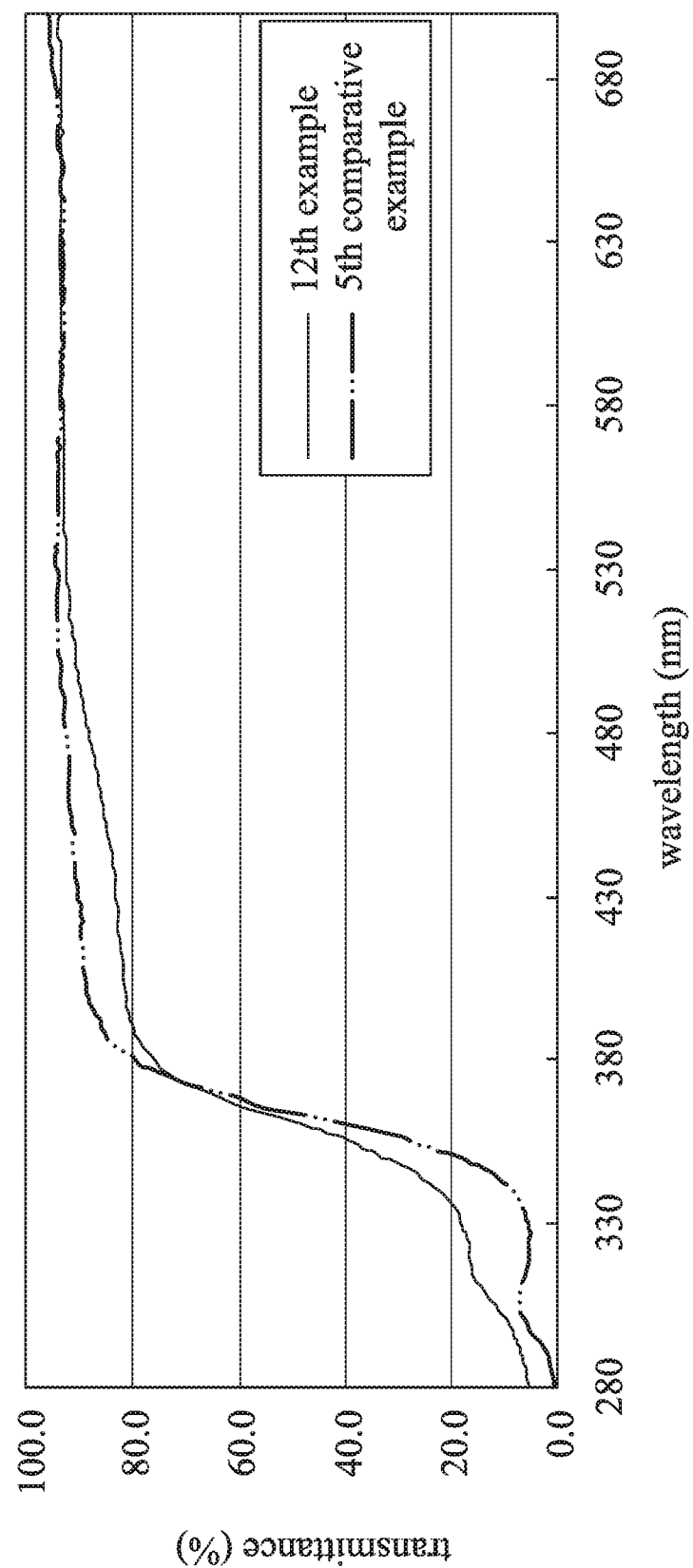
FIG. 21 shows a relationship between a wavelength and a transmittance of the multifocal contact lens of the 12th example and a multifocal contact lens of the 5th comparative example.

FIG. 21 shows a relationship between a wavelength and a transmittance of the multifocal contact lens of the 12th example and a multifocal contact lens the 5th comparative example. The difference between the 5th comparative example and the 12th example is the 5th comparative example in lack of blue-light blocking agent, Specifically, a composition of the 5th comparative example is formulated by replacing the the 4-(phenyldiazenyl) phenyl methacrylate in the 12th example with the 2-hydroxyethyl methacrylate. In FIG. 21, a blocking rate for blue lights (with a wavelength ranging from 380 nm to 495 nm) of the 5th comparative example and the 12th example can be calculated by the following formula: (1−an average transmittance of the wavelength ranging from 380 nm to 495 nm)×100%. The calculated results are listed in Table 36B.

TABLE 36B

| | 5th comparative example | 12th example |
|---|---|---|
| blocking rate for blue lights (%) (380 nm-495 nm) | 10.31 | 16.32 |

As shown in Table 36B, comparing to the 5th comparative example, the blocking rate for blue lights of the 12th example is much greater than that of the 5th comparative example. In other words, the multifocal contact lens of the 12th example can effectively block the blue lights, so that the probability that the retina hurt by the blue lights can be reduced.

13th Example

In the 13th example, a multifocal contact lens includes a central region and a first annular region. The first annular region concentrically surrounds the central region. At least one of the central region and the first annular region is aspheric. The structure of the multifocal contact lens of the 13th example can refer to FIG. 2. The multifocal contact lens is made of silicone hydrogel or hydrogel.

The value of DiC, DiP1, DiC/DiP1, PowC, PowP1, PowPMax, PowPMin, PowPMin/PowPMax, |PowC−PowP1|, |PowPMax−PowC|/PowPMax, |SloC|, |SloP1|, SloPMax, SloPMin, SloPMin/SloPMax, and the Slop range of the 13th example are listed in Table 37. The definitions of the parameters are previously described, and will not be repeated herein.

TABLE 37

| 13th example | | | |
|---|---|---|---|
| DiC (mm) | 5.00 | |PowC − PowP1| (D) | 6.50 |
| DiP1 (mm) | 14.00 | |PowPMax − PowC|/PowPMax | 1.08 |
| DiC/DiP1 | 0.36 | |SloC| | 0 |
| PowC (D) | −0.50 | |SloP1| | 1.44 |
| PowP1 (D) | 6.00 | SloPMax | 1.44 |
| PowPMax (D) | 6.00 | SloPMin | 1.44 |
| PowPMin (D) | 6.00 | SloPMin/SloPMax | 1.00 |
| PowPMin/PowPMax | 1.00 | Slop range | 1.44 |

Figure 24:
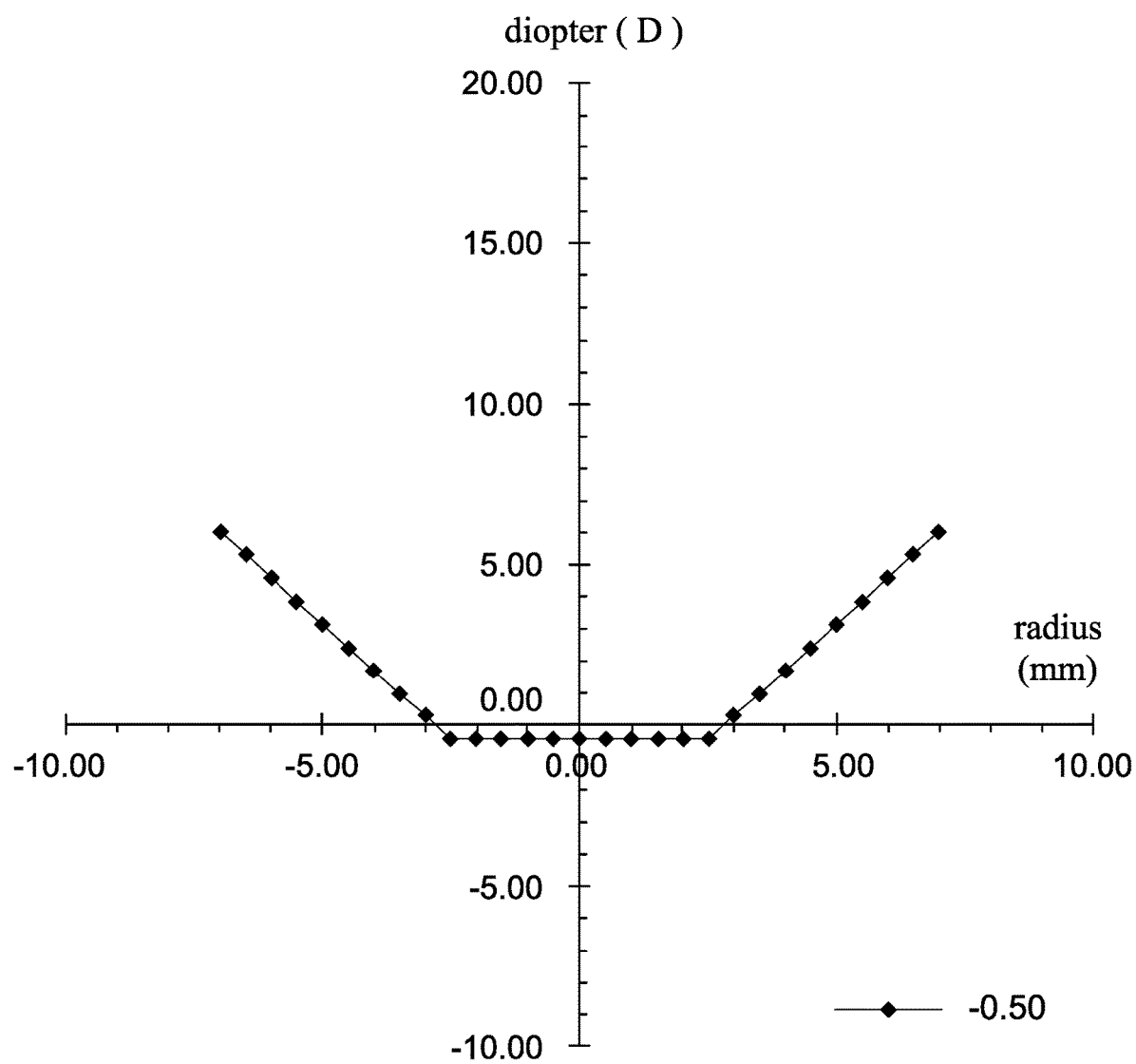
FIG. 24 shows a relationship between a radius and a diopter of a multifocal contact lens of the 13th example.

Please refer to Table 38 and FIG. 24 simultaneously, radiuses and the correspondent diopters of the multifocal contact lens of the 13th example are listed in Table 38. FIG. 24 shows a relationship between a radius and a diopter of a multifocal contact lens of the 13th example (the negative radius having an opposite direction with the positive radius). Moreover, the double line in Table 38 is for dividing different regions of the multifocal contact lens. Specifically, in the 13th example, the the double line in Table 38 is for dividing the central region and the first annular region. The function of the double line is the similar in the following examples (the 14th example to the 24 example), and will not be repeated hereinafter.

TABLE 38

| 13th example | | | |
|---|---|---|---|
| radius (mm) | diopter (D) | radius (mm) | diopter (D) |
| −7.00 | 6.00 | 0.50 | −0.50 |
| −6.50 | 5.28 | 1.00 | −0.50 |
| −6.00 | 4.56 | 1.50 | −0.50 |
| −5.50 | 3.83 | 2.00 | −0.50 |
| −5.00 | 3.11 | 2.50 | −0.50 |
| −4.50 | 2.39 | 3.00 | 0.22 |
| −4.00 | 1.67 | 3.50 | 0.94 |
| −3.50 | 0.94 | 4.00 | 1.67 |
| −3.00 | 0.22 | 4.50 | 2.39 |
| −2.50 | −0.50 | 5.00 | 3.11 |
| −2.00 | −0.50 | 5.50 | 3.83 |
| −1.50 | −0.50 | 6.00 | 4.56 |
| −1.00 | −0.50 | 6.50 | 5.28 |
| −0.50 | −0.50 | 7.00 | 6.00 |
| 0.00 | −0.50 | | |

14th Example

In the 14th example, a multifocal contact lens includes a central region and a first annular region. The first annular region concentrically surrounds the central region. At least one of the central region and the first annular region is aspheric. The structure of the multifocal contact lens of the 14th example can refer to FIG. 2. The multifocal contact lens is made of silicone hydrogel or hydrogel.

The value of DiC, DiP1, DiC/DiP1, PowC, PowP1, PowPMax, PowPMin, PowPMin/PowPMax, |PowC−PowP1|, |PowPMax−PowC|/PowPMax, |SloC|, |SloP1|, SloPMax, SloPMin, SloPMin/SloPMax, and the Slop range of the 14th example are listed in Table 39. The definitions of the parameters are previously described, and will not be repeated herein.

TABLE 39

| 14th example | | | |
|---|---|---|---|
| DiC (mm) | 4.00 | \|PowC − PowP1\| (D) | 12.00 |
| DiP1 (mm) | 14.00 | \|PowPMax − PowC\|/PowPMax | 1.09 |
| DiC/DiP1 | 0.29 | \|SloC\| | 0 |
| PowC (D) | −1.00 | \|SloP1\| | 2.40 |
| PowP1 (D) | 11.00 | SloPMax | 2.40 |
| PowPMax (D) | 11.00 | SloPMin | 2.40 |
| PowPMin (D) | 11.00 | SloPMin/SloPMax | 1.00 |
| PowPMin/PowPMax | 1.00 | Slop range | 2.40 |

Figure 25:
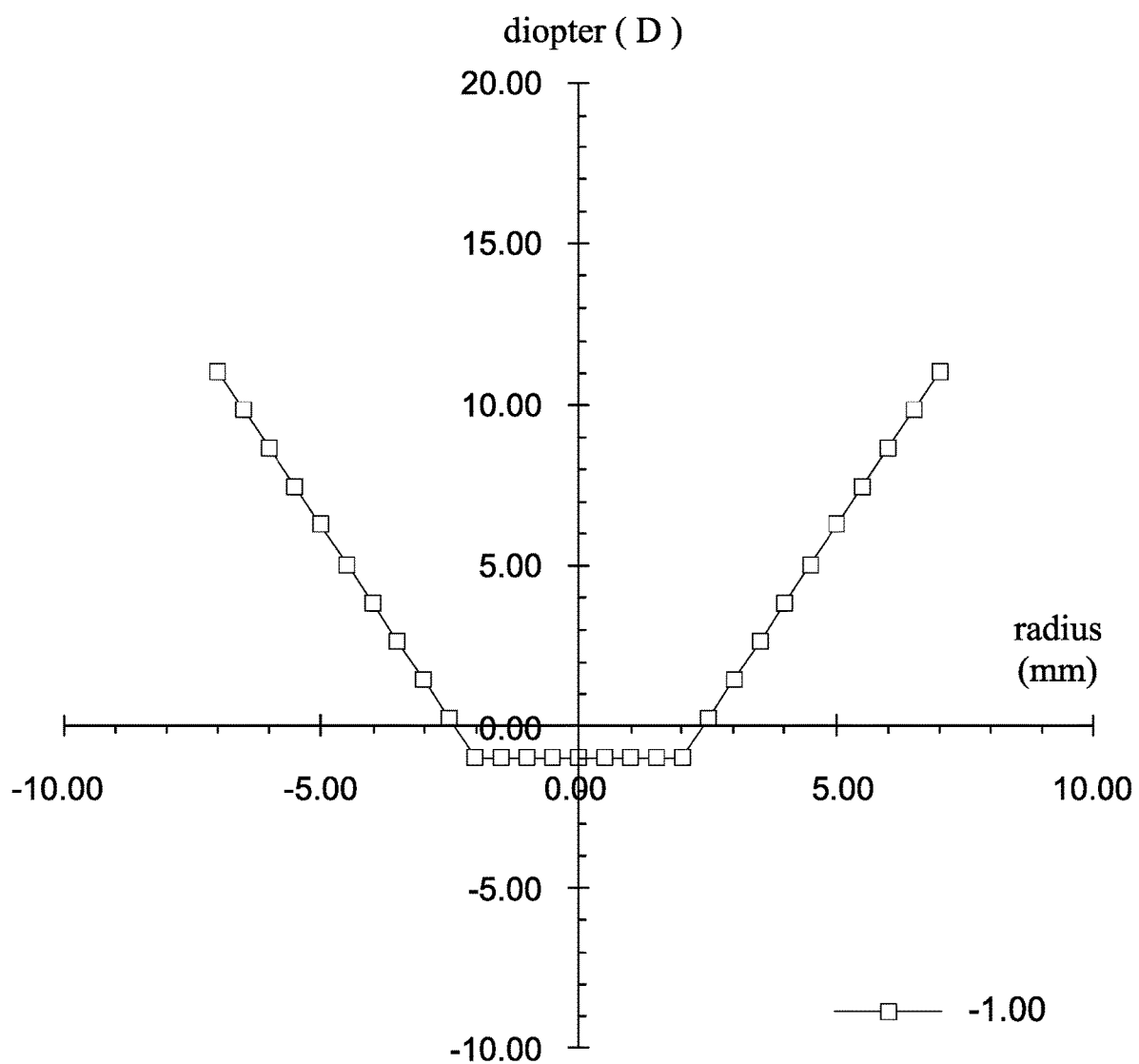
FIG. 25 shows a relationship between a radius and a diopter of a multifocal contact lens of the 14th example.

Please refer to Table 40 and FIG. 25 simultaneously, radiuses and the correspondent diopters of the multifocal contact lens of the 14th example are listed in Table 40. FIG. 25 shows a relationship between the radius and the diopter of the multifocal contact lens of the 14th example (the negative radius having an opposite direction with the positive radius).

TABLE 40

| 14th example | | | |
|---|---|---|---|
| radius (mm) | diopter (D) | radius (mm) | diopter (D) |
| −7.00 | 11.00 | 0.50 | −1.00 |
| −6.50 | 9.80 | 1.00 | −1.00 |
| −6.00 | 8.60 | 1.50 | −1.00 |
| −5.50 | 7.40 | 2.00 | −1.00 |
| −5.00 | 6.20 | 2.50 | 0.20 |
| −4.50 | 5.00 | 3.00 | 1.40 |
| −4.00 | 3.80 | 3.50 | 2.60 |
| −3.50 | 2.60 | 4.00 | 3.80 |
| −3.00 | 1.40 | 4.50 | 5.00 |
| −2.50 | 0.20 | 5.00 | 6.20 |
| −2.00 | −1.00 | 5.50 | 7.40 |
| −1.50 | −1.00 | 6.00 | 8.60 |
| −1.00 | −1.00 | 6.50 | 9.80 |
| −0.50 | −1.00 | 7.00 | 11.00 |
| 0.00 | −1.00 | | |

15th Example

In the 15th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 15th example can refer to FIG. 3. The multifocal contact lens is made of silicone hydrogel or hydrogel.

The value of DiC, DiP1, DiP2, DiC/DiP1, DiC/DiP2, PowC, PowP1, PowP2, PowPMax, PowPMin, PowPMin/PowPMax, |PowC−PowP1|, |PowPMax−PowC|/PowPMax, |SloC|, |SloP1|, |SloP2|, SloPMax, SloPMin, SloPMin/SloPMax, and Slop range of the 15th example are listed in Table 41.

TABLE 41

| 15th example | | | |
|---|---|---|---|
| DiC (mm) | 3.00 | PowPMin/PowPMax | 0.20 |
| DiP1 (mm) | 13.00 | \|PowC − PowP1\| (D) | 16.50 |
| DiP2 (mm) | 7.00 | \|PowPMax − PowC\|/PowPMax | 1.10 |
| DiC/DiP1 | 0.23 | \|SloC\| | 0 |
| DiC/DiP2 | 0.43 | \|SloP1\| | 4.00 |
| PowC (D) | −1.50 | \|SloP2\| | 2.25 |
| PowP1 (D) | 15.00 | SloPMax | 4.00 |
| PowP2 (D) | 3.00 | SloPMin | 2.25 |
| PowPMax (D) | 15.00 | SloPMin/SloPMax | 0.56 |
| PowPMin (D) | 3.00 | Slop range | 2.25~4.00 |

Figure 26:
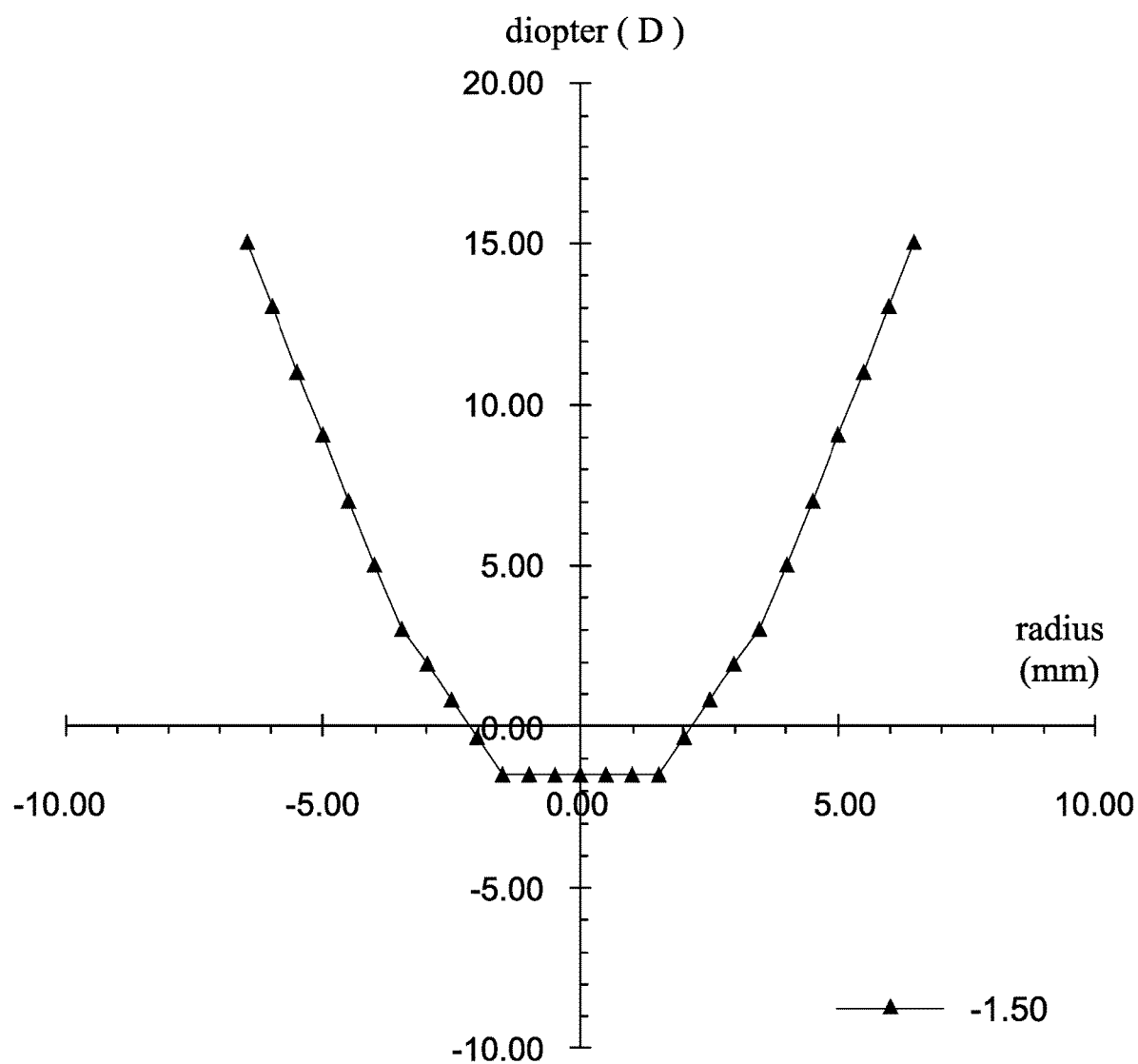
FIG. 26 shows a relationship between a radius and a diopter of a multifocal contact lens of the 15th example.

Please refer to Table 42 and FIG. 26 simultaneously, radiuses and the correspondent diopters of the multifocal contact lens of the 15th example are listed in Table 42. FIG. 26 shows a relationship between the radius and the diopter of the multifocal contact lens of the 15th example (the negative radius having an opposite direction with the positive radius).

TABLE 42

| 15th example | | | |
|---|---|---|---|
| radius (mm) | diopter (D) | radius (mm) | diopter (D) |
| −6.50 | 15.00 | 0.50 | −1.50 |
| −6.00 | 13.00 | 1.00 | −1.50 |
| −5.50 | 11.00 | 1.50 | −1.50 |
| −5.00 | 9.00 | 2.00 | −0.38 |
| −4.50 | 7.00 | 2.50 | 0.75 |
| −4.00 | 5.00 | 3.00 | 1.88 |
| −3.50 | 3.00 | 3.50 | 3.00 |
| −3.00 | 1.88 | 4.00 | 5.00 |
| −2.50 | 0.75 | 4.50 | 7.00 |
| −2.00 | −0.38 | 5.00 | 9.00 |
| −1.50 | −1.50 | 5.50 | 11.00 |
| −1.00 | −1.50 | 6.00 | 13.00 |
| −0.50 | −1.50 | 6.50 | 15.00 |
| 0.00 | −1.50 | | |

16th Example

In the 16th example, a multifocal contact lens includes a central region, a first annular region and a second annular region. The central region, the second annular region and the first annular region are sequentially connected from a center of the multifocal contact lens to a periphery of the multifocal contact lens and are concentric. At least one of the central region, the second annular region, and the first annular region is aspheric. The structure of the multifocal contact lens of the 16th example can refer to FIG. 3. The multifocal contact lens is made of silicone hydrogel or hydrogel.

The value of DiC, DiP1, DiP2, DiC/DiP1, DiC/DiP2, PowC, PowP1, PowP2, PowPMax, PowPMin, PowPMin/PowPMax, |PowC−PowP1|, |PowPMax−PowC|/PowPMax, |SloC|, |SloP1|, |SloP2|, SloPMax, SloPMin, SloPMin/SloPMax, and Slop range of the 16th example are listed in Table 43.

TABLE 43

| 16th example | | | |
|---|---|---|---|
| DiC (mm) | 2.00 | PowPMin/PowPMax | 0.14 |
| DiP1 (mm) | 14.00 | \|PowC − PowP1\| (D) | 9.00 |
| DiP2 (mm) | 7.00 | \|PowPMax − PowC\|/PowP Max | 1.29 |
| DiC/DiP1 | 0.14 | \|SloC\| | 0 |
| DiC/DiP2 | 0.29 | \|SloP1\| | 1.68 |

TABLE 43-continued

| 16th example | | | |
|---|---|---|---|
| PowC (D) | −2.00 | |SloP2| | 1.20 |
| PowP1 (D) | 7.00 | SloPMax | 1.68 |
| PowP2 (D) | 1.00 | SloPMin | 1.20 |
| PowPMax (D) | 7.00 | SloPMin/SloPMax | 0.71 |
| PowPMin (D) | 1.00 | Slop range | 1.20~1.68 |

Figure 27:
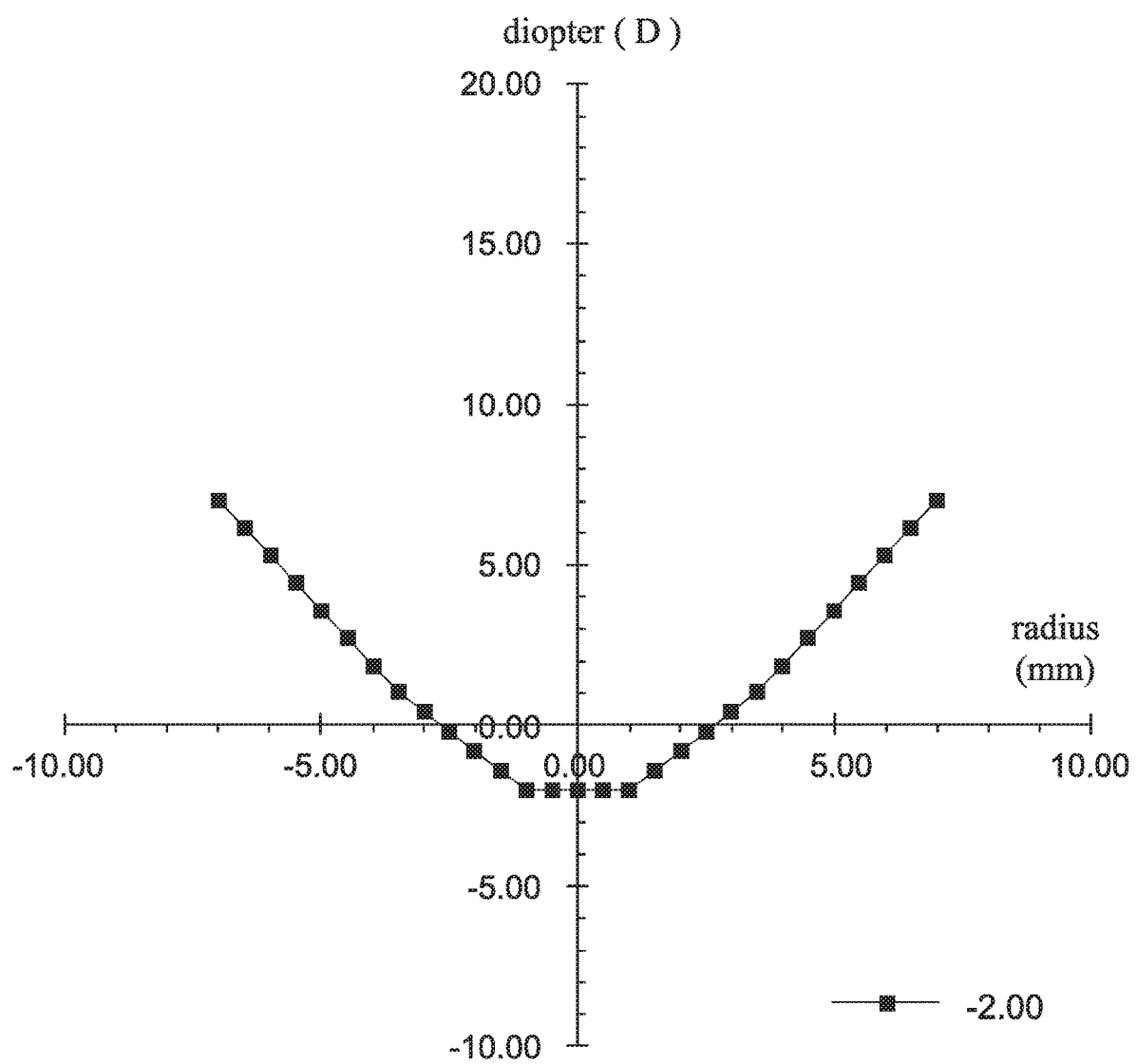
FIG. 27 shows a relationship between a radius and a diopter of a multifocal contact lens of the 16th example.

Please refer to Table 44 and FIG. 27 simultaneously, radiuses and the correspondent diopters of the multifocal contact lens of the 16th example are listed in Table 44. FIG. 27 shows a relationship between the radius and the diopter of the multifocal contact lens of the 16th example (the negative radius having an opposite direction with the positive radius).

TABLE 44

| 16th example | | | |
|---|---|---|---|
| radius (mm) | diopter (D) | radius (mm) | diopter (D) |
| −7.00 | 7.00 | 0.50 | −2.00 |
| −6.50 | 6.14 | 1.00 | −2.00 |
| −6.00 | 5.29 | 1.50 | −1.40 |
| −5.50 | 4.43 | 2.00 | −0.80 |
| −5.00 | 3.57 | 2.50 | −0.20 |
| −4.50 | 2.71 | 3.00 | 0.40 |
| −4.00 | 1.86 | 3.50 | 1.00 |
| −3.50 | 1.00 | 4.00 | 1.86 |
| −3.00 | 0.40 | 4.50 | 2.71 |
| −2.50 | −0.20 | 5.00 | 3.57 |
| −2.00 | −0.80 | 5.50 | 4.43 |
| −1.50 | −1.40 | 6.00 | 5.29 |
| −1.00 | −2.00 | 6.50 | 6.14 |
| −0.50 | −2.00 | 7.00 | 7.00 |
| 0.00 | −2.00 | | |

17th Example

In the 17th example, a multifocal contact lens includes a central region, a first annular region, a second annular region and a third annular region. The central region, the third annular region, the second annular region and the first annular region are sequentially connected from a center of the multifocal contact lens to a periphery of the multifocal contact lens and are concentric. At least one of the central region, the third annular region, the second annular region and the first annular region is aspheric. The structure of the multifocal contact lens of the 17th example can refer to FIG. 4. The multifocal contact lens is made of silicone hydrogel or hydrogel.

The value of DiC, DiP1, DiP2, DiP3, DiC/DiP1, DiC/DiP2, PowC, PowP1, PowP2, PowP3, PowPMax, PowPMin, PowPMin/PowPMax, |PowC−PowP1|, |PowPMax−PowC|/PowPMax, |SloC|, |SloP1|, |SloP2|, |SloP3|, SloPMax, SloPMin, SloPMin/SloPMax, and Slop range of the 17th example are listed in Table 45.

TABLE 45

| 17th example | | | |
|---|---|---|---|
| DiC (mm) | 2.00 | PowPMin/PowPMax | 0 |
| DiP1 (mm) | 16.00 | |PowC − PowP1| (D) | 4.50 |
| DiP2 (mm) | 9.00 | |PowPMax − PowC|/PowPMax | 2.25 |
| DiP3 (mm) | 5.00 | |SloC| | 0 |
| DiC/DiP1 | 0.13 | |SloP1| | 0.14 |
| DiC/DiP2 | 0.22 | |SloP2| | 0.75 |

TABLE 45-continued

| 17th example | | | |
|---|---|---|---|
| PowC (D) | −2.50 | |SloP3| | 1.67 |
| PowP1 (D) | 2.00 | SloPMax | 1.67 |
| PowP2 (D) | 1.50 | SloPMin | 0.14 |
| PowP3 (D) | 0 | SloPMin/SloPMax | 0.09 |
| PowPMax (D) | 2.00 | Slop range | 0.14~1.67 |
| PowPMin (D) | 0 | | |

Figure 28:
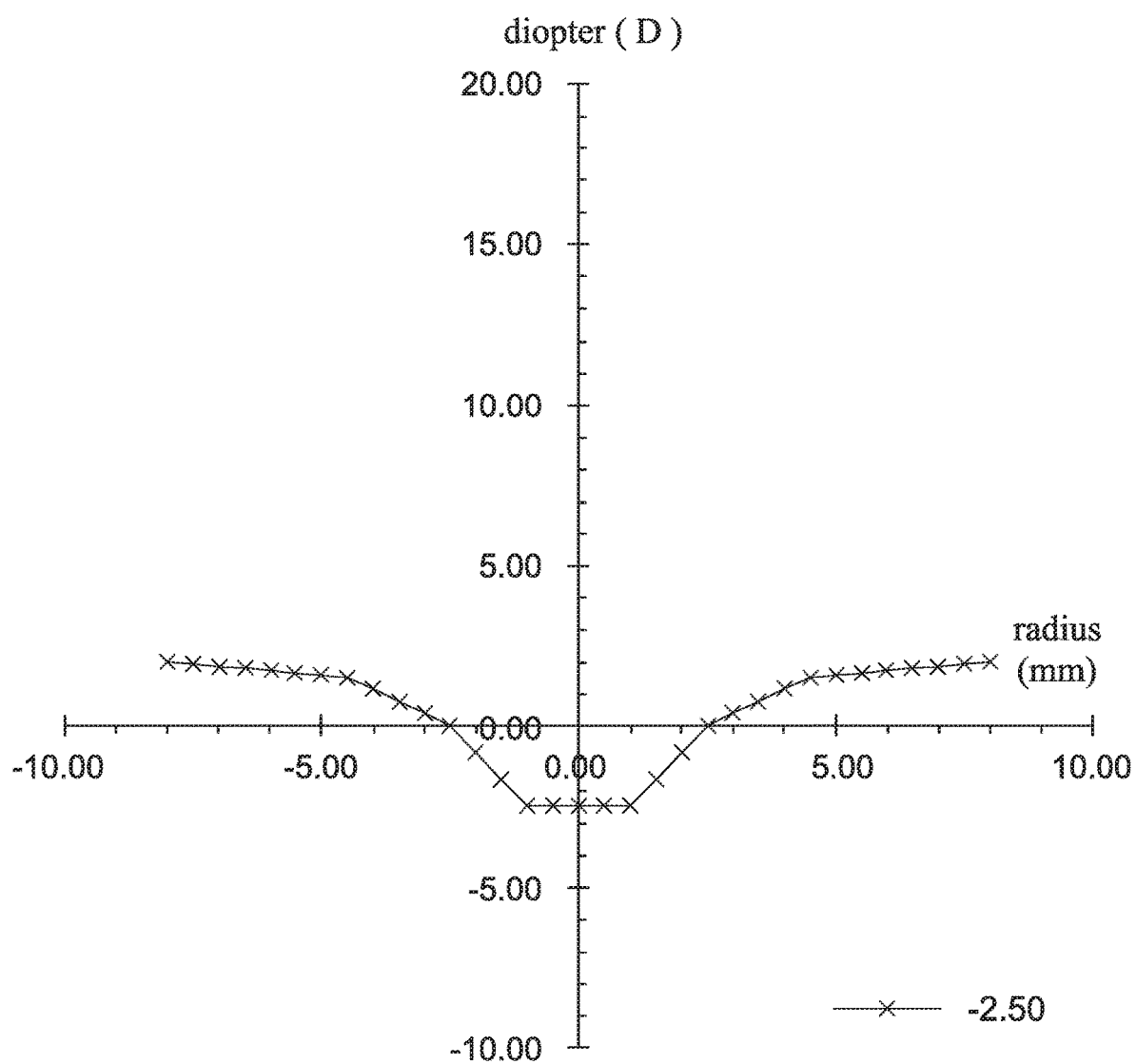
FIG. 28 shows a relationship between a radius and a diopter of a multifocal contact lens of the 17th example.

Please refer to Table 46 and FIG. 28 simultaneously, radiuses and the correspondent diopters of the multifocal contact lens of the 17th example are listed in Table 45. FIG. 28 shows a relationship between the radius and the diopter of the multifocal contact lens of the 17th example (the negative radius having an opposite direction with the positive radius).

TABLE 46

| 17th example | | | |
|---|---|---|---|
| radius (mm) | diopter (D) | radius (mm) | diopter (D) |
| −8.00 | 2.00 | 0.50 | −2.50 |
| −7.50 | 1.93 | 1.00 | −2.50 |
| −7.00 | 1.86 | 1.50 | −1.67 |
| −6.50 | 1.79 | 2.00 | −0.83 |
| −6.00 | 1.71 | 2.50 | 0.00 |
| −5.50 | 1.64 | 3.00 | 0.38 |
| −5.00 | 1.57 | 3.50 | 0.75 |
| −4.50 | 1.50 | 4.00 | 1.13 |
| −4.00 | 1.13 | 4.50 | 1.50 |
| −3.50 | 0.75 | 5.00 | 1.57 |
| −3.00 | 0.38 | 5.50 | 1.64 |
| −2.50 | 0.00 | 6.00 | 1.71 |
| −2.00 | −0.83 | 6.50 | 1.79 |
| −1.50 | −1.67 | 7.00 | 1.86 |
| −1.00 | −2.50 | 7.50 | 1.93 |
| −0.50 | −2.50 | 8.00 | 2.00 |
| 0.00 | −2.50 | | |

18th Example

In the 18th example, a multifocal contact lens includes a central region, a first annular region, a second annular region and a third annular region. The central region, the third annular region, the second annular region and the first annular region are sequentially connected from a center of the multifocal contact lens to a periphery of the multifocal contact lens and are concentric. At least one of the central region, the third annular region, the second annular region and the first annular region is aspheric. The structure of the multifocal contact lens of the 18th example can refer to FIG. 4. The multifocal contact lens is made of silicone hydrogel or hydrogel.

The value of DiC, DiP1, DiP2, DiP3, DiC/DiP1, DiC/DiP2, PowC, PowP1, PowP2, PowP3, PowPMax, PowPMin, PowPMin/PowPMax, |PowC−PowP1|, |PowPMax−PowC|/PowPMax, |SloC|, |SloP1|, |SloP2|, |SloP3|, SloPMax, SloPMin, SloPMin/SloPMax, and Slop range of the 18th example are listed in Table 47.

TABLE 47

| 18th example | | | |
|---|---|---|---|
| DiC (mm) | 3.00 | PowPMin/PowPMax | 0.95 |
| DiP1 (mm) | 14.00 | |PowC − PowP1| (D) | 8.00 |
| DiP2 (mm) | 11.00 | |PowPMax − PowC|/PowPMax | 1.60 |

TABLE 47-continued

| 18th example | | | |
|---|---|---|---|
| DiP3 (mm) | 7.00 | |SloC| | 0 |
| DiC/DiP1 | 0.21 | |SloP1| | 0 |
| DiC/DiP2 | 0.27 | |SloP2| | 0.12 |
| PowC (D) | −3.00 | |SloP3| | 3.88 |
| PowP1 (D) | 5.00 | SloPMax | 3.88 |
| PowP2 (D) | 5.00 | SloPMin | 0 |
| PowP3 (D) | 4.75 | SloPMin/SloPMax | 0 |
| PowPMax (D) | 5.00 | Slop range | 0~3.88 |
| PowPMin (D) | 4.75 | | |

Figure 29:
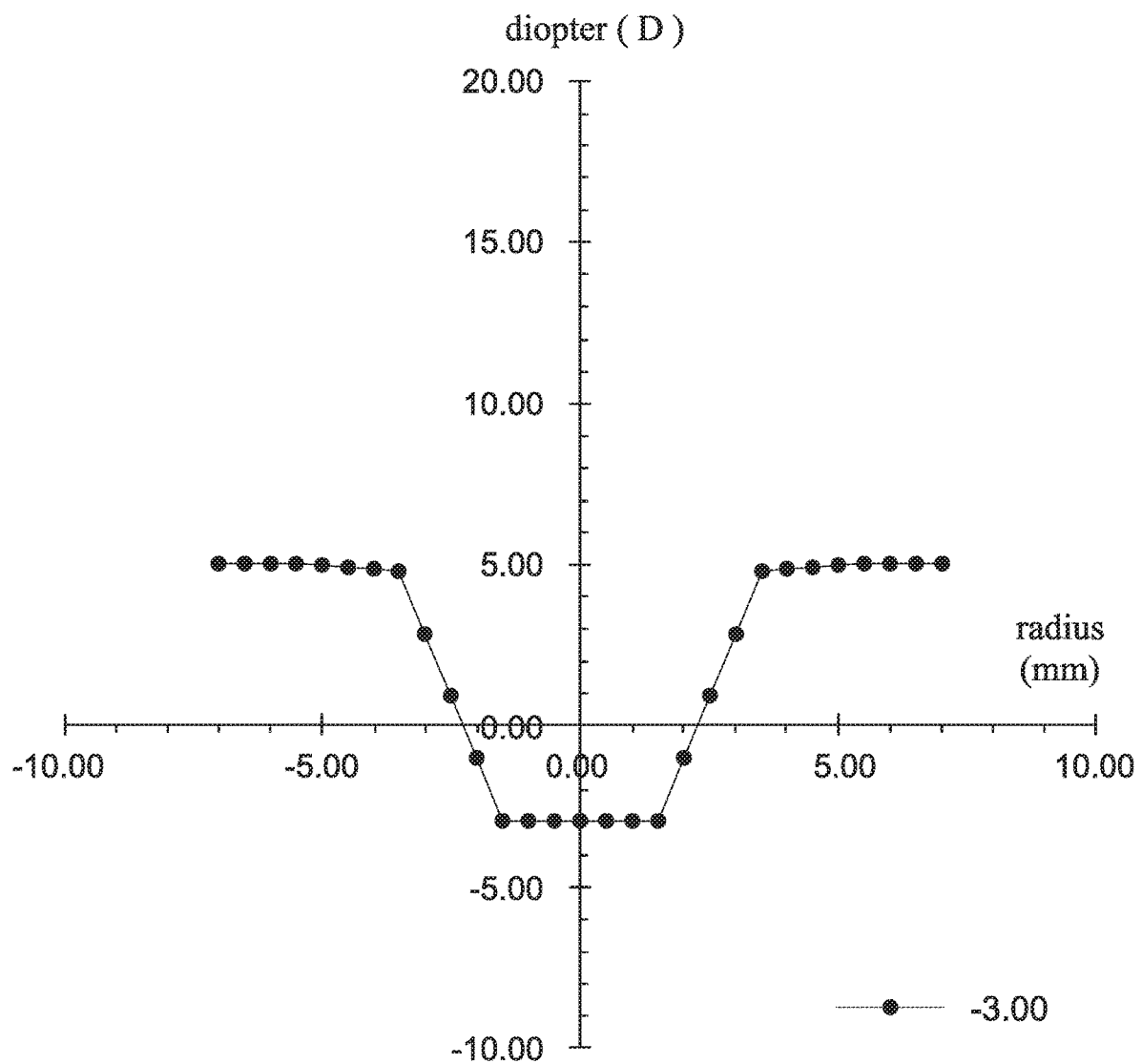
FIG. 29 shows a relationship between a radius and a diopter of a multifocal contact lens of the 18th example.

Please refer to Table 48 and FIG. 29 simultaneously, radiuses and the correspondent diopters of the multifocal contact lens of the 18th example are listed in Table 48. FIG. 29 shows a relationship between the radius and the diopter of the multifocal contact lens of the 18th example (the negative radius having an opposite direction with the positive radius).

TABLE 48

| 18th example | | | |
|---|---|---|---|
| radius (mm) | diopter (D) | radius (mm) | diopter (D) |
| −7.00 | 5.00 | 0.50 | −3.00 |
| −6.50 | 5.00 | 1.00 | −3.00 |
| −6.00 | 5.00 | 1.50 | −3.00 |
| −5.50 | 5.00 | 2.00 | −1.06 |
| −5.00 | 4.94 | 2.50 | 0.88 |
| −4.50 | 4.88 | 3.00 | 2.81 |
| −4.00 | 4.81 | 3.50 | 4.75 |
| −3.50 | 4.75 | 4.00 | 4.81 |
| −3.00 | 2.81 | 4.50 | 4.88 |
| −2.50 | 0.88 | 5.00 | 4.94 |
| −2.00 | −1.06 | 5.50 | 5.00 |
| −1.50 | −3.00 | 6.00 | 5.00 |
| −1.00 | −3.00 | 6.50 | 5.00 |
| −0.50 | −3.00 | 7.00 | 5.00 |
| 0.00 | −3.00 | | |

19th Example

In the 19th example, a multifocal contact lens includes a central region, a first annular region, a second annular region and a third annular region. The central region, the third annular region, the second annular region and the first annular region are sequentially connected from a center of the multifocal contact lens to a periphery of the multifocal contact lens and are concentric. At least one of the central region, the third annular region, the second annular region and the first annular region is aspheric. The structure of the multifocal contact lens of the 19th example can refer to FIG. 4. The multifocal contact lens is made of silicone hydrogel or hydrogel.

The value of DiC, DiP1, DiP2, DiP3, DiC/DiP1, DiC/DiP2, PowC, PowP1, PowP2, PowP3, PowPMax, PowPMin, PowPMin/PowPMax, |PowC−PowP1|, |PowPMax−PowC|/PowPMax, |SloC|, |SloP1|, |SloP2|, |SloP3|, SloPMax, SloPMin, SloPMin/SloPMax, and Slop range of the 19th example are listed in Table 49.

TABLE 49

| 19th example | | | |
|---|---|---|---|
| DiC (mm) | 3.00 | PowPMin/PowPMax | 0.46 |
| DiP1 (mm) | 15.00 | |PowC − PowP1| (D) | 10.00 |

TABLE 49-continued

| 19th example | | | |
|---|---|---|---|
| DiP2 (mm) | 9.00 | |PowPMax − PowC|/PowPMax | 1.54 |
| DiP3 (mm) | 6.00 | |SloC| | 0 |
| DiC/DiP1 | 0.20 | |SloP1| | 1.83 |
| DiC/DiP2 | 0.33 | |SloP2| | 1.33 |
| PowC (D) | −3.50 | |SloP3| | 4.33 |
| PowP1 (D) | 6.50 | SloPMax | 4.33 |
| PowP2 (D) | 3.00 | SloPMin | 1.33 |
| PowP3 (D) | 3.00 | SloPMin/SloPMax | 0.31 |
| PowPMax (D) | 6.50 | Slop range | 1.33~4.33 |
| PowPMin (D) | 3.00 | | |

Figure 30:
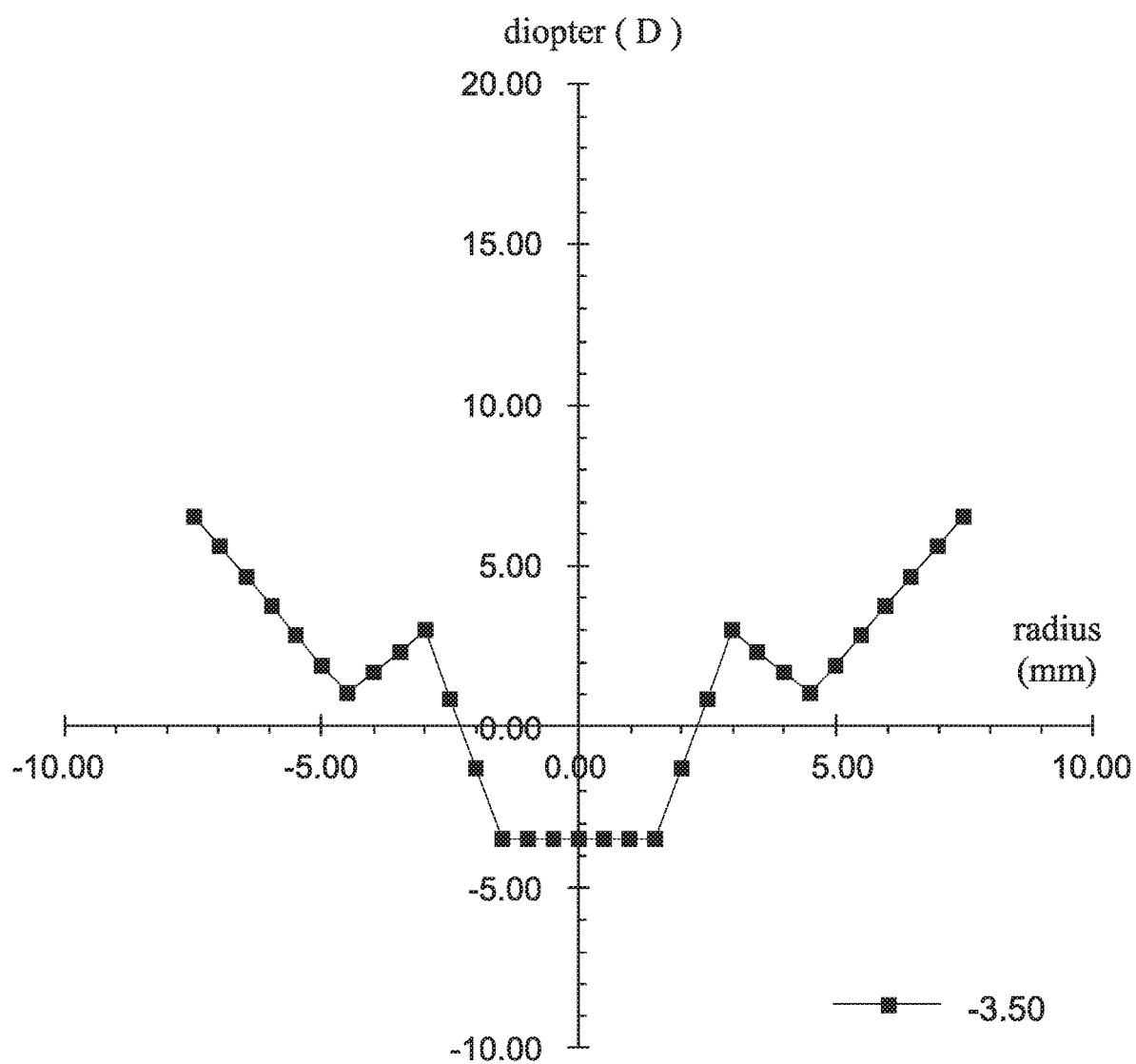
FIG. 30 shows a relationship between a radius and a diopter of a multifocal contact lens of the 19th example.

Please refer to Table 50 and FIG. 30 simultaneously, radiuses and the correspondent diopters of the multifocal contact lens of the 19th example are listed in Table 50. FIG. 30 shows a relationship between the radius and the diopter of the multifocal contact lens of the 19th example (the negative radius having an opposite direction with the positive radius).

TABLE 50

| 19th example | | | |
|---|---|---|---|
| radius (mm) | diopter (D) | radius (mm) | diopter (D) |
| −7.50 | 6.50 | 0.50 | −3.50 |
| −7.00 | 5.58 | 1.00 | −3.50 |
| −6.50 | 4.67 | 1.50 | −3.50 |
| −6.00 | 3.75 | 2.00 | −1.33 |
| −5.50 | 2.83 | 2.50 | 0.83 |
| −5.00 | 1.92 | 3.00 | 3.00 |
| −4.50 | 1.00 | 3.50 | 2.33 |
| −4.00 | 1.67 | 4.00 | 1.67 |
| −3.50 | 2.33 | 4.50 | 1.00 |
| −3.00 | 3.00 | 5.00 | 1.92 |
| −2.50 | 0.83 | 5.50 | 2.83 |
| −2.00 | −1.33 | 6.00 | 3.75 |
| −1.50 | −3.50 | 6.50 | 4.67 |
| −1.00 | −3.50 | 7.00 | 5.58 |
| −0.50 | −3.50 | 7.50 | 6.50 |
| 0.00 | −3.50 | | |

20th Example

In the 20th example, a multifocal contact lens includes a central region, a first annular region, a second annular region, a third annular region and a fourth annular region. The central region, the fourth annular region, the third annular region, the second annular region and the first annular region are sequentially connected from a center of the multifocal contact lens to a periphery of the multifocal contact lens and are concentric. At least one of the central region, the fourth annular region, the third annular region, the second annular region and the first annular region is aspheric. The structure of the multifocal contact lens of the 20th example can refer to FIG. 22. The multifocal contact lens is made of silicone hydrogel or hydrogel.

The value of DiC, DiP1, DiP2, DiP3, DiP4, DiC/DiP1, DiC/DiP2, PowC, PowP1, PowP2, PowP3, PowP4, PowPMax, PowPMin, PowPMin/PowPMax, |PowC−PowP1|, |PowPMax−PowC|/PowPMax, |SloC|, |SloP1|, |SloP2|, |SloP3|, |SloP4|, SloPMax, SloPMin, SloPMin/SloPMax, and Slop range of the 20th example are listed in Table 51.

TABLE 51

20th example

| | | | |
|---|---|---|---|
| DiC (mm) | 2.00 | PowPMin (D) | −3.50 |
| DiP1 (mm) | 14.00 | PowPMin/PowPMax | −0.31 |
| DiP2 (mm) | 10.00 | |PowC − PowP1| (D) | 15.25 |
| DiP3 (mm) | 7.00 | |PowPMax − PowC|/PowPMax | 1.36 |
| DiP4 (mm) | 5.00 | |SloC| | 0 |
| DiC/DiP1 | 0.14 | |SloP1| | 0.13 |
| DiC/DiP2 | 0.20 | |SloP2| | 9.17 |
| PowC (D) | −4.00 | |SloP3| | 0.50 |
| PowP1 (D) | 11.25 | |SloP4| | 0.33 |
| PowP2 (D) | 11.00 | SloPMax | 9.17 |
| PowP3 (D) | −3.00 | SloPMin | 0.13 |
| PowP4 (D) | −3.50 | SloPMin/SloPMax | 0.01 |
| PowPMax (D) | 11.25 | Slop range | 0.13~9.17 |

Figure 31:
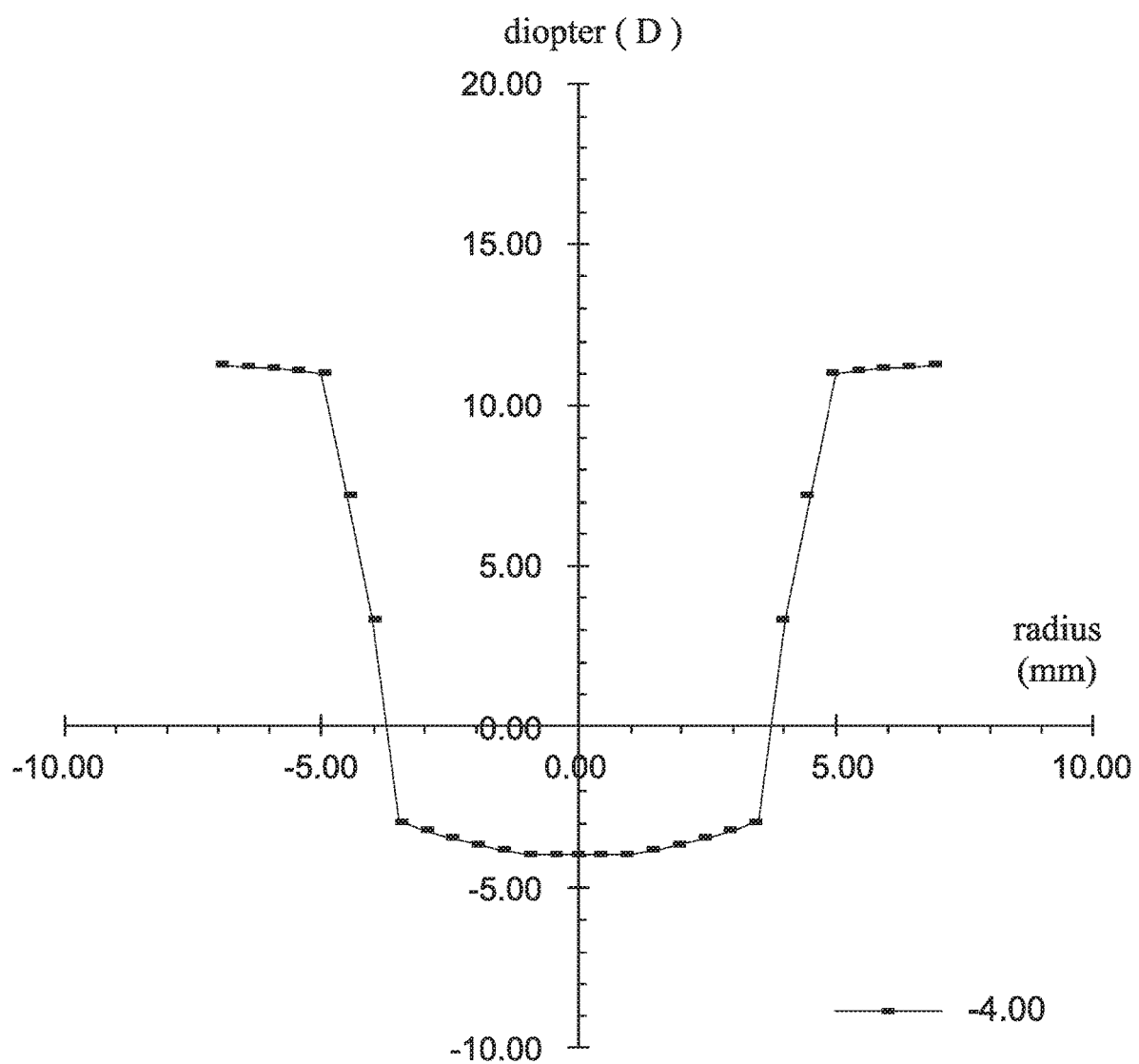
FIG. 31 shows a relationship between a radius and a diopter of a multifocal contact lens of the 20th example.

Please refer to Table 52 and FIG. 31 simultaneously, radiuses and the correspondent diopters of the multifocal contact lens of the 20th example are listed in Table 52. FIG. 31 shows a relationship between the radius and the diopter of the multifocal contact lens of the 20th example (the negative radius having an opposite direction with the positive radius).

TABLE 52

20th example

| radius (mm) | diopter (D) | radius (mm) | diopter (D) |
|---|---|---|---|
| −7.00 | 11.25 | 0.50 | −4.00 |
| −6.50 | 11.19 | 1.00 | −4.00 |
| −6.00 | 11.13 | 1.50 | −3.83 |
| −5.50 | 11.06 | 2.00 | −3.67 |
| −5.00 | 11.00 | 2.50 | −3.50 |
| −4.50 | 7.17 | 3.00 | −3.25 |
| −4.00 | 3.33 | 3.50 | −3.00 |
| −3.50 | −3.00 | 4.00 | 3.33 |
| −3.00 | −3.25 | 4.50 | 7.17 |
| −2.50 | −3.50 | 5.00 | 11.00 |
| −2.00 | −3.67 | 5.50 | 11.06 |
| −1.50 | −3.83 | 6.00 | 11.13 |
| −1.00 | −4.00 | 6.50 | 11.19 |
| −0.50 | −4.00 | 7.00 | 11.25 |
| 0.00 | −4.00 | | |

21st Example

In the 21st example, a multifocal contact lens includes a central region, a first annular region, a second annular region, a third annular region and a fourth annular region. The central region, the fourth annular region, the third annular region, the second annular region and the first annular region are sequentially connected from a center of the multifocal contact lens to a periphery of the multifocal contact lens and are concentric. At least one of the central region, the fourth annular region, the third annular region, the second annular region and the first annular region is aspheric. The structure of the multifocal contact lens of the 21st example can refer to FIG. 22. The multifocal contact lens is made of silicone hydrogel or hydrogel.

The value of DiC, DiP1, DiP2, DiP3, DiP4, DiC/DiP1, DiC/DiP2, PowC, PowP1, PowP2, PowP3, PowP4, PowPMax, PowPMin, PowPMin/PowPMax, |PowC−PowP1|, |PowPMax−PowC|/PowPMax, |SloC|, |SloP1|, |SloP2|, |SloP3|, |SloP4|, SloPMax, SloPMin, SloPMin/SloPMax, and Slop range of the 21st example are listed in Table 53.

TABLE 53

21st example

| | | | |
|---|---|---|---|
| DiC (mm) | 3.00 | PowPMin (D) | 1.00 |
| DiP1 (mm) | 15.00 | PowPMin/PowPMax | 0.44 |
| DiP2 (mm) | 12.00 | |PowC − PowP1| (D) | 7.25 |
| DiP3 (mm) | 8.00 | |PowPMax − PowC|/PowPMax | 3.22 |
| DiP4 (mm) | 6.00 | |SloC| | 0 |
| DiC/DiP1 | 0.20 | |SloP1| | 0.17 |
| DiC/DiP2 | 0.25 | |SloP2| | 0.50 |
| PowC (D) | −5.00 | |SloP3| | 0 |
| PowP1 (D) | 2.25 | |SloP4| | 4.00 |
| PowP2 (D) | 2.00 | SloPMax | 4.00 |
| PowP3 (D) | 1.00 | SloPMin | 0 |
| PowP4 (D) | 1.00 | SloPMin/SloPMax | 0 |
| PowPMax (D) | 2.25 | Slop range | 0~4.00 |

Figure 32:
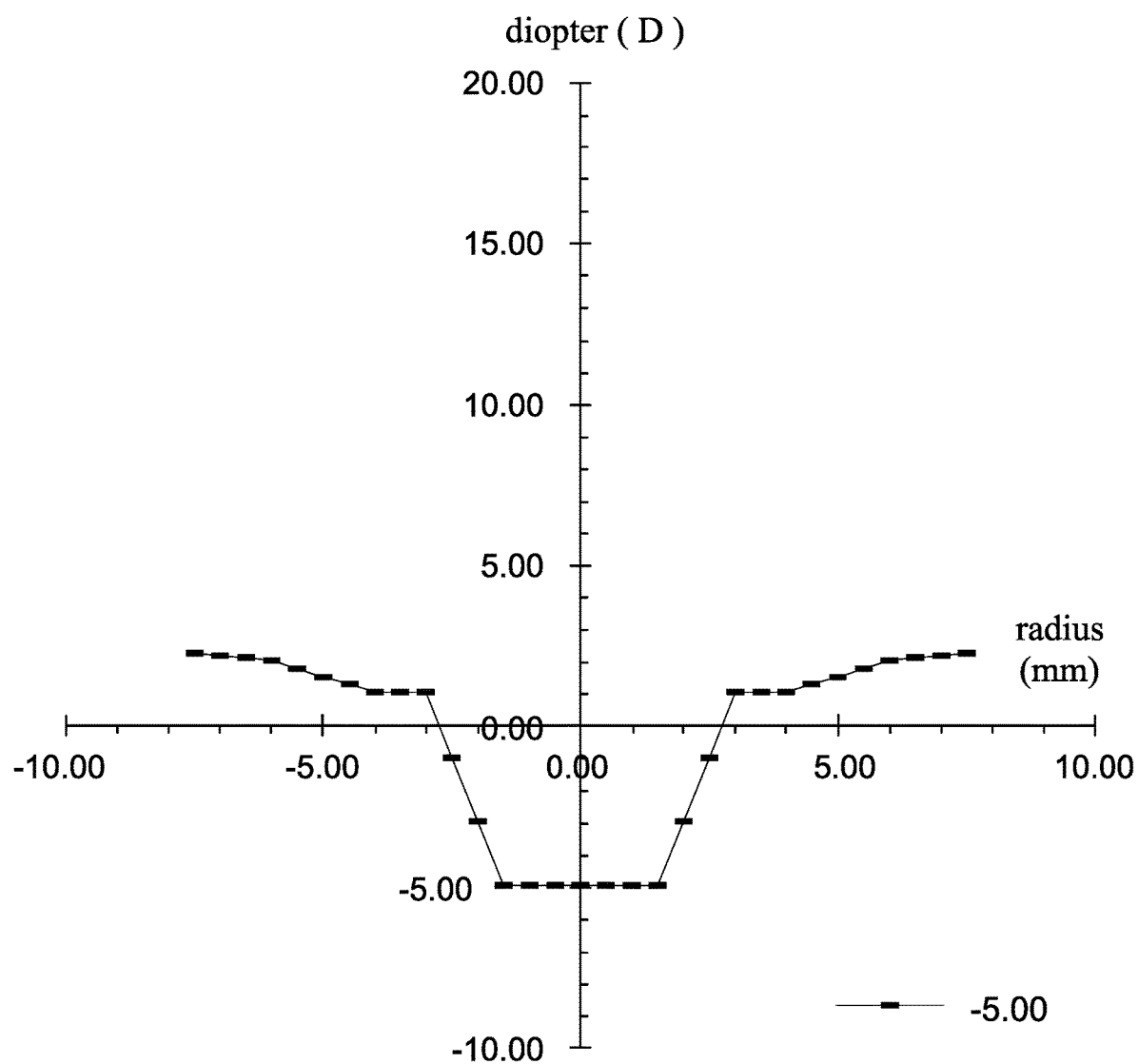
FIG. 32 shows a relationship between a radius and a diopter of a multifocal contact lens of the 21st example.

Please refer to Table 54 and FIG. 32 simultaneously, radiuses and the correspondent diopters of the multifocal contact lens of the 21st example are listed in Table 54. FIG. 32 shows a relationship between the radius and the diopter of the multifocal contact lens of the 21st example (the negative radius having an opposite direction with the positive radius).

TABLE 54

21st example

| radius (mm) | diopter (D) | radius (mm) | diopter (D) |
|---|---|---|---|
| −7.50 | 2.25 | 0.50 | −5.00 |
| −7.00 | 2.17 | 1.00 | −5.00 |
| −6.50 | 2.08 | 1.50 | −5.00 |
| −6.00 | 2.00 | 2.00 | −3.00 |
| −5.50 | 1.75 | 2.50 | −1.00 |
| −5.00 | 1.50 | 3.00 | 1.00 |
| −4.50 | 1.25 | 3.50 | 1.00 |
| −4.00 | 1.00 | 4.00 | 1.00 |
| −3.50 | 1.00 | 4.50 | 1.25 |
| −3.00 | 1.00 | 5.00 | 1.50 |
| −2.50 | −1.00 | 5.50 | 1.75 |
| −2.00 | −3.00 | 6.00 | 2.00 |
| −1.50 | −5.00 | 6.50 | 2.08 |
| −1.00 | −5.00 | 7.00 | 2.17 |
| −0.50 | −5.00 | 7.50 | 2.25 |
| 0.00 | −5.00 | | |

22nd Example

In the 22nd example, a multifocal contact lens includes a central region, a first annular region, a second annular region, a third annular region and a fourth annular region. The central region, the fourth annular region, the third annular region, the second annular region and the first annular region are sequentially connected from a center of the multifocal contact lens to a periphery of the multifocal contact lens and are concentric. At least one of the central region, the fourth annular region, the third annular region, the second annular region and the first annular region is aspheric. The structure of the multifocal contact lens of the 22nd example can refer to FIG. 22. The multifocal contact lens is made of silicone hydrogel or hydrogel.

The value of DiC, DiP1, DiP2, DiP3, DiP4, DiC/DiP1, DiC/DiP2, PowC, PowP1, PowP2, PowP3, PowP4, PowPMax, PowPMin, PowPMin/PowPMax, |PowC−PowP1|, |PowPMax−PowC|/PowPMax, |SloC|, |SloP1|, |SloP2|, |SloP3|, |SloP4|, SloPMax, SloPMin, SloPMin/SloPMax, and Slop range of the 22nd example are listed in Table 55.

TABLE 55

22nd example

| | | | |
|---|---|---|---|
| DiC (mm) | 2.00 | PowPMin (D) | −2.00 |
| DiP1 (mm) | 13.00 | PowPMin/PowPMax | −1.33 |
| DiP2 (mm) | 11.00 | |PowC − PowP1| (D) | 7.50 |
| DiP3 (mm) | 8.00 | |PowPMax − PowC|/PowPMax | 5.00 |
| DiP4 (mm) | 5.00 | |SloC| | 0 |
| DiC/DiP1 | 0.15 | |SloP1| | 0.50 |
| DiC/DiP2 | 0.18 | |SloP2| | 2.00 |
| PowC (D) | −6.00 | |SloP3| | 0 |
| PowP1 (D) | 1.50 | |SloP4| | 2.67 |
| PowP2 (D) | 1.00 | SloPMax | 2.67 |
| PowP3 (D) | −2.00 | SloPMin | 0 |
| PowP4 (D) | −2.00 | SloPMin/SloPMax | 0 |
| PowPMax (D) | 1.50 | Slop range | 0~2.67 |

Figure 33:
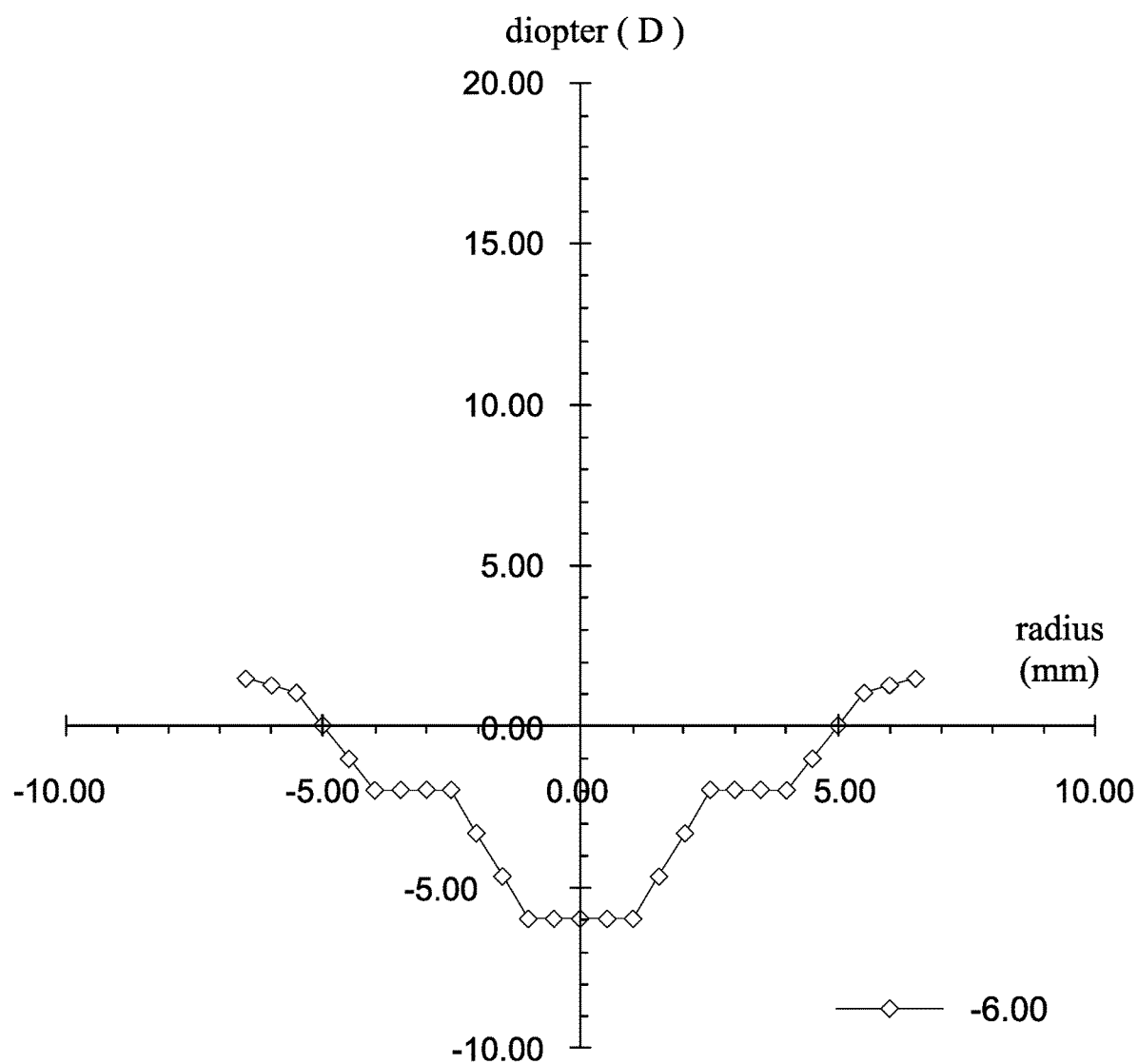
FIG. 33 shows a relationship between a radius and a diopter of a multifocal contact lens of the 22nd example.

Please refer to Table 56 and FIG. 33 simultaneously, radiuses and the correspondent diopters of the multifocal contact lens of the 22nd example are listed in Table 56. FIG. 33 shows a relationship between the radius and the diopter of the multifocal contact lens of the 22nd example (the negative radius having an opposite direction with the positive radius).

TABLE 56

22nd example

| radius (mm) | diopter (D) | radius (mm) | diopter (D) |
|---|---|---|---|
| −6.50 | 1.50 | 0.50 | −6.00 |
| −6.00 | 1.25 | 1.00 | −6.00 |
| −5.50 | 1.00 | 1.50 | −4.67 |
| −5.00 | 0.00 | 2.00 | −3.33 |
| −4.50 | −1.00 | 2.50 | −2.00 |
| −4.00 | −2.00 | 3.00 | −2.00 |
| −3.50 | −2.00 | 3.50 | −2.00 |
| −3.00 | −2.00 | 4.00 | −2.00 |
| −2.50 | −2.00 | 4.50 | −1.00 |
| −2.00 | −3.33 | 5.00 | 0.00 |
| −1.50 | −4.67 | 5.50 | 1.00 |
| −1.00 | −6.00 | 6.00 | 1.25 |
| −0.50 | −6.00 | 6.50 | 1.50 |
| 0.00 | −6.00 | | |

23rd Example

In the 23rd example, a multifocal contact lens includes a central region, a first annular region, a second annular region, a third annular region and a fourth annular region. The central region, the fourth annular region, the third annular region, the second annular region and the first annular region are sequentially connected from a center of the multifocal contact lens to a periphery of the multifocal contact lens and are concentric. At least one of the central region, the fourth annular region, the third annular region, the second annular region and the first annular region is aspheric. The structure of the multifocal contact lens of the 23rd example can refer to FIG. 22. The multifocal contact lens is made of silicone hydrogel or hydrogel.

The value of DiC, DiP1, DiP2, DiP3, DiP4, DiC/DiP1, DiC/DiP2, PowC, PowP1, PowP2, PowP3, PowP4, PowPMax, PowPMin, PowPMin/PowPMax, |PowC−PowP1|, |PowPMax−PowC|/PowPMax, |SloC|, |SloP1|, |SloP2|, |SloP3|, |SloP4|, SloPMax, SloPMin, SloPMin/SloPMax, and Slop range of the 23rd example are listed in Table 57.

TABLE 57

23rd example

| | | | |
|---|---|---|---|
| DiC (mm) | 2.00 | PowPMin (D) | −3.00 |
| DiP1 (mm) | 15.00 | PowPMin/PowPMax | −0.24 |
| DiP2 (mm) | 12.00 | |PowC − PowP1| (D) | 19.25 |
| DiP3 (mm) | 8.00 | |PowPMax − PowC|/PowPMax | 1.57 |
| DiP4 (mm) | 5.00 | |SloC| | 0 |
| DiC/DiP1 | 0.13 | |SloP1| | 0.17 |
| DiC/DiP2 | 0.17 | |SloP2| | 5.50 |
| PowC (D) | −7.00 | |SloP3| | 2.67 |
| PowP1 (D) | 12.25 | |SloP4| | 2.67 |
| PowP2 (D) | 12.00 | SloPMax | 5.50 |
| PowP3 (D) | 1.00 | SloPMin | 0.17 |
| PowP4 (D) | −3.00 | SloPMin/SloPMax | 0.03 |
| PowPMax (D) | 12.25 | Slop range | 0.17~5.50 |

Figure 34:
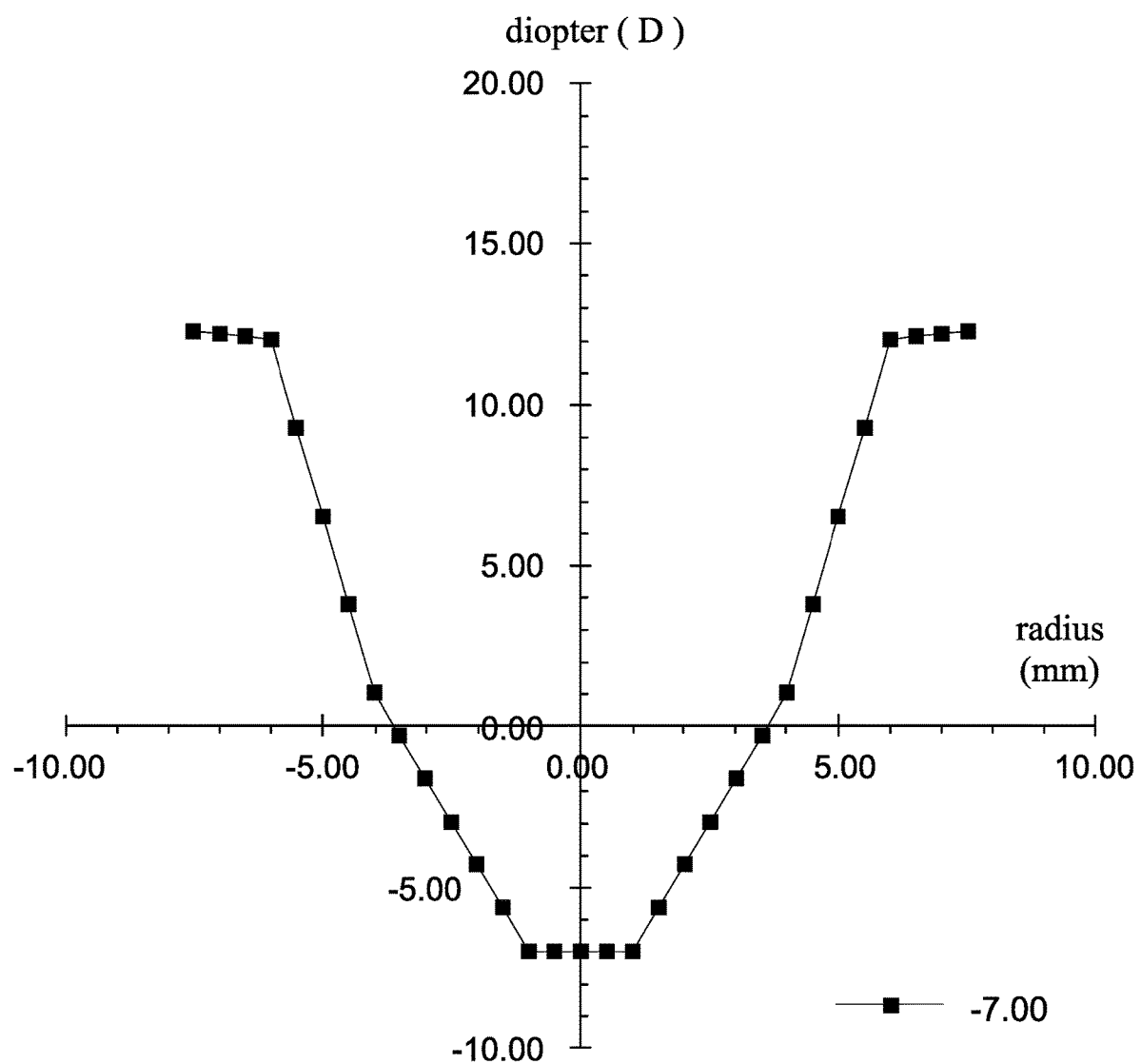
FIG. 34 shows a relationship between a radius and a diopter of a multifocal contact lens of the 23rd example.

Please refer to Table 58 and FIG. 34 simultaneously, radiuses and the correspondent diopters of the multifocal contact lens of the 23rd example are listed in Table 58. FIG. 34 shows a relationship between the radius and the diopter of the multifocal contact lens of the 23rd example (the negative radius having an opposite direction with the positive radius).

TABLE 58

23rd example

| radius (mm) | diopter (D) | radius (mm) | diopter (D) |
|---|---|---|---|
| −7.50 | 12.25 | 0.50 | −7.00 |
| −7.00 | 12.17 | 1.00 | −7.00 |
| −6.50 | 12.08 | 1.50 | −5.67 |
| −6.00 | 12.00 | 2.00 | −4.33 |
| −5.50 | 9.25 | 2.50 | −3.00 |
| −5.00 | 6.50 | 3.00 | −1.67 |
| −4.50 | 3.75 | 3.50 | −0.33 |
| −4.00 | 1.00 | 4.00 | 1.00 |
| −3.50 | −0.33 | 4.50 | 3.75 |
| −3.00 | −1.67 | 5.00 | 6.50 |
| −2.50 | −3.00 | 5.50 | 9.25 |
| −2.00 | −4.33 | 6.00 | 12.00 |
| −1.50 | −5.67 | 6.50 | 12.08 |
| −1.00 | −7.00 | 7.00 | 12.17 |
| −0.50 | −7.00 | 7.50 | 12.25 |
| 0.00 | −7.00 | | |

24th Example

In the 24th example, a multifocal contact lens includes a central region, a first annular region, a second annular region, a third annular region, a fourth annular region and a fifth annular region. The central region, the fifth annular region, the fourth annular region, the third annular region, the second annular region and the first annular region are sequentially connected from a center of the multifocal contact lens to a periphery of the multifocal contact lens and are concentric. At least one of the central region, the fifth annular region, the fourth annular region, the third annular region, the second annular region and the first annular region is aspheric. The structure of the multifocal contact lens of the 24th example can refer to FIG. 22. The multifocal contact lens is made of silicone hydrogel or hydrogel.

The value of DiC, DiP1, DiP2, DiP3, DiP4, DiP5, DiC/DiP1, DiC/DiP2, PowC, PowP1, PowP2, PowP3, PowP4, PowP5, PowPMax, PowPMin, PowPMin/PowPMax, |PowC−PowP1|, |PowPMax−PowC|/PowPMax, |SloC|, |SloP1|, |SloP2|, |SloP3|, |SloP4|, |SloP5|, SloPMax, SloPMin, SloPMin/SloPMax, and Slop range of the 24th example are listed in Table 59.

TABLE 59

| 24th example | | | |
|---|---|---|---|
| DiC (mm) | 1.00 | PowPMin (D) | −7.50 |
| DiP1 (mm) | 16.00 | PowPMin/PowPMax | −2.31 |
| DiP2 (mm) | 14.00 | \|PowC − PowP1\| (D) | 11.25 |
| DiP3 (mm) | 11.00 | \|PowPMax − PowC\|/PowPMax | 3.46 |
| DiP4 (mm) | 8.00 | \|SloC\| | 0 |
| DiP5 (mm) | 5.00 | \|SloP1\| | 0.25 |
| DiC/DiP1 | 0.06 | \|SloP2\| | 3.33 |
| DiC/DiP2 | 0.07 | \|SloP3\| | 2.00 |
| PowC (D) | −8.00 | \|SloP4\| | 5.67 |
| PowP1 (D) | 3.25 | \|SloP5\| | 0.25 |
| PowP2 (D) | 3.00 | SloPMax | 5.67 |
| PowP3 (D) | 1.00 | SloPMin | 0.25 |
| PowP4 (D) | 1.00 | SloPMin/SloPMax | 0.04 |
| PowP5 (D) | −7.50 | Slop range | 0.25~5.67 |
| PowPMax (D) | 3.25 | | |

Figure 35:
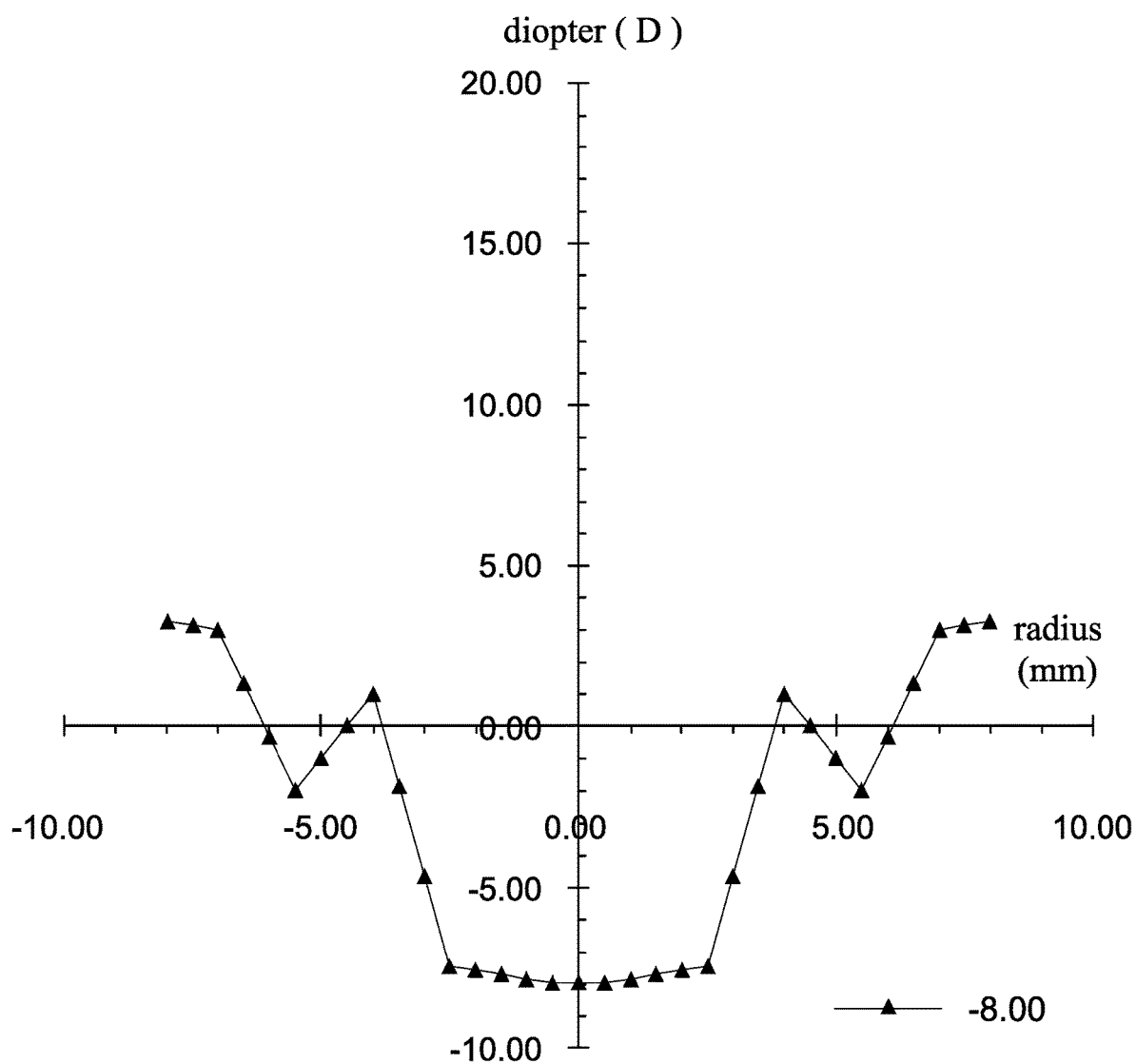
FIG. 35 shows a relationship between a radius and a diopter of a multifocal contact lens of the 24th example.

Please refer to Table 60 and FIG. 35 simultaneously, radiuses and the correspondent diopters of the multifocal contact lens of the 24th example are listed in Table 60. FIG. 35 shows a relationship between the radius and the diopter of the multifocal contact lens of the 24th example (the negative radius having an opposite direction with the positive radius).

TABLE 60

| 24th example | | | |
|---|---|---|---|
| radius (mm) | diopter (D) | radius (mm) | diopter (D) |
| −8.00 | 3.25 | 0.50 | −8.00 |
| −7.50 | 3.13 | 1.00 | −7.88 |
| −7.00 | 3.00 | 1.50 | −7.75 |
| −6.50 | 1.33 | 2.00 | −7.63 |
| −6.00 | −0.33 | 2.50 | −7.50 |
| −5.50 | −2.00 | 3.00 | −4.67 |
| −5.00 | −1.00 | 3.50 | −1.83 |
| −4.50 | 0.00 | 4.00 | 1.00 |
| −4.00 | 1.00 | 4.50 | 0.00 |
| −3.50 | −1.83 | 5.00 | −1.00 |
| −3.00 | −4.67 | 5.50 | −2.00 |
| −2.50 | −7.50 | 6.00 | −0.33 |
| −2.00 | −7.63 | 6.50 | 1.33 |
| −1.50 | −7.75 | 7.00 | 3.00 |
| −1.00 | −7.88 | 7.50 | 3.13 |
| −0.50 | −8.00 | 8.00 | 3.25 |
| 0.00 | −8.00 | | |

According to the multifocal contact lens of the present disclosure, the data disclosed in the 1st examples to the 24 example are design values. There could be a difference of 1%~20% between the design values and the actual measured values.

According to the multifocal contact lens of the present disclosure, the maximal diopter refers to the diopter with a greatest value, and the sign (positive or negative) thereof is taken in consideration.

According to the multifocal contact lens of the present disclosure, the range of the annular region is defined by linear regression as follows. A scatter diagram is plotted, wherein the value of the radius is plotted along the horizontal axis (X) and the correspondent diopter is plotted along the vertical axis (Y). Intercept a line segment from a linear trend line obtained by the least-squares fitting process. The range of the annular region is defined when the value of r-squared ($R^2$) is greater than 0.9. Preferably, the range of the annular region can be better defined when the value of r-squared ($R^2$) approaches to 1.

The linear trend line can be calculated by Equation (1):

$$y = mx + b \quad (1);$$

wherein m is a slope, b is an intercept.

The value of R2 can be calculated by Equation (2):

$$R^2 = 1 - \frac{SSE}{SST}; \quad (2)$$

$$SSE = \sum_i (y_i - \hat{y}_i)^2;$$

$$SST = \sum_{i=1}^{n} (y_i - \bar{y})^2; \bar{y} = \frac{1}{n}\sum_i y_i;$$

wherein SSE is the abbreviation of "sum of squares for error", SST is the abbreviation of "sum of squares for total", Yi is the actual value of Y for the $i^{th}$ case and $\hat{y}_i$ is the regression prediction for the $i^{th}$ case, and n is the total number of Yi.

According to the multifocal contact lens of the present disclosure, a aspheric surface refers to a curved shape of a front surface or a back surface shown in a cross-sectional view taken along the central line of the multifocal contact lens. The front surface is a surface of the multifocal contact lens far away from the cornea, and the back surface is a surface of the multifocal contact lens close to the cornea.

According to the multifocal contact lens of the present disclosure, the diopter is represented by D. When the multifocal contact lens is for correcting myopia, the diopter thereof is negative; when the multifocal contact lens is for correcting hyperopia, the diopter thereof is positive.

According to the present disclosure, the cycloplegic agent can include but is not limited to atropine ((3-endo)-8-methyl-8-azabicyclo[3.2.1]oct-3-yl tropate), tropicamide (N-ethyl-3-hydroxy-2-phenyl-N-(4-pyridinylmethyl)propanamide), cyclopentolate (2-(dimethylamino)ethyl (1-hydroxycyclopentyl)(phenyl)acetate), homatropine ((3-endo)-8-methyl-8-azabicyclo[3.2.1]oct-3-yl hydroxy(phenyl)acetate), scopolamine ((1R,2R,4S,5S,7S)-9-methyl-3-oxa-9-azatricyclo[3.3.1.0$^{2,4}$]non-7-yl(2S)-3-hydroxy-2-phenylpropanoate), eucatropine (1,2,2,6-tetramethyl-4-piperidinyl hydroxy(phenyl)acetate) or the salt thereof. The cycloplegic agent, also known as a mydriatic agent, belongs to a parasympathetic blocker, i.e., a non-selective m-type muscarinic receptor blocker, which can control the paralysis and relaxation of the ciliary muscle of pupils by blocking the muscarinic receptor so as to enlarge the pupil.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:
1. A multifocal contact lens, comprising:
a central region; and
at least one annular region concentrically surrounding the central region, wherein a diopter of the annular region is different from a diopter of the central region;
wherein the annular region closest to a periphery of the multifocal contact lens is a first annular region, the annular region comprises a maximal diopter, a maximum of all the maximal diopters is PowPMax, a diameter of the central region of the multifocal contact lens is DiC, the annular region comprises an absolute value of a slope, a maximum of all the absolute values of the slopes is SloPMax, and the following conditions are satisfied:

6.5 D<$PowP$max;

2 mm≤$DiC$≤6 mm; and 0.5 D/mm≤$SloP$Max≤20 D/mm.

2. The multifocal contact lens of claim 1, wherein the multifocal contact lens comprises at least two annular regions, each of the annular regions comprises an absolute value of a slope, a maximum of all the absolute values of the slopes is SloPMax, and the following condition is satisfied:

2.4 D/mm≤$SloP$Max<20 D/mm.

3. The multifocal contact lens of claim 2, wherein the multifocal contact lens comprises the at least two annular regions, each of the annular regions comprises the absolute value of the slope, a minimum of all the absolute values of the slopes is SloPMin, and the following condition is satisfied:

0.1 D/mm≤$SloP$Min≤4 D/mm.

4. The multifocal contact lens of claim 2, wherein the multifocal contact lens comprises the at least two annular regions, each of the annular regions comprises the maximal diopter, a minimum of all the maximal diopters is PowPMin, and the following condition is satisfied:

−8 D≤$PowP$Min≤15 D.

5. The multifocal contact lens of claim 2, wherein the multifocal contact lens comprises the at least two annular regions, each of the annular regions comprises the maximal diopter, the maximum of all the maximal diopters is PowPMax, the minimum of all the maximal diopters is PowPMin, and the following condition is satisfied:

−6.0≤$PowP$Min/$PowP$Max≤1.0.

6. The multifocal contact lens of claim 2, wherein the multifocal contact lens comprises the at least two annular regions, each of the annular regions comprises the maximal diopter, the maximum of all the maximal diopters is PowPMax, the diopter of the central region of the multifocal contact lens is PowC, and the following condition is satisfied:

1.08≤|$PowP$Max−$PowC$|/$PowP$Max≤5.

7. The multifocal contact lens of claim 2, wherein the multifocal contact lens comprises the at least two annular regions, each of the annular regions comprises the absolute value of the slope, the maximum of all the absolute values of the slopes is SloPMax, the minimum of all the absolute values of the slopes is SloPMin, and the following condition is satisfied:

0≤$SloP$Min/$SloP$Max≤0.31.

8. The multifocal contact lens of claim 2, wherein a slope of the annular region of the multifocal contact lens is Slop, and the following condition is satisfied:

0.1 D/mm≤|$SloP$|≤20 D/mm.

9. A contact lens product, comprising:
the multifocal contact lens of claim 1; and
a buffer solution, wherein the multifocal contact lens is immersed in the buffer solution;
wherein at least one of the multifocal contact lens and the buffer solution comprises a muscarinic receptor blocker.

10. A contact lens product, comprising:
the multifocal contact lens of claim 1; and
a buffer solution, wherein the multifocal contact lens is immersed in the buffer solution;
wherein at least one of the multifocal contact lens and the buffer solution comprises a cycloplegic agent.

11. The contact lens product of claim 10, wherein the buffer solution comprises the cycloplegic agent, the weight percentage concentration of the cycloplegic agent in the buffer solution is ConA, and the following condition is satisfied:

0.01%≤$ConA$<0.5%.

* * * * *